US012117876B2

(12) United States Patent
Raju et al.

(10) Patent No.: US 12,117,876 B2
(45) Date of Patent: Oct. 15, 2024

(54) HINGE ASSEMBLY AND GUIDE ASSEMBLY FOR ELECTRONIC DEVICES USING A HEAT CARRYING MEMBER

(71) Applicant: Intel Corporation, Santa Clara, CA (US)

(72) Inventors: Prakash Kurma Raju, Bangalore (IN); Samarth Alva, Bangalore (IN); Bhavaneeswaran Anbalagan, Bengaluru (IN); Triplicane Gopikrishnan Babu, Bengaluru (IN); Prasanna Pichumani, Bangalore (IN); Raghavendra Doddi, Bangalore (IN); Sudheera Sudhakar, Bangalore (IN); Ritu Bawa, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 17/100,849

(22) Filed: Nov. 21, 2020

(65) Prior Publication Data

US 2021/0103317 A1   Apr. 8, 2021

(51) Int. Cl.
*G06F 1/16* (2006.01)
*G06F 1/20* (2006.01)

(52) U.S. Cl.
CPC .......... *G06F 1/1681* (2013.01); *G06F 1/1618* (2013.01); *G06F 1/203* (2013.01); *G06F 2200/203* (2013.01)

(58) Field of Classification Search
CPC ...... G06F 1/1681; G06F 1/1618; G06F 1/203; G06F 2200/203
See application file for complete search history.

(56) References Cited

U.S. PATENT DOCUMENTS

| 5,190,883 A | 3/1993 | Menigaux et al. |
| 5,588,483 A | 12/1996 | Ishida |

(Continued)

FOREIGN PATENT DOCUMENTS

| CN | 1505463 A | 6/2004 |
| WO | 2016179304 A1 | 11/2016 |

OTHER PUBLICATIONS

EPO Extended European Search Report in EP Application Serial No. 20194490.7 dated Feb. 11, 2021 (11 pages).

(Continued)

*Primary Examiner* — Mukundbhai G Patel
(74) *Attorney, Agent, or Firm* — Alliance IP, LLC

(57) ABSTRACT

An electronic device may comprise a first chassis, a second chassis, and a hinge assembly configured to rotatably couple the first and second chassis together. The hinge assembly may include a guide unit including a first guide member and a second guide member disposed on opposite sides of a hinge plane and spaced to define a passage area therebetween. The hinge assembly may further include a biasing member configured to move the guide unit such that the passage area of the guide unit traverses the hinge plane in a first direction as the first chassis rotates from a closed position to a fully rotated position. The electronic device may also include a heat carrying member having one end disposed in the first chassis, a second end disposed in the second chassis, and a middle portion extending through the passage area. The size of the passage area may remain fixed.

25 Claims, 28 Drawing Sheets

(56) References Cited

U.S. PATENT DOCUMENTS

| | | | |
|---|---|---|---|
| 5,621,613 | A | 4/1997 | Haley et al. |
| 5,646,822 | A | 7/1997 | Bhatia et al. |
| 5,781,409 | A | 7/1998 | Mecredy, III |
| 5,796,581 | A | 8/1998 | Mok |
| 5,822,187 | A | 10/1998 | Garner et al. |
| 5,832,987 | A | 11/1998 | Lowry et al. |
| 5,847,925 | A | 12/1998 | Progl et al. |
| 5,910,883 | A | 6/1999 | Cipolla et al. |
| 5,975,195 | A | 11/1999 | Lowry et al. |
| 5,992,155 | A | 11/1999 | Kobayashi et al. |
| 6,052,280 | A | 4/2000 | Dilley et al. |
| 6,064,565 | A | 5/2000 | Ishihara et al. |
| 6,075,696 | A | 6/2000 | Progl et al. |
| 6,097,597 | A | 8/2000 | Kobayashi |
| 6,141,216 | A | 10/2000 | Holung et al. |
| 6,198,625 | B1 | 3/2001 | Leman |
| 6,226,177 | B1 | 5/2001 | Rude et al. |
| 6,249,426 | B1 | 6/2001 | O'Neal et al. |
| 6,324,055 | B1 | 11/2001 | Kawabe |
| 6,353,529 | B1 | 3/2002 | Cies |
| 6,377,452 | B1 | 4/2002 | Sasaki et al. |
| 6,512,670 | B1 | 1/2003 | Boehme et al. |
| 6,595,269 | B2 | 7/2003 | Mitchell |
| 6,741,456 | B2 | 5/2004 | Sellers |
| 7,050,293 | B2 | 5/2006 | Arbisi et al. |
| 7,236,355 | B2 | 6/2007 | Kim |
| 7,417,863 | B2 | 8/2008 | Park |
| 7,548,414 | B2 | 6/2009 | Hung |
| 7,573,710 | B2 | 8/2009 | Morino et al. |
| 7,663,877 | B2 | 2/2010 | Goto |
| 7,969,739 | B2 | 6/2011 | Tsunoda et al. |
| 8,385,991 | B2 | 2/2013 | Wang et al. |
| 8,537,529 | B2 | 9/2013 | Qiu et al. |
| 8,675,363 | B2 | 3/2014 | Crooijmans et al. |
| 9,490,860 | B2 | 11/2016 | Wu |
| 10,120,421 | B1 | 11/2018 | Hong et al. |
| 10,488,898 | B2 | 11/2019 | Shah |
| 11,206,748 | B2 | 12/2021 | Doddi et al. |
| 2012/0020045 | A1 | 1/2012 | Tanase |
| 2013/0027886 | A1 | 1/2013 | Crooijmans et al. |
| 2018/0092253 | A1 | 3/2018 | Qiu et al. |
| 2018/0284855 | A1 | 10/2018 | North et al. |
| 2018/0284856 | A1 | 10/2018 | Shah |
| 2019/0041922 | A1* | 2/2019 | Kurma Raju ........ H05K 7/2039 |
| 2019/0146561 | A1 | 5/2019 | Escamilla et al. |
| 2019/0179377 | A1 | 6/2019 | Singh et al. |
| 2019/0317572 | A1 | 10/2019 | North et al. |
| 2019/0317576 | A1 | 10/2019 | North et al. |
| 2020/0033911 | A1 | 1/2020 | Moser |
| 2020/0120832 | A1* | 4/2020 | Doddi .................. G06F 1/1681 |
| 2020/0218314 | A1 | 7/2020 | Hui et al. |
| 2020/0310496 | A1 | 10/2020 | Quinn et al. |

OTHER PUBLICATIONS

EPO Extended European Search Report in EP Application Serial No. 21197807.7 mailed on Mar. 11, 2022 (9 pages).

\* cited by examiner

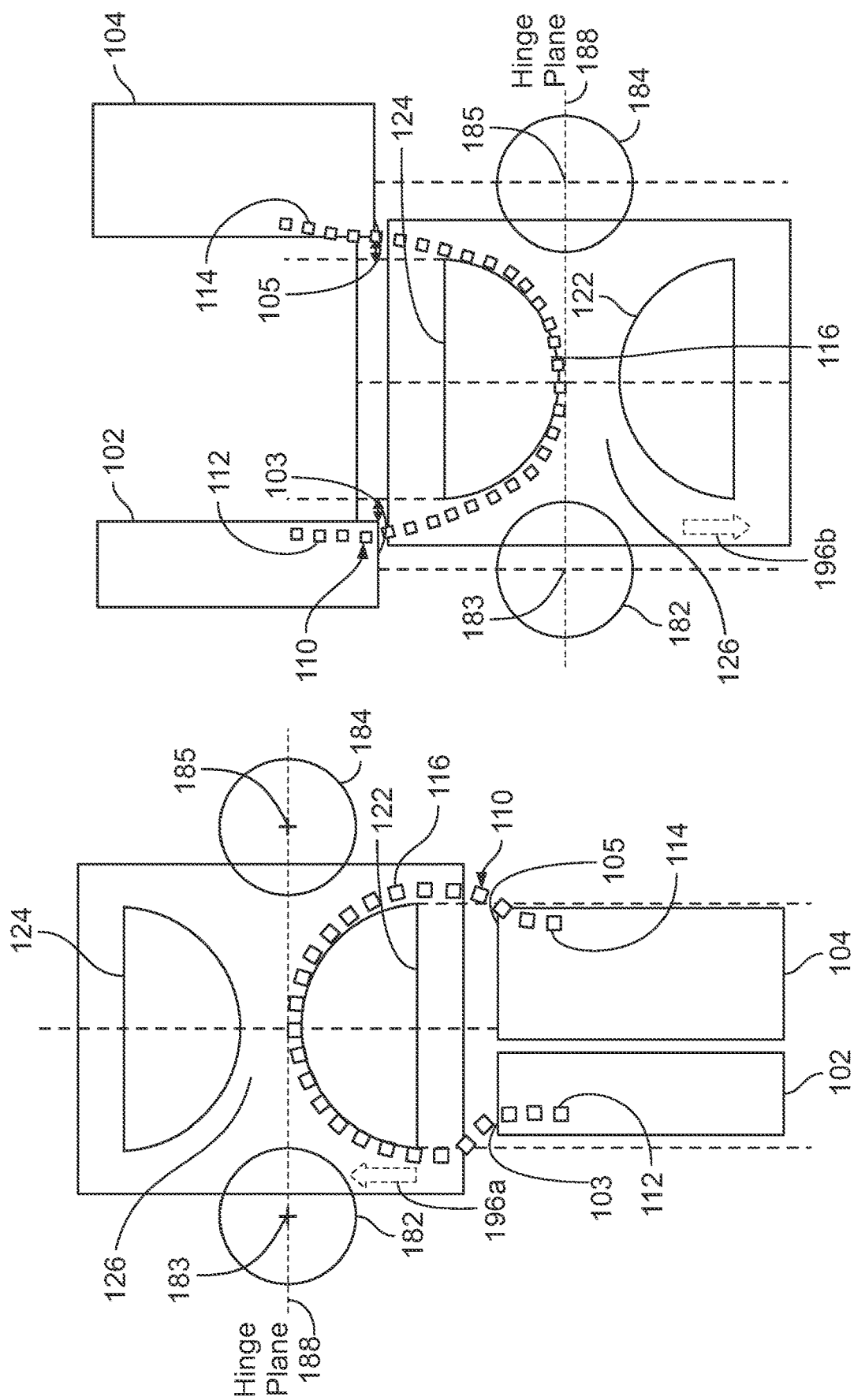

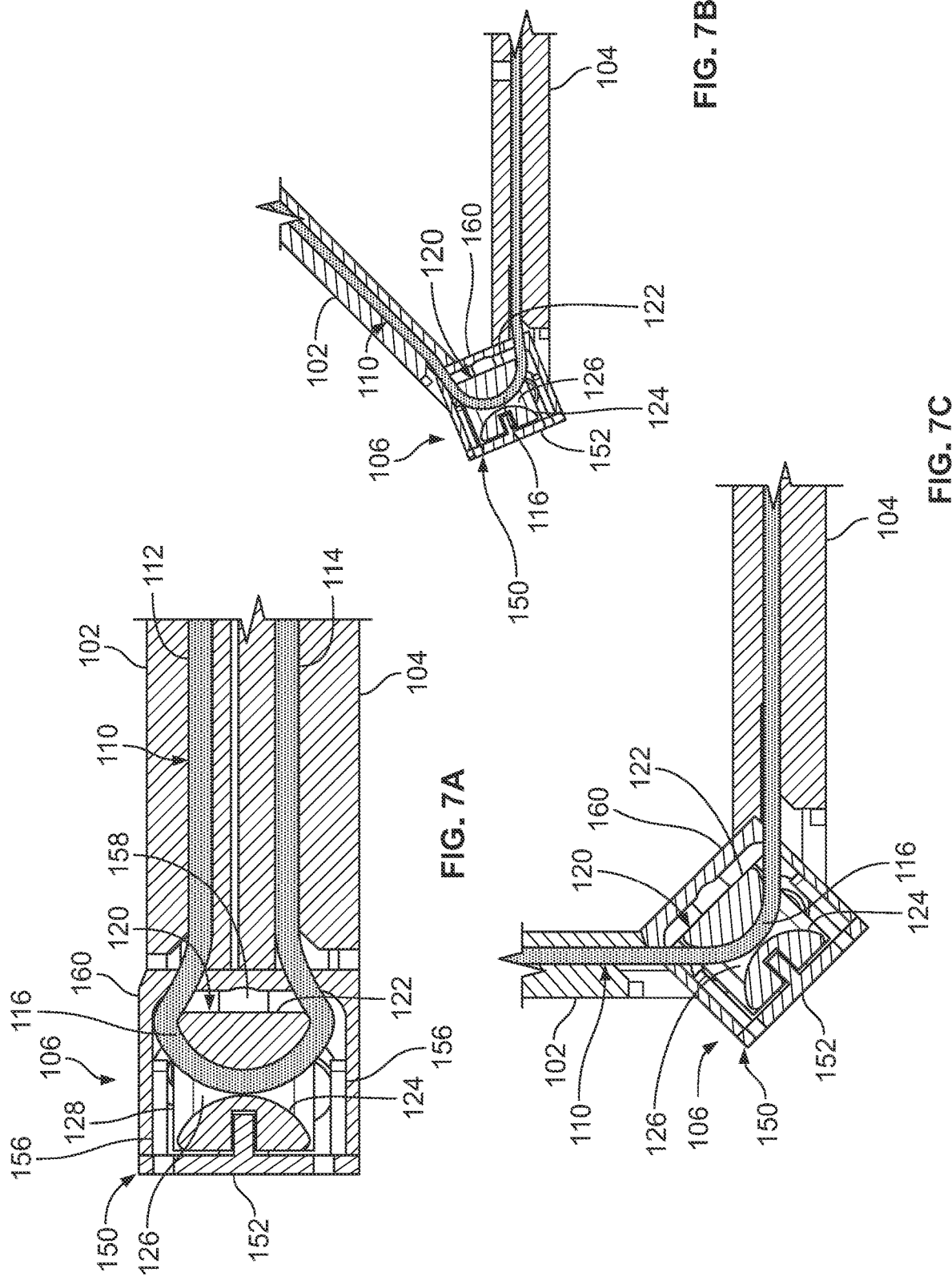

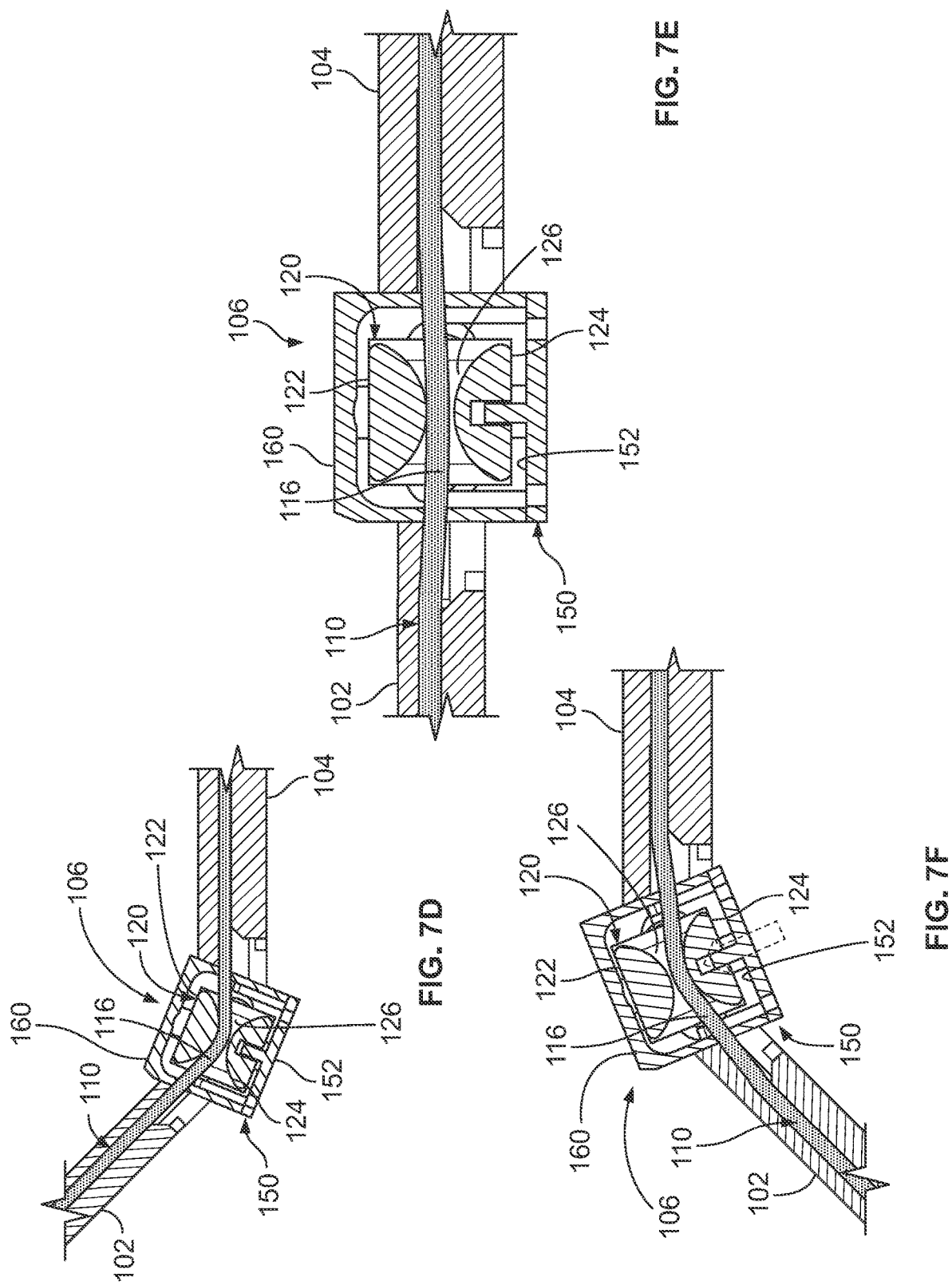

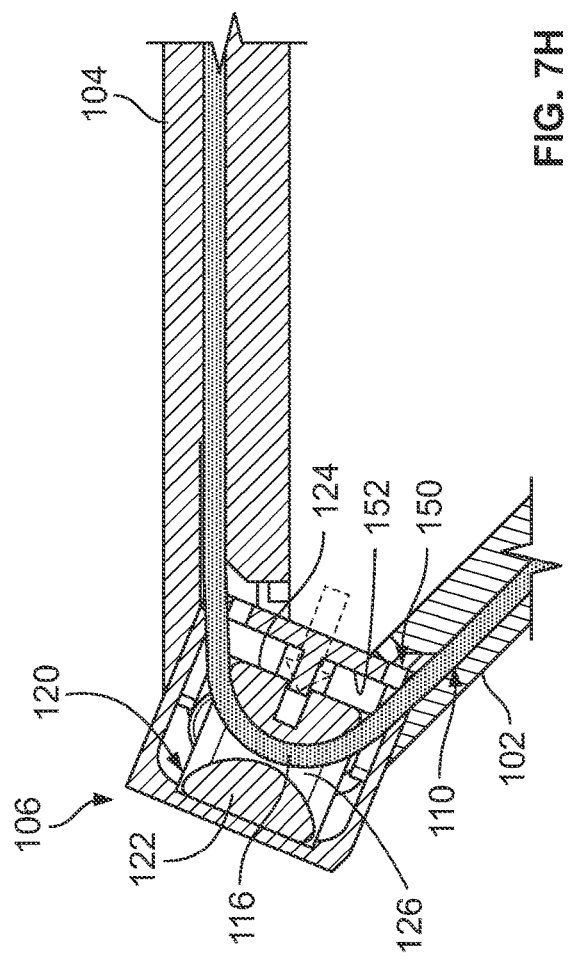
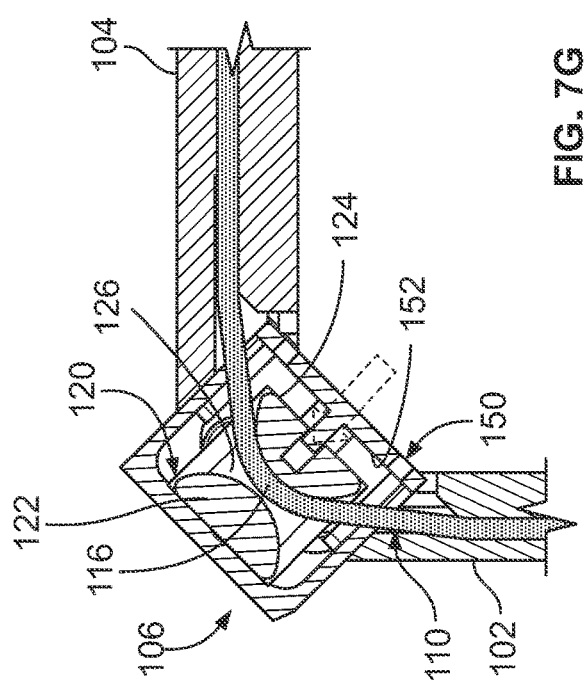
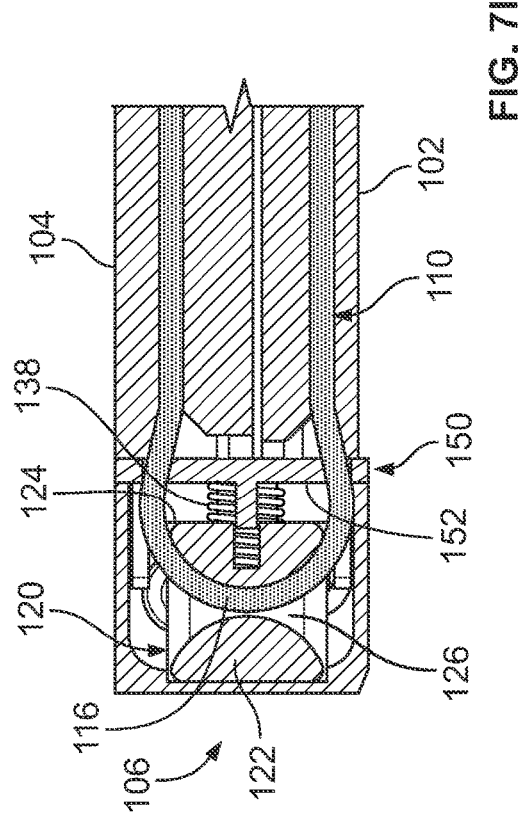

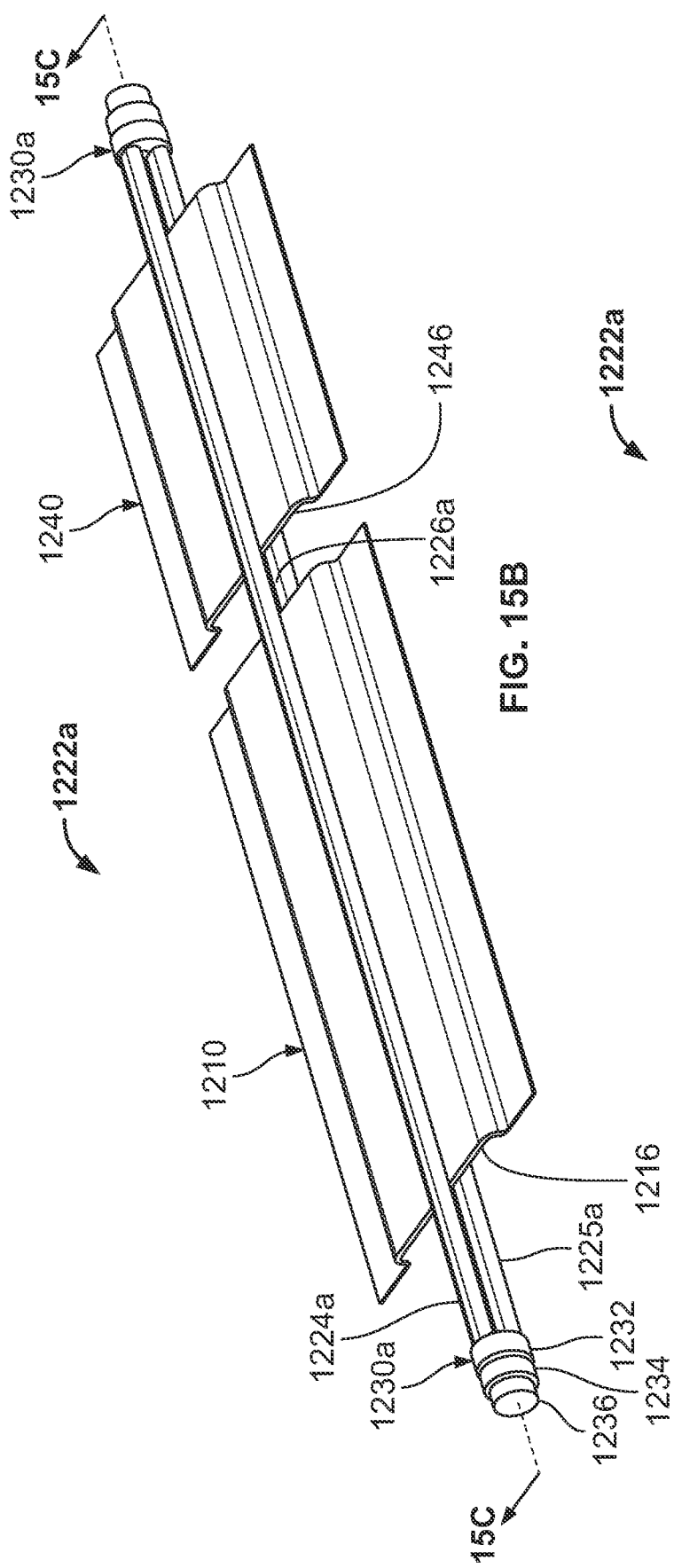
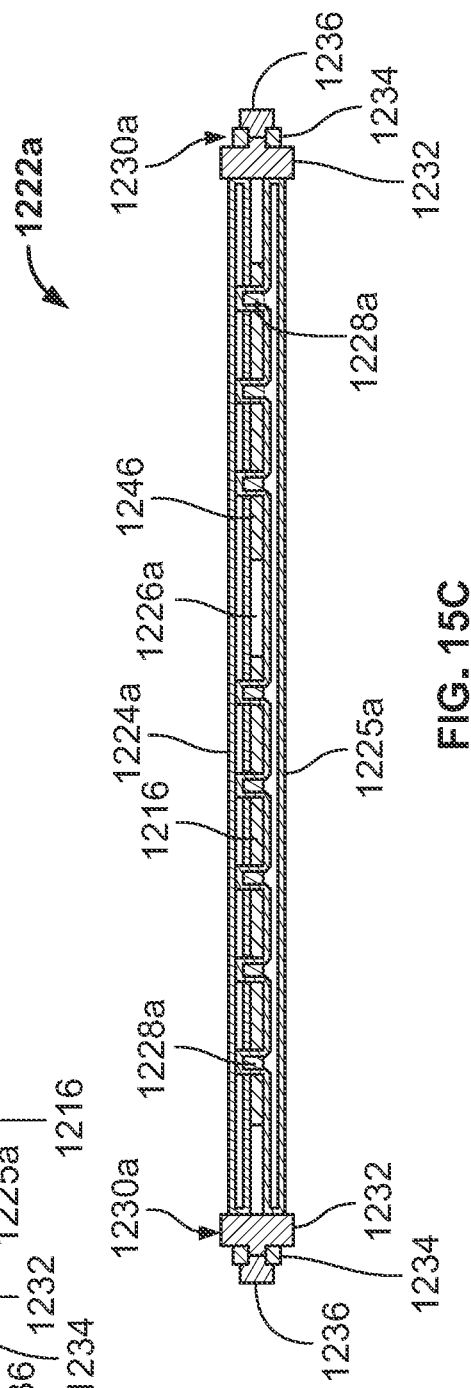
FIG. 15B
FIG. 15C

HINGE ASSEMBLY AND GUIDE ASSEMBLY FOR ELECTRONIC DEVICES USING A HEAT CARRYING MEMBER

TECHNICAL FIELD

This disclosure relates in general to the field of computing, and more particularly, to a hinge assembly and a guide assembly for electronic devices using a heat carrying member.

BACKGROUND

As technology evolves, electronic devices offer increasingly more features and functionalities. New features and functionalities are often coupled with the creation of thinner and lighter systems and are typically associated with increased thermal demands on a system. For example, new generations of electronic devices often experience significant increases in total system power as well as power density. Increased thermal demands can affect system performance by causing hardware, such as a hard drive and processor, to slow down. Thus, both compute and memory resources can be negatively impacted when thermal demands are high. Consequently, designing thinner and lighter systems with maximized system performance is challenging.

BRIEF DESCRIPTION OF THE DRAWINGS

FIG. 6A is a schematic diagram illustrating a cross-sectional view of a hinge assembly of an electronic device in a closed position according to one or more embodiments.

FIG. 6B is a schematic diagram illustrating a cross-sectional view of a hinge assembly of an electronic device in a fully rotated position with according to one or more embodiments.

FIGS. 7A-7I are cross-sectional views of a hinge assembly and heat carrying member in various positions during rotational movement of an electronic device according to one or more embodiments.

FIG. 15B is an isometric view of one roller of a guide assembly with a heat carrying member and a flexible printed circuit (FPC) according to one or more embodiments.

FIG. 15C is a cross-sectional view of one guide unit of a guide assembly for an electronic device according to one or more embodiments.

Like reference numbers and designations in the various drawings indicate like elements.

DETAILED DESCRIPTION OF EXAMPLE EMBODIMENTS

Figure 1A:
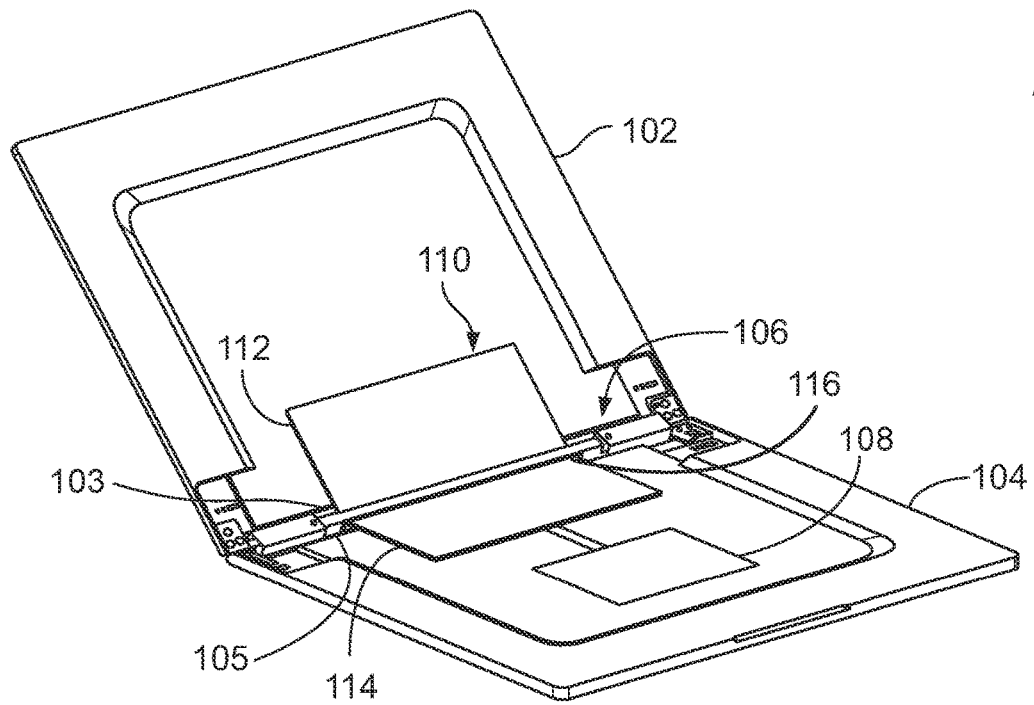
FIG. 1A is an isometric view of an electronic device in an example open position with a hinge assembly and a heat carrying member according to one or more embodiments.

The present disclosure provides various possible embodiments, or examples, of systems, methods, and apparatuses to improve the use of heat carrying members for cooling heat producing components in electronic devices. A heat carrying member can spread the heat produced by heat sources from one area of an electronic device to another area and thus enable more effective heat dissipation from the device. Various embodiments disclosed herein improve heat dissipation by a heat carrying member that is extended between two chassis (e.g., lid and base, primary display and secondary display, etc.) of an electronic device (e.g., a laptop, a notebook, a dual display system, a convertible laptop/tablet, etc.). A guide unit provides a passage area through which a heat carrying member and possibly a flexible printed circuit (FPC) can be extended between the two chassis. In one embodiment disclosed herein, a hinge assembly can include a single guide unit configured to ensure that a curve length of a heat carrying member remains substantially the same when one chassis is rotated relative to the other chassis (or as both chassis are rotated relative to each other). In another embodiment disclosed herein, a different guide unit is coupled to each chassis and a separate hinge may facilitate rotation of one chassis relative to the other. A heat carrying member and optionally, a flexible printed circuit (FPC), can be secured to the two guide units to maintain a curve length of the heat carrying member and the FPC and to prevent deformations as a chassis is rotated about the hinge.

To better understand the techniques of the various embodiments in this disclosure, the following contextual information related to the challenges of shared cooling in electronic devices is now provided. As electronic devices such as laptops continue to evolve, these devices are being designed to accommodate ever growing features and capabilities while often trying to reduce the thickness (or depth) of the chassis. Consequently, total system power as well as power density of a system on chip (SoC) and other computer architectures are continuing to increase in new designs. Heat sources such as compute devices (e.g., processors, graphical processing units, etc.) and other high power components are often concentrated within one chassis (e.g., a base, a secondary display chassis, etc.) of an electronic device, while the other chassis (e.g., a lid with a display, a primary display chassis, etc.) houses relatively low power components. Thus, the bulk of the thermal demands may originate in the chassis that houses the major heat sources.

Cooling the heat sources in an electronic device such as a laptop can be complicated, especially when the heat sources are concentrated in a particular chassis. In some electronic devices, a fan may be used to cool system components. A fan requires a certain amount of real estate within the device, however, while current trends in electronic devices are moving toward thinner and lighter designs. Consequently, for some electronic device designs, the real estate needed to accommodate a fan may not be available or desirable, or some other reason (e.g., cost, design choice, increase in power consumption, etc.) may prevent the inclusion of a fan in the design.

One example of these passively cooled systems is an ultrathin three hundred sixty degree (360°) convertible device. Typically, in a passively cooled convertible system, heat is dissipated from the base because the base contains the most significant heat sources. Heat dissipation from the system may be limited to the surface area available on one chassis. Additionally, one use of a convertible device involves the base lying flat against a surface such as a table or desk. Such use can hinder heat dissipation as air flow through and around the chassis may be limited. Thus, heat produced in a base that houses high power components may not be sufficiently dissipated to protect the integrity of those components. If cooling is shared with another chassis, however, the cooling capacity may be increased by 25-30% in some estimations and device performance may be significantly improved.

One method of sharing cooling between two chassis of an electronic device includes extending a heat carrying member from one chassis to another chassis to spread the heat from the dominant heat producing chassis to the other chassis. Avoiding damage to a heat carrying member in a device due to repeatedly opening and closing the device, however, can present significant challenges. In one approach, a sheet of graphite is used as a heat carrying member in an electronic device and is also used as a driver to displace a moving member to ensure that the graphite layers' minimum bend radius is maintained throughout the entire movement of a lid (i.e., from 0° to 360° angles of rotation) relative to a base of the electronic device. The use of a heat carrying member to act as a driver of another moving member, however, may cause stress on the graphite layer and require a thick reinforcement by a microfabric layer to prevent tearing or degradation of the graphite sheet. A thick heat carrying member, however, may compromise the space available for a flexible printed circuit (FPC), a battery, and other components.

Another concern in electronic device designs involves achieving a desirable screen to body ratio. Higher screen to body ratio may be constrained in thinner devices by hinge cable routing space requirements. Lesser wire routing space availability at the hinge is another key design limiter.

Hinge Assembly with Movable Guide Unit

A hinge assembly for systems using a heat carrying member between rotatable chassis, as disclosed herein, can solve these issues (and more). A hinge assembly 106 as shown in FIG. 1A, for example, offers an improved approach for effectively sharing cooling in systems having two (or more) chassis that are rotatable relative to each other. Such systems can include, but are not necessarily limited to convertible systems where the range of motion of a chassis relative to another chassis may be from zero degrees to three hundred sixty degrees (0°-360°), or typical display systems where the range of motion of one chassis relative to another chassis may be from zero degrees (0°) to one hundred eighty degrees (180°) or somewhat less. The hinge assembly is configured to allow a heat carrying member to extend from one chassis of the system (e.g., a lid or primary display), through a guide unit of the hinge assembly, and into a second chassis of the system (e.g., a base or second display). The hinge assembly is further configured to ensure that an overall length (also referred to herein as 'curve length') of a middle portion of the heat carrying member is maintained as the middle portion transforms from a first curve to a generally inverted curve when the first and/or second chassis is rotated from a closed position (e.g., 0°) to a fully rotated position (e.g., 360°) and vice versa. In an embodiment, the hinge assembly can use a uniquely designed cam element fitted to an existing hinge rotation mechanism (e.g., of a 360° convertible system) that interacts with a spring-loaded moving guide unit. The specially designed cam profile prevents stress (e.g., stretching, taughtness, bending, etc.) from happening to the heat carrying member throughout the range of motion of one or both chassis from a closed position (e.g., 0°) to a fully rotated position (e.g., 360°) and vice versa. In at least one embodiment, the heat carrying member may be a graphite layer that carries and spreads the heat, and the graphite layer may be at least partially enclosed in a protective layer such as microfabric. A microfabric-graphite-microfabric layer sandwich may help prevent any wear and tear of the graphite layers.

A hinge assembly for systems using heat carrying members as shown and described herein can provide many advantages. The hinge assembly can be used in compute devices (e.g., convertibles or typical display systems, etc.) with higher performance of the system on a chip (SOC) in ultrathin systems, for example, where the system is approximately 10-11 mm in thickness. In at least one embodiment, the specially designed cam can be retrofitted to an existing hinge with slight modification. Furthermore, the hinge assembly provides an easy way to route flexible printed circuits (FPCs) when sandwiched between microfabric material layers. Since the heat carrying member avoids stress in this hinge assembly design, a thinner protective membrane, such as a microfabric layer, can be potentially be used to cover the heat carrying member, which may be a graphite sheet for example. Also, the specially designed guide unit may allow for a slight inclination of the base (e.g., 3-5°) when the base is arranged on a substantially flat surface such as a table or desk. This configuration can provide an improved user keyboard experience.

Turning to FIG. 1A, FIG. 1A is an isometric interior view of a convertible electronic device 100 in an open position configured with a hinge assembly 106 and a heat carrying member 110 according to one or more embodiments. In this example, electronic device 100 includes a first chassis 102 and a second chassis 104. In at least one embodiment, first chassis 102 may include a display (shown in FIG. 1C), and second chassis 104 may house one or more heat sources 108. Heat sources 108 can include compute (e.g., central processing unit (CPU), graphics processing unit (GPU), etc.) and/or other high power components, for example.

Hinge assembly 106 can rotatably couple first chassis 102 to second chassis 104. First chassis 102 may be capable of rotation relative to second chassis 104, and second chassis 104 may be capable of rotation relative to first chassis 102. In at least one embodiment, electronic device 100 is convertible, in which first chassis 102 is rotatable between zero degrees (0°) and three hundred sixty degrees (360°) relative to second chassis 104, and/or second chassis 104 is rotatable between zero degrees (0°) and three hundred sixty degrees (360°) relative to first chassis 102. Although electronic device 100 is illustrated as a convertible laptop, embodiments herein may be implemented in numerous other types of devices that are not necessarily convertible. While a convertible laptop may have a range of rotation from zero to three hundred sixty degrees (0°-360°), other devices implemented with hinge assembly 106 with movable guide unit 120 can have less than a three hundred sixty degree (360°) range of rotation. In one non-limiting example, a typical laptop may have a first chassis that has a range of rotation from zero to approximately one hundred eighty degrees (0°-180°) relative to a second chassis.

Heat carrying member 110 can extend from within first chassis 102, through hinge assembly 106, into second chassis 104. Heat carrying member 110 includes a first chassis portion 112 disposed in first chassis 102, a second chassis portion 114 disposed in second chassis 104, and a middle portion 116 extending through hinge assembly 106 and disposed between the first chassis and the second chassis. In one example, first chassis portion 112 of heat carrying member 110 may be disposed behind a display (shown in FIG. 1C) contained in first chassis 102. Similarly, second chassis portion 114 of heat carrying member 110 may be disposed behind a keyboard, a second display, or any other outwardly facing user interface or other components contained in second chassis 104.

Heat carrying member 110 may be configured to facilitate shared cooling between first chassis 102 and second chassis 104. In this example, most heat associated with electronic device 100 is generated by heat sources 108 in second chassis 104. Heat sources 108 can include compute (e.g., central processing unit (CPU), graphical processing unit (GPU), etc.) and other high power components, for example. Second chassis portion 114 of heat carrying member 110 can be configured to receive heat from heat sources 108 and to transfer at least some of the heat received from heat sources 108 to first chassis portion 112 of heat carrying member 110 by the heat flowing through middle portion 116 to first chassis portion 112. First chassis 102 may provide additional surface area through which the thermal energy that spreads into first chassis portion 112 can escape. Thus, use of heat carrying member 110 can facilitate heat dissipation via the surface areas of first chassis 102, in addition to heat dissipation already occurring in second chassis 104. Consequently, heat produced in one area (e.g., heat sources 108) can be spread across electronic device 100, which can increase cooling capacity and prevent damage to heat sources 108 and other components in close proximity to heat sources 108.

In at least one embodiment, heat carrying member 110 can be securely attached to the two chassis. For example, first chassis portion 112 of heat carrying member 110 may be securely attached within first chassis 102, and second chassis portion 114 of heat carrying member 110 may be securely attached within second chassis 104. Any suitable attachment means may be used to securely attach heat carrying member 110 to first chassis 102 and second chassis 104 (e.g., fasteners, screws, nuts, bolts, adhesive, etc.). Such attachment means may attach the heat carrying member directly to the two chassis and/or to one or more components or elements within two chassis. Middle portion 116 of heat carrying member 110, however, can be permitted to float and may not be securely attached to any particular structure between an inner edge 103 of first chassis 102 and an inner edge 105 of second chassis 104, where the inner edge of first chassis 102 is generally parallel to and opposes the inner edge of second chassis 104. In particular, middle portion 116 may not be securely attached to movable guide unit 120.

Figure 1B:
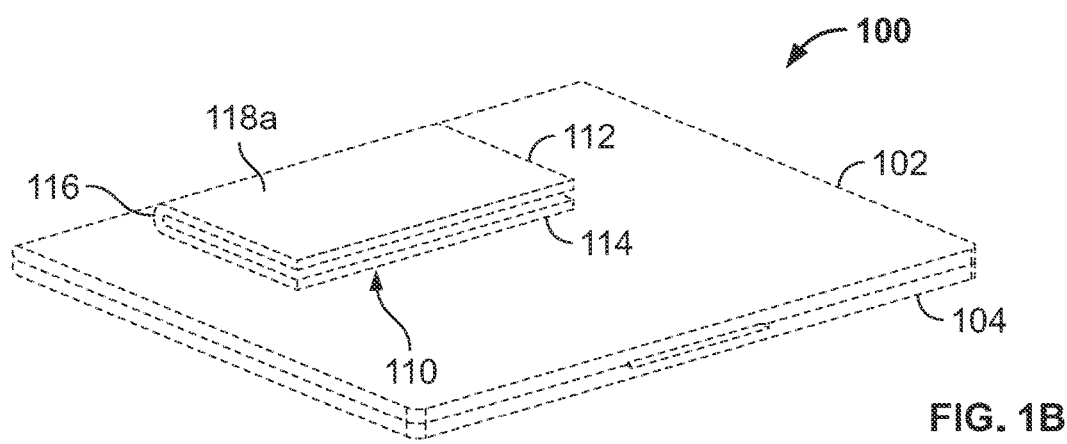
FIG. 1B is an isometric view of an electronic device with a hinge assembly and a heat carrying member in a closed position according to one or more embodiments.

FIG. 1B is an isometric view of convertible electronic device 100 in a closed position. First chassis portion 112 of heat carrying member 110 is shown extending into first chassis 102. Middle portion 116 of heat carrying member 110 forms a generally curved profile in the closed position. Although first chassis portion 112 of heat carrying member 110 is illustrated in a generally rectangular shape sized to extend across a large area of first chassis 102, first chassis portion 112 may be different dimensions and/or shapes, depending on particular implementations and needs of electronic device 100. As shown in FIG. 1B, in the closed position, first chassis 102 and second chassis 104 are substantially parallel and thus define an angle of rotation of zero degrees (0°) relative to each other. From an open position, such as the open position shown in FIG. 1A, first chassis 102 may be rotated generally about hinge assembly 106 toward second chassis 104 until first chassis 102 is substantially parallel to second chassis 104 and no angle is defined in between. In the closed position, a display contained in first chassis 102 can oppose second chassis 104 such that the display is at least partially hidden from view. In one non-limiting example, second chassis 104 may contain a keyboard, touchpad, or other user interface, or a second display opposing the display in first chassis 102.

Figure 1C:
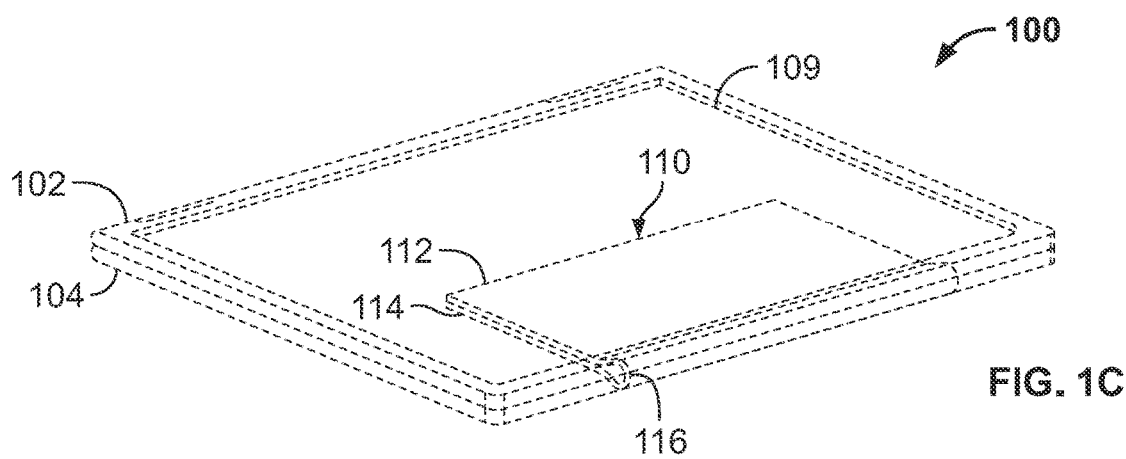
FIG. 1C is an isometric view of an electronic device with a hinge assembly and a heat carrying member in a fully rotated position according to one or more embodiments.

FIG. 1C is an isometric view of convertible electronic device 100 in a fully rotated position. Middle portion 116 of heat carrying member 110 forms a generally curved profile in the fully rotated position. As shown in FIG. 1C, in the fully rotated position, first chassis 102 and second chassis 104 are substantially parallel and define an angle of approximately three hundred sixty degrees (360°). From the closed position, first chassis 102 may be rotated approximately three hundred sixty (360°) relative to second chassis 104 until first chassis 102 is substantially parallel to second chassis 104. In the fully rotated position, a display 109 contained in first chassis 102 faces outwardly, away from second chassis 104, to provide a tablet configuration.

As shown in FIG. 1B and FIG. 1C, when the electronic device is in the fully rotated position, the curved profile of middle portion 116 of heat carrying member 110 is generally inverted from the curved profile of the middle portion when the electronic device is in the closed position. The middle portion 116 adapts to the profiles of guide members provided in hinge assembly 106, which will be shown and described herein. Without proper support in hinge assembly 106, heat carrying member 110 (and especially the middle portion 116) could be damaged during the rotational movement of one chassis relative to the other. For example, rotational movement of a chassis may cause heat carrying member 110 to experience a bend, warp, fold, crease, or other deformity. Some hinges that include support to minimize deformities in a heat carrying member may instead (or in addition) cause stress to be applied to a middle portion and possibly other areas of the heat carrying member that can result in stretching, taughtness, tearing, or other degradation of the heat carrying member. Over time, stress can cause a heat carrying member such as a graphite sheet to lose the integrity of its properties, which can detrimentally affect its overall performance.

Hinge assembly 106 is designed to substantially or totally prevent stress to the heat carrying member while simultaneously preventing deformation of the heat carrying member during rotational movement of the first chassis relative to the second chassis, or vice versa, or simultaneous rotational movement of the first and second chassis. Hinge assembly 106 is configured to accommodate heat carrying member in a rotational range from a closed position at zero degrees (0°), in which middle portion 116 adapts to a first profile of curved surface of a first guide member of hinge assembly 106, to a fully rotated position at three hundred sixty degrees (360°), in which middle portion 116 adapts to a generally inverted second profile of a second guide member of hinge assembly 106.

In at least one embodiment, a flexible printed circuit (FPC) may also be routed from second chassis 104, through hinge assembly 106, to first chassis 102. In this embodiment, the FPC may replace one or more cables that carry electrical signals between chassis 102 and 104. For example, in a traditional laptop, an FPC may carry electrical signals from a CPU or GPU in second chassis 104 to a display 109 in first chassis 102. Touch screen functionalities in display 109 may detect input at display 109 and carry electrical signals representing the touch input to compute elements in second chassis 104.

In an example implementation, electronic device 100 is intended to include a computer, a laptop (e.g., clamshell with screen on one of its inner sides and a user interface such as a keyboard on the opposite inner side facing the display), subnotebook or ultraportable (e.g., a laptop having a smaller more portable design) or ultraportable, a netbook (e.g., laptop especially suited for wireless communication), a convertible (e.g., device with combination of features from laptops and tablets), desktop replacement (e.g., larger device that is a transportable alternative to a desktop computer), rugged laptop (e.g., laptop designed to work in harsh conditions), business laptop (e.g., designed for use in a workplace), a personal digital assistant (PDA), an electronic notebook, a mobile phone, or any other device having a heat source (e.g., CPUs, GPUs, memory elements, displays, etc.), and at least two chassis, where at least one of the chassis is rotatable about a hinge relative to the other chassis. In one example, electronic device 100 may be implemented as a converged mobility device. Although electronic device 100 is shown having one display 109 in first chassis 102 and a user interface and/or other components in second chassis 104, it should be apparent that, in other embodiments, two or more displays may be provided in an electronic device configured with hinge assembly 106 and movable guide unit 120. Other such embodiments may be configured with two or more chassis at least some of which are rotatable generally about a hinge assembly 106 that connects at least two or more chassis. Additionally, two or more of the chassis may contain a display. Various user interfaces and/or other components may be provided in one or more of the chassis such as, for example, a keyboard, a touchpad, a fingerprint sensor, a camera, a microphone, an audio device, and any other user interface or other components.

Figure 2:
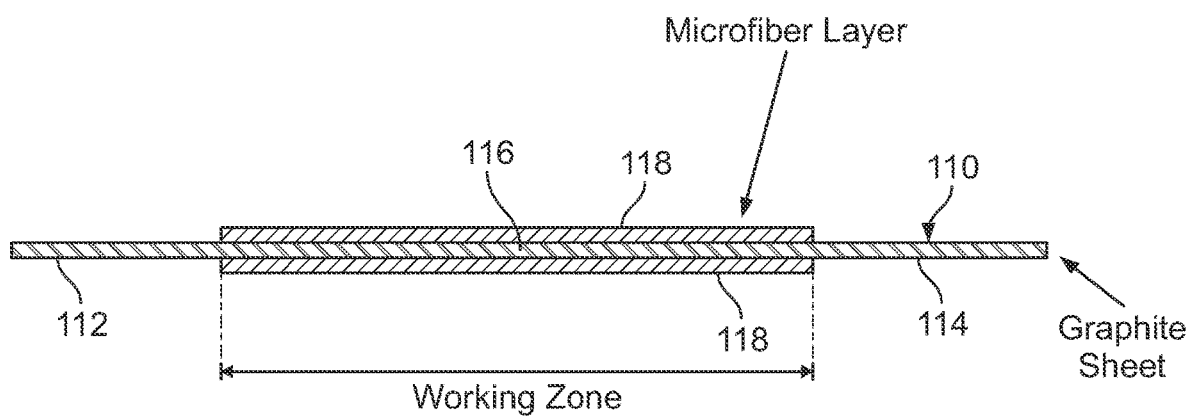
FIG. 2 is a cross-sectional view of a heat carrying member with a protective layer according to one or more embodiments.

FIG. 2 is a cross-sectional view of one example implementation of heat carrying member 110 for electronic device 100. In this example, a "bend area" or "working zone" of heat carrying member 110 may be sandwiched between protective layers 118. The bend area may comprise middle portion 116 of heat carrying member 110 or a part thereof. Heat carrying member 110 may be made of any material having sufficiently high thermal conductivity to enable the heat carrying member to transfer thermal energy from a heat source in one chassis to another chassis, and sufficient yield strength to enable middle portion 116 of heat carrying member 110 to transform between a first curved profile to a generally inverted second curved profile, repeatedly without breaking or becoming permanently deformed. Examples of possible materials that may be used to implement heat carrying member 110 include, but are not necessarily limited to, graphite, copper, and aluminum. In one nonlimiting example, heat carrying member 110 may be formed from a graphite sheet of approximately 0.1 mm thickness (or depth) having conductivity greater than 700 W/mK.

Protective layers 118 protect heat carrying member 110 from physical damage as well as ensuring that the hot surface does not come into contact with a user. In at least one embodiment, protective layers 118 can be bonded to the bend area of heat carrying member 110. In other embodiments, protective layers 118 can be extended to sandwich first chassis portion 112, second chassis portion 114, or parts of chassis portions 112 and/or 114. Protective layers 118 may be made of any material that is sufficiently heat-resistant to withstand heat transferred via heat carrying member 110 and that is strong enough to provide at least some protection from wear and tear and other potential external damage. In one example, protective layers 118 may be made of a microfabric material, which provides durability and stain resistance. Examples of microfabric material that may be used can include but are not necessarily limited to synthetic fibers such as polyester, polyamides (e.g., nylon, aramid, trogamide, etc.), polypropylenes, or any suitable combination thereof.

In one or more other examples, at least one additional protective layer may be used between protective layers 118 and heat carrying member 110. These additional protective layers may be made from a nickel titanium ally (e.g., nitinol) or from a thin plastic later (e.g., polypropylene) and may be configured having 0.15 mm maximum thickness, in one possible example. It should be noted that protective layers 118 and optionally, the additional protective layers as described herein may also be employed to protect a flexible printed circuit (FPC) if an FPC is implemented with hinge assembly 106.

Figure 3A:
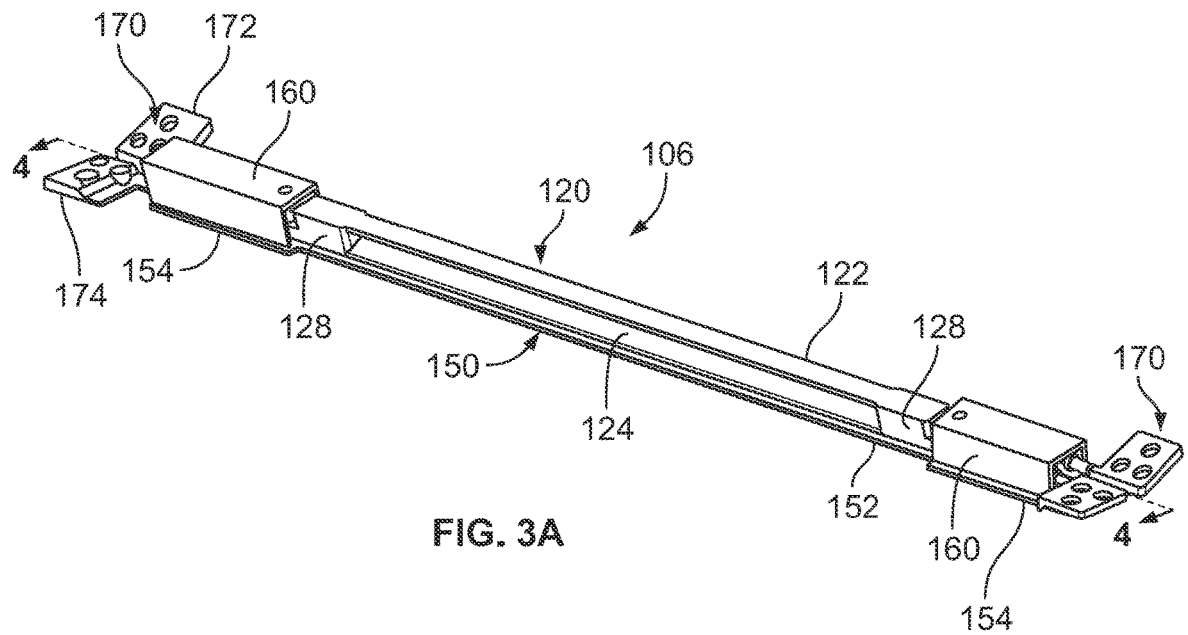
FIG. 3A is an isometric view of a hinge assembly for an electronic device using a heat carrying member according to one or more embodiments.

Turning to FIG. 3A, FIG. 3A is an isometric view of hinge assembly 106 for an electronic device such as electronic device 100. In at least one embodiment, hinge assembly 106 can include a movable guide unit 120, end frames 160, an outer frame 150, and rotation mechanisms 170. End frames 160 can be connected to outer frame 150 using any suitable means of attachment that joins or affixes the outer frame 150 to end frames 160 in a permanent configuration or non-permanent configuration including, but not necessarily limited to any suitable type of fasteners, screws, nuts, bolts, welding, bonding, etc. In one example, frame brackets 154 on a bottom plate 152 of outer frame 150 may be joined or attached to respective bottom sides or flanges of end frames 160. End frames 160 and outer frame 150 can also be configured to couple rotation mechanisms 170 to movable guide unit 120. Each rotation mechanism 170 may include an attachment mechanism to attach hinge assembly 106 to first and second chassis 102 and 104 on left and right sides of the two chassis. In one example, each rotation mechanism can include a first hinge bracket 172 configured for attachment to first chassis 102 (not shown in FIG. 3A) and a second hinge bracket 174 configured for attachment to second chassis 104 (not shown in FIG. 3A).

Movable guide unit 120 may be configured with a first guide member 122 and a second guide member 124, which are arranged to be at least substantially parallel. First guide member 122 may include a longitudinal flat surface and corresponding longitudinal convex surface that, at least generally, form a half cylinder shape. Second guide member 124 may include a longitudinal flat surface and corresponding longitudinal convex surface that, at least generally, form a half cylinder shape. First guide member 122 and second guide member 124 may be disposed between guide end portions 128. The convex surfaces of first and second guide members 122 and 124 may face each other in a spaced apart parallel arrangement to define a passage area 126 (shown in FIG. 4) therebetween. In at least one example, first and second guide members 122 and 124 may be configured and arranged as mirror images of each other.

Figure 3B:
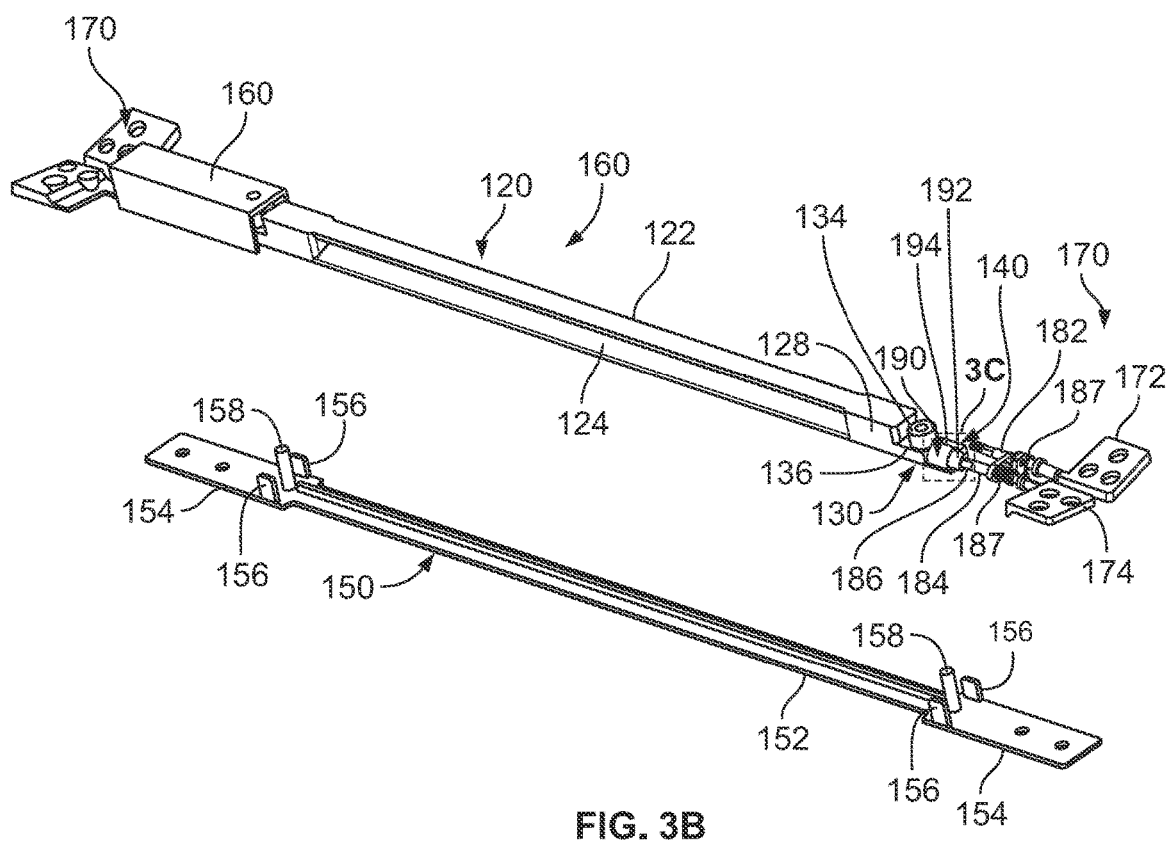
FIG. 3B is a partially exploded view of a hinge assembly for an electronic device with an interior view of one side according to one or more embodiments.

FIG. 3B is an isometric view of hinge assembly 106 for an electronic device such as electronic device 100, having end frame 160 on the right side of hinge assembly 106 removed for an interior view. As shown in FIG. 3B, first hinge bracket 172 can be coupled to a first shaft 182 such that rotation of first hinge bracket 172 about a longitudinal axis of the first shaft can direct rotation of first shaft 182 about its longitudinal axis. Second hinge bracket 174 can be coupled to a second shaft 184 such that rotation of second hinge bracket 174 about a longitudinal axis of the second shaft can direct rotation of second shaft 184 about its longitudinal axis. Torque elements 187 can be cooperatively configured on first and second shafts 182 and 184 to enable the shafts to rotate about their longitudinal axes while also providing resistance to the motion. The resistance allows first and second chassis 102 and 104 (shown in FIG. 1A, for example) attached to first and second hinge brackets 172 and 174, respectively, to be easily positioned in a desired angle relative to each other. Torque elements 187 also allow one shaft to be rotated about the other shaft when the other shaft remains still. For example, if second chassis 104 remains on a surface (e.g., a table) while first chassis 102 is rotated to a closed position, first shaft 182 can rotate about its own longitudinal axis and can also rotate about second shaft 184 until first chassis 102 is in the closed position. In one nonlimiting example, torque elements 187 may be configured as helical gears mounted on parallel shafts 182 and 184 to enable equal and opposite rotation of the parallel shafts 182 and 184. However, it should be apparent that any other suitable gears (e.g., spur gears, etc.) or other mechanisms may be used based on particular needs and implementations.

The longitudinal axes of first shaft 182 and second shaft 184 can define a hinge plane of hinge assembly 106, and guide members 122 and 124 can be disposed on opposite sides of the hinge plane. When hinge assembly 106 is actuated (e.g., by first chassis 102 being rotated relative to second chassis 104, by second chassis 104 being rotated relative to first chassis 102, of by simultaneous rotation of first and second chassis 102 and 104), movable guide unit 120 may move away from outer frame 150. Additionally, the passage area defined between first guide member 122 and second guide member 124 of movable guide unit 120 may traverse the hinge plane at one or more angles of rotation. Movement of movable guide unit 120 may be facilitated by certain elements of hinge assembly 106. In at least one embodiment, a cam 190 is rotatably coupled to second shaft 184 and is operably coupled to movable guide unit 120 to enable movement of movable guide unit 120 in response to rotation of cam 190, which will be further described herein.

In at least one embodiment, a longitudinal extension 130 may be coupled to and aligned with second guide member 124. Guide end portion 128 can be disposed between longitudinal extension 130 and the guide members 122 and 124. Longitudinal extension 130 may include an upper housing 134 that defines an upper cavity and a lower housing 136 that defines a lower cavity. Longitudinal extension 130 may also include a ramp portion 140, which can be aligned with second guide member 124. The upper cavity of upper housing 134 and the lower cavity of lower housing 136 may be axially aligned to form an elongated cavity shaped and sized to receive a frame extension 158 from outer frame 150 and a biasing member 138 (shown in FIG. 3D, for example), which may surround frame extension 158 in one example.

The biasing member may be designed in any suitable manner to achieve appropriate biasing to cause movable guide unit 120 to move away from outer frame 150 as first chassis 102 is rotated in a first rotational direction relative to second chassis 104, and to cause movable guide unit 120 to move toward outer frame 150 when first chassis 102 is rotated in a second rotational direction relative to second chassis 104, where the first rotational direction is opposite the second rotational direction. In at least one embodiment, the first rotational direction is rotation about a first hinge axis (e.g., longitudinal axis of first shaft 182) toward a fully rotated position (360°) and the second rotational direction is rotation about a second hinge axis (e.g., longitudinal axis of first shaft 182) toward a closed position (0°). It should be noted that second chassis 104 rotates in a rotational direction that is opposite to the rotational direction of first chassis 102 to achieve a particular position (e.g., closed, fully rotated, or open at another angle of rotation).

Outer frame 150 can include bottom plate 152, frame brackets 154 at either end of bottom plate 152, side extension pairs 156, and frame extensions 158. Frame extension 158 may extend into or through an opening in a top side of the corresponding end frame 160. In addition, side extension pairs 156 of outer frame 150 may be received within an interior space defined by the corresponding end frame 160. Frame extension 158 can help keep movable guide unit 120 in a desired alignment relative to outer frame 150 as movable guide unit 120 moves away from or toward bottom plate 152 of outer frame 150 as first chassis 102 is rotated away from or toward second chassis 104.

It should be noted that, in one or more embodiments, the elements on the right side of hinge assembly 106 shown in FIG. 3B that may be covered by an end frame 160 (e.g., first and second shafts 182 and 184, torque elements 187, cam 190, longitudinal extension 130, etc.), may have complementary elements provided on the opposite or left side of hinge assembly 106. These complementary elements on the opposite side of hinge assembly 106 may also be covered by an end frame 160. It should be noted that longitudinal axes of first and second shafts coupled to hinge brackets on the left side of hinge assembly 106 can be aligned with the longitudinal axes of first and second shafts 182 and 184, respectively, which are shown in FIG. 3B.

Figure 3C:
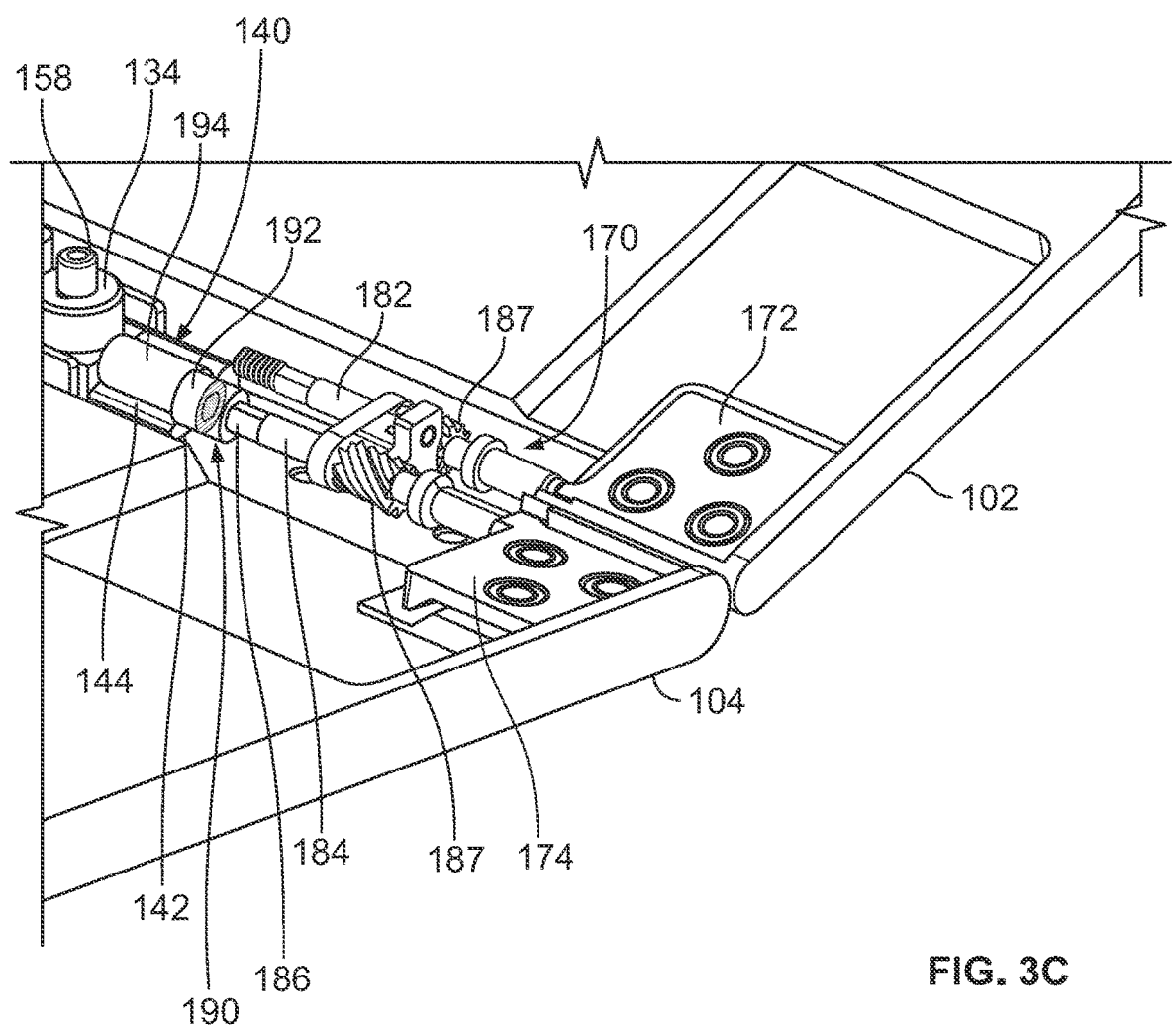
FIG. 3C is a cut away interior view of one side of a hinge assembly for an electronic device according to one or more embodiments.

FIG. 3C is a cut away view on the right side of hinge assembly 106 according to one or more embodiments. Cam 190 includes an inner portion 192 and an outer portion 194. In at least one embodiment, inner portion 192 is coupled to a distal end 186 of second shaft 184 such that rotation of second shaft 184 causes corresponding rotation of cam 190. Inner portion 192 can have a substantially cylindrical outer profile and can share a longitudinal axis of rotation with second shaft 184. Outer portion 194 of cam 190 can be offset from the longitudinal axis of inner portion 192 of cam 190. Outer portion 194 of cam 190 may be configured to movably engage ramp portion 140 of longitudinal extension 130. Ramp portion 140 may include a lower surface 142 and an upper angled surface 144, which is engaged by outer portion 194 of cam 190. In at least one embodiment, lower surface 142 of ramp portion 140 can be aligned with the longitudinal flat surface of second guide member 124.

Distal end 186 of second shaft 184 may be rotatably coupled to inner portion 192 of cam 190 to enable rotation of cam 190 about a longitudinal axis of second shaft 184. In at least one embodiment, distal end 186 of second shaft 184 may have a non-circular perimeter and inner portion 192 of cam 190 may define an opening shaped to accommodate distal end 186 in an interference fit. In one example, distal end 186 may have an oblong perimeter and the opening defined by inner portion 192 may be formed in an oblong shape sized to receive distal end 186. It should be apparent, however, that any shape that enables an interference fit may be used to configure an interference fit between distal end 186 and inner portion 192. Moreover, any other suitable means of attachment (e.g., screws, bolts, fasteners, bonding, etc.) that enable rotation of the cam may be used based on particular needs and implementations.

Figure 3D:
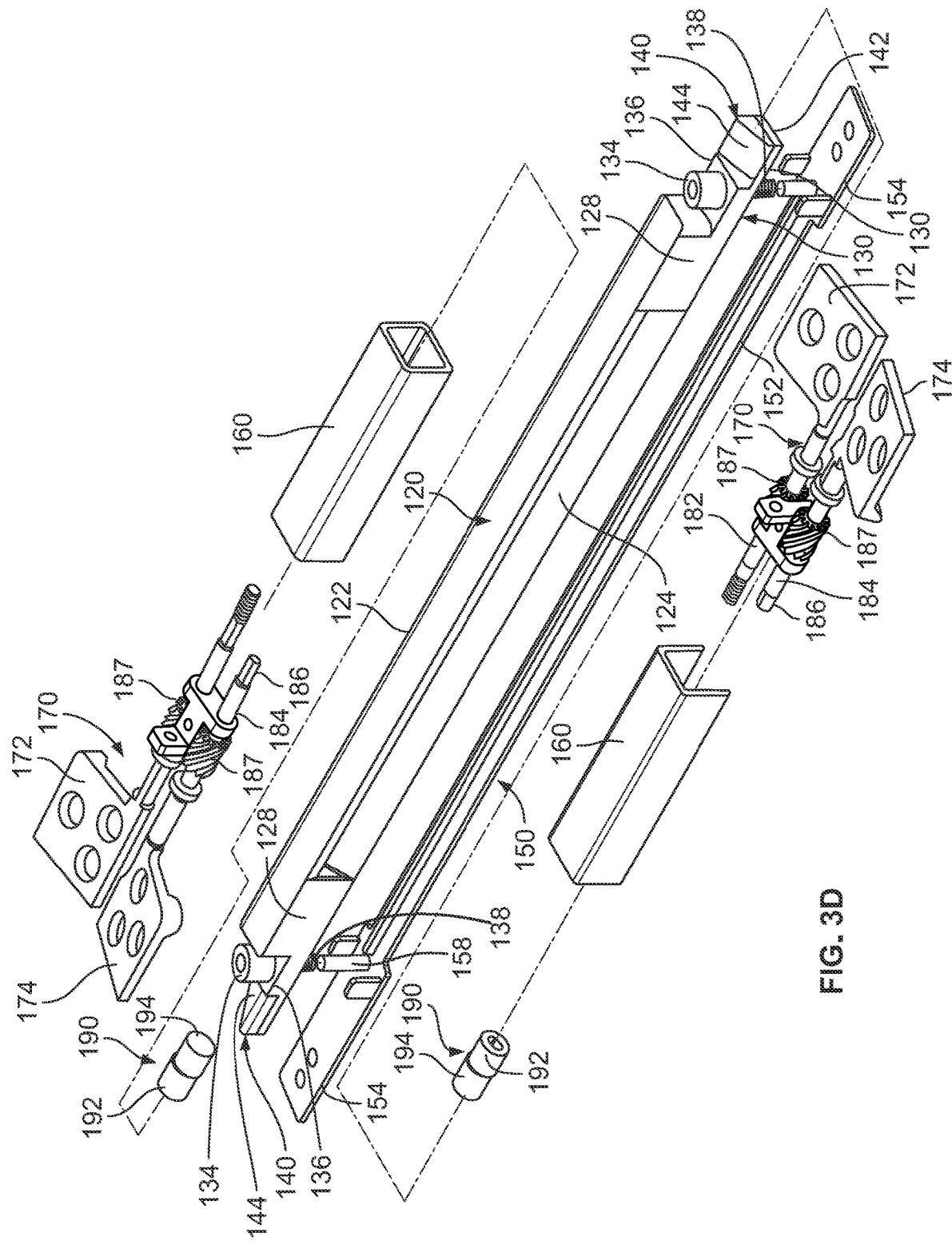
FIG. 3D is an exploded view of a hinge assembly for an electronic device according to one or more embodiments.

FIG. 3D is an exploded view of hinge assembly 106 according to one or more embodiments. In at least one embodiment, hinge assembly 106 can include movable guide unit 120, end frames 160, outer frame 150, and rotation mechanisms 170. Movable guide unit 120 includes first guide member 122, second guide member 124, guide end portions 128, and longitudinal extensions 130. First guide member 122 may be at least generally shaped as a half-cylinder. Second guide member 124 may be at least generally shaped as a half-cylinder.

Guide end portions 128 can be integral with (or separate parts connected to) each end of first and second guide members 122 and 124. Guide end portions 128 can also be integral with (or separate parts connected to) longitudinal extensions 130. Each longitudinal extension 130 includes lower housing 136, upper housing 134, and ramp portion 140. Hinge assembly 106 also includes cams 190, which each include inner portion 192 and outer portion 194. Rotation mechanisms 170 each include first hinge bracket 172 coupled to first shaft 182 and second hinge bracket 174 coupled to second shaft 184. Torque elements 187 are connected to first and second shafts 182 and 184. Each second shaft 184 includes distal end 186 in an oblong shape in this example.

Longitudinal extension 130 can be configured in any suitable manner to include ramp portion 140, upper housing 134, and lower housing 136. For example, longitudinal extension 130 could be molded, shaped, or otherwise formed to include lower housing 136 and/or ramp portion 140 as integral parts of longitudinal extension 130. In some embodiments, upper housing 134 may be integral with, or may be joined or attached to lower housing 136 to create an elongated cavity for receiving frame extension 158 of outer frame 150 and biasing member 138. Biasing member 138 may be an elastic object that stores mechanical energy and that is designed in any suitable manner to achieve appropriate biasing to cause (or enable) movable guide unit 120 to move in a first direction away from outer frame 150 as first chassis 102 is rotated in a first rotational direction relative to second chassis 104, and to enable (or cause) movable guide unit 120 to move in a second direction toward outer frame 150 when first chassis 102 is rotated in a second rotational direction relative to second chassis 104. In one example, biasing member 138 may be embodied as a helical spring disposed around frame extension 158 and biased against an upper side of upper housing 134. It should be apparent, however, that numerous types and configurations of biasing members could be used to bias movable guide unit 120 away from outer frame 150. In alternative embodiments, movable guide unit 120 could be reconfigured to use a biasing member that biases movable guide unit 120 toward outer frame 150. Some non-limiting examples of biasing members that may be used in various embodiments include, but are not necessarily limited to, compression springs, extension springs, torsion springs, constant force springs, variable spring, flat spring, machined spring, cantilever spring, etc. It should be noted that movement in the first direction away from the outer frame may be movement that is generally perpendicular to bottom plate 152 of outer frame 150. Movement in the second direction toward the outer frame may be movement that is generally perpendicular to bottom plate 152 of outer frame 150.

Figure 4:
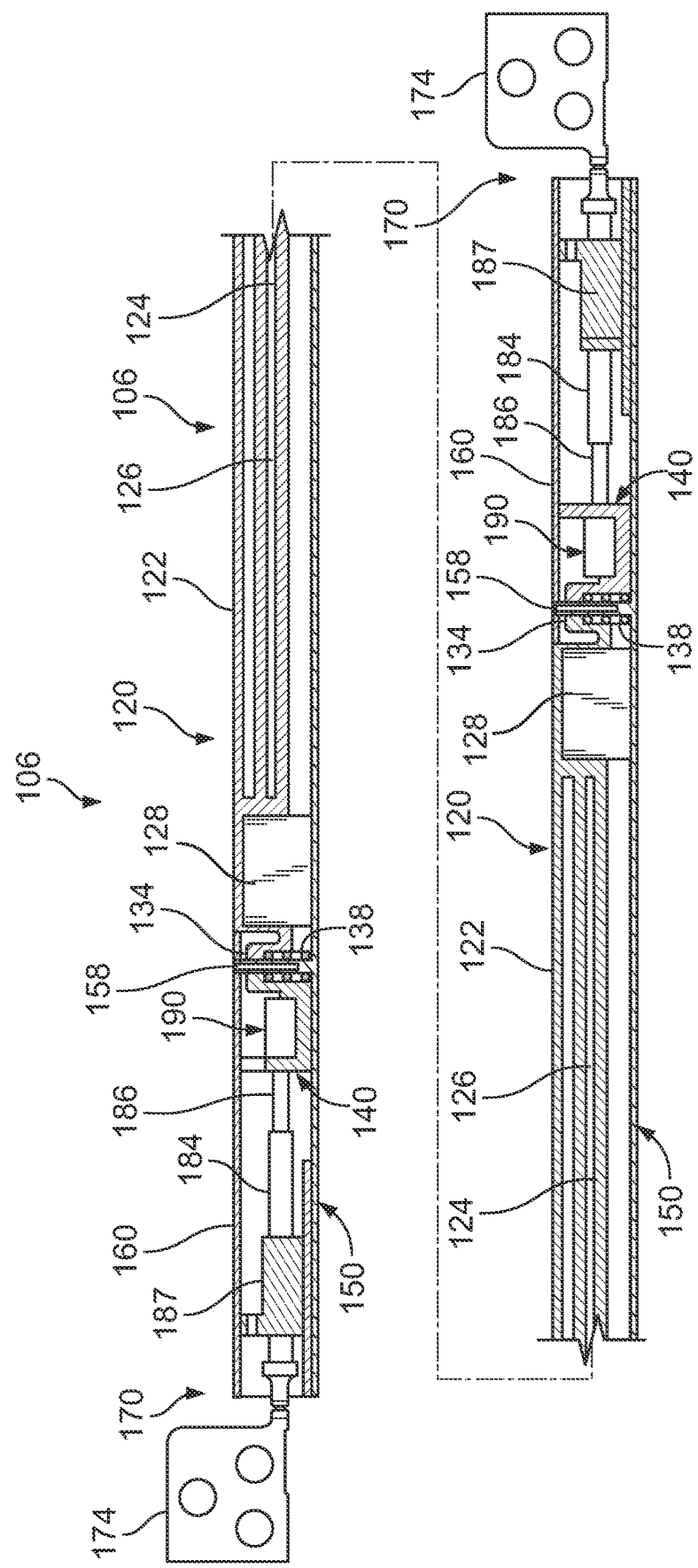
FIG. 4 is a cross-sectional view of a portion of a hinge assembly for an electronic device according to one or more embodiments.

FIG. 4 is a cross-sectional view of a portion of hinge assembly 106 according to one or more embodiments. In at least one embodiment, hinge assembly 106 can include movable guide unit 120, end frames 160, outer frame 150, and rotation mechanism 170. Movable guide unit 120 includes first guide member 122, second guide member 124, guide end portions 128, and longitudinal extensions 130. Each longitudinal extension 130 can include a housing (e.g., lower housing 136 and upper housing 134) and ramp portion 140. Lower housing 136 and upper housing can be axially aligned to form an elongated cavity to receive frame extension 158. Frame extension 158 can extend from outer frame 150 through lower housing 136 and upper housing 134. Biasing member 138 can extend through the elongated cavity and may abut an interior surface of upper housing 134. In at least one embodiment, biasing members can be configured as compression springs surrounding frame extensions 158. Hinge assembly 106 also includes cams 190 on each side of movable guide unit 120. Rotation mechanisms 170 on each end of hinge assembly 106 show second hinge brackets 174 for coupling to second shafts 184. Torque elements 187 are shown connected to second shafts 184. Second shafts can include distal ends 186 fitted within cams 190 in an interference fit. Outer frame 150 may include a bottom plate 152, side extension pairs 156, and frame extensions 158 extending through movable guide unit 120 to slidably connect movable guide unit 120 to outer frame 150. Bottom plate 152 may include frame brackets 154 at each end, which may be connected to end frames 160.

Figure 5A:
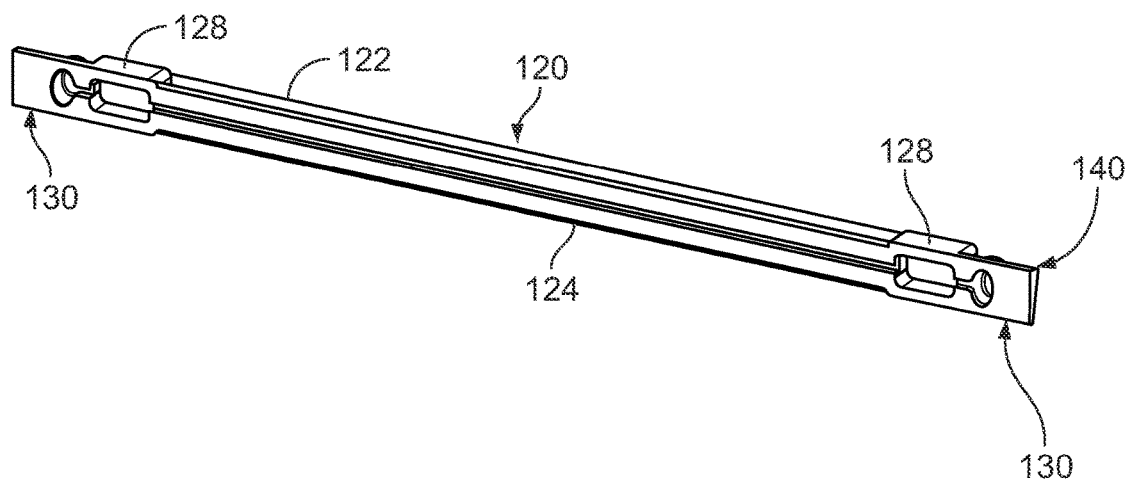
FIG. 5A is an isometric view of a guide unit of a hinge assembly for an electronic device according to one or more embodiments.

FIG. 5A is an isometric view of movable guide unit 120 of hinge assembly 106 according to one or more embodiments. Movable guide unit 120 can include first guide member 122 and second guide member 124. At least a portion of each guide member may be configured with a convex surface and may be arranged so that the convex surfaces of guide members 122 and 124 oppose (or face) each. First and second guide members 122 and 124 are disposed between guide end portions 128. Guide end portions 128 may be configured in any suitable manner to effectively support first guide member 122 and second guide member 124 in a spaced-apart, at least substantially parallel arrangement. Longitudinal extensions 130 may be connected to guide end portions 128. Ramp portions 140 may be formed at the ends of longitudinal extensions 130.

In at least one implementation, movable guide unit 120 (e.g., first and second guide members 122 and 124, guide end portions 128, and longitudinal extensions 130) may be formed from a continuous part with appropriate shaping and/or molding. In other embodiments, first guide member 122, second guide member 124, guide end portions 128 (on each side of guide members 122 and 124), and longitudinal extensions 130 (on each side of guide end portions 128) may be configured partially or entirely from separate parts using any suitable connection means (e.g., fasteners, screws, nuts, bolts, snap fit, welding, etc.).

Figure 5B:
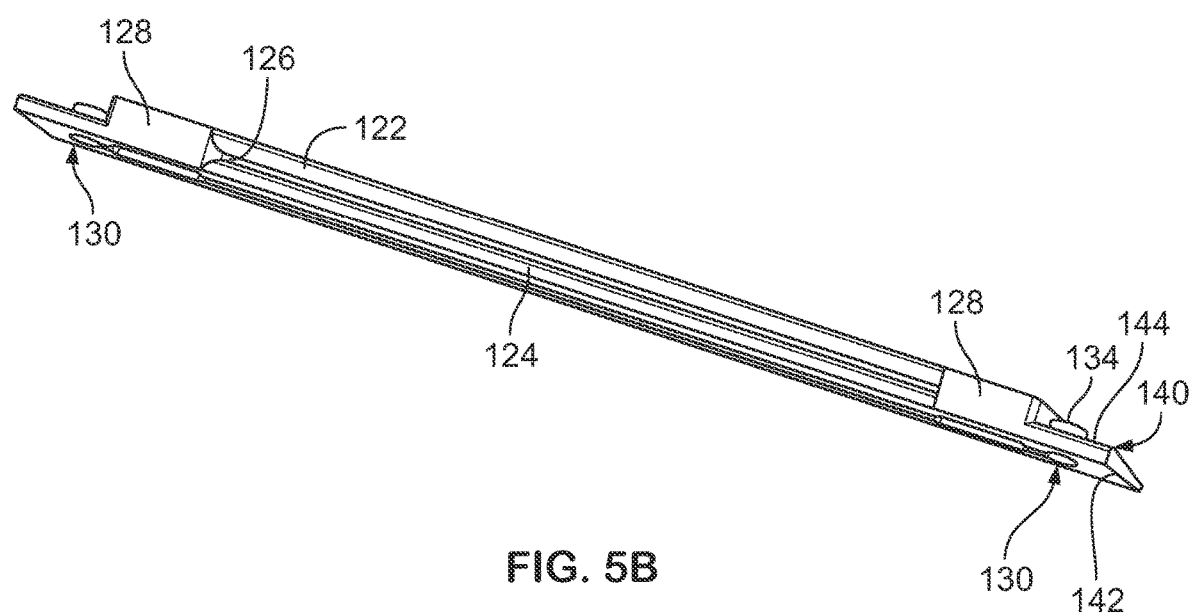
FIG. 5B is another isometric view of a guide unit of a hinge assembly for an electronic device according to one or more embodiments.

FIG. 5B is another isometric view of movable guide unit 120 of hinge assembly 106 according to one or more embodiments. In this view, additional details of longitudinal extensions 130 are illustrated including, for example, upper housings 134, upper angled surfaces 144 of ramp portions 140, and lower surfaces of ramp portions 140. Also shown is passage area 126 defined by the spacing between first guide member 122 and second guide member 124. Passage area 126 can be sized and shaped to receive middle portion 116 of heat carrying member 110, which may include protective layers in at least some embodiments. Guide end portions 128 may be configured at each end of first and second guide members 122 and 124 and may secure the guide members in a fixed, spaced-apart relationship. In at least one embodiment the spacing between first and second guide members 122 and 124 remains fixed when hinge assembly 106 is actuated, for example when used to open or close an electronic device (e.g., rotation of first chassis 102 relative to second chassis 104). Thus, the shape and size of passage area 126 can remain fixed when the first and/or second chassis are rotated between a closed position and a fully rotated position.

Figure 5C:
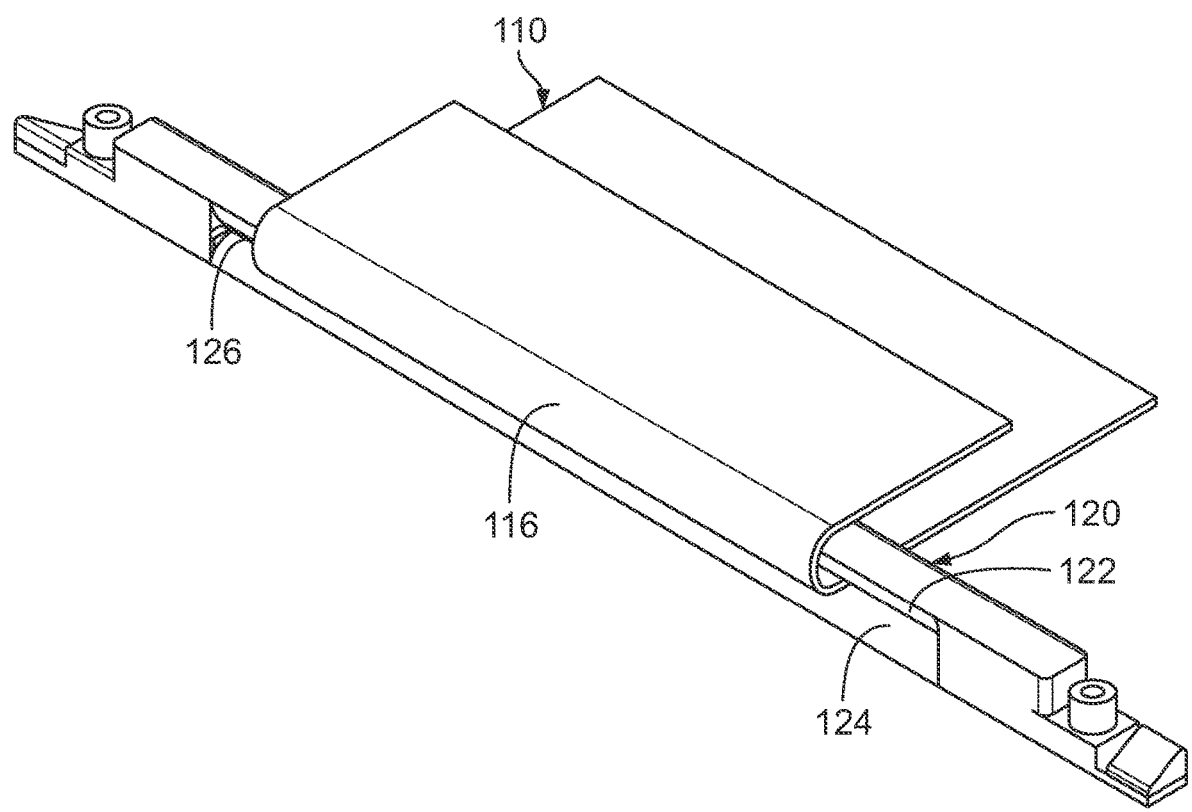
FIG. 5C is another isometric view of a guide unit of a hinge assembly with a heat carrying member extended therethrough according to one or more embodiments.

FIG. 5C is an isometric view of heat carrying member 110 extended through movable guide unit 120 according to one or more embodiments. The opposing convex surfaces of the guide members 122 and 124 are arranged in a spaced apart configuration to define passage area 126 between the opposing convex surfaces. Passage area 126 can be sized to allow heat carrying member 110 to be extended therethrough, as shown in FIG. 5C. In at least one embodiment, middle portion 116 of heat carrying member 110, and potentially one or more protective layers (e.g., microfiber layer), are disposed in passage area 126 between the convex surfaces of the guide members 122 and 124.

FIG. 6A is a schematic diagram illustrating a cross-sectional view of hinge assembly 106 in a closed position. In the closed position, first chassis 102 and second chassis 104 are at least substantially parallel and define an angle of rotation of approximately zero degrees (0°). In one example, display 109 (shown in FIG. 2B, for example) in first chassis 102 may face second chassis 104. First shaft 182 can be rotatable about its longitudinal axis, which can extend through a center 183 of first shaft 182. Second shaft 184 can be rotatable about its longitudinal axis, which can extend through a center 185 of second shaft 184. The longitudinal axes of first shaft 182 and second shaft 184 can define a hinge plane, the cross section of which is shown at 188 in FIG. 6A. Guide members 122 and 124 can be disposed on opposite sides of hinge plane 188 and, in at least one embodiment, hinge plane 188 can be parallel to bottom plate 152 of outer frame 150 (shown in FIGS. 7A-7I, for example) and can remain parallel to bottom plate 152 during rotation of first and second chassis between the open position and the fully rotated position.

Middle portion 116 of heat carrying member 110 may extend from a first chassis inner edge 103 where the heat carrying member 110 enters the first chassis, to a second chassis inner edge 105 where heat carrying member 110 enters the second chassis. At least part of middle portion 116 can be disposed in passage area 126, which is defined between the first guide member 122 and second guide member 124. In at least one embodiment, in the closed position, hinge plane 188 is adjacent to first guide member 122. More specifically, a mid-point of the convex surface of first guide member 122 can be aligned with hinge plane 188, and middle portion 116 of heat carrying member 110 can form a curve along the convex surface of first guide member 122.

As first chassis 102 is rotated about first shaft 182 toward the closed position shown in FIG. 6A, a moving means can move movable guide unit 120 such that guide unit 120 (and more specifically, the passage area 126 defined by guide unit 120) traverses hinge plane 188 in a first linear direction as indicated by directional arrow 196a. More generally, during at least some rotational movement of first chassis 102 about a first shaft 182, which causes an angle of rotation relative to second chassis 104 to decrease, movable guide unit 120 can move through hinge plane 188 in the first linear direction toward outer frame 150. The movement of movable guide unit 120 is configured to cause the curve length formed in middle portion 116 of heat carrying member 110 between first chassis inner edge 103 and second chassis inner edge 105 to remain substantially the same during the rotational movement of first chassis 102 that causes an angle of rotation relative to the second chassis 104 to decrease.

FIG. 6B is a schematic diagram illustrating a cross-sectional view of hinge assembly 106 in a fully rotated position. In the fully rotated position, first chassis 102 and second chassis 104 are at least substantially parallel and define an angle of rotation of approximately three hundred sixty degrees (360°). In one example, display 109 (shown in FIG. 2B, for example) in first chassis 102 may face outwardly, away from second chassis 104. In at least one embodiment, in the fully rotated position, hinge plane 188 is adjacent to second guide member 124. More specifically, a mid-point of the convex surface of second guide member 124 can be aligned with hinge plane 188, and middle portion 116 of heat carrying member 110 can form a curve along the convex surface of second guide member 124.

As first chassis 102 is rotated about first shaft 182 toward the fully rotated position shown in FIG. 6B, the moving means can move movable guide unit 120 such that guide unit 120 (and more specifically, the passage area 126 defined by guide unit 120) traverses hinge plane 188 in a second linear direction as indicated by directional arrow 196b. More generally, during at least some rotational movement of first chassis 102 about first shaft 182, which causes an angle of rotation relative to second chassis 104 to increase, movable guide unit 120 can move through hinge plane 188 in the second linear direction away from outer frame 150. The movement of movable guide unit 120 is configured to cause the curve length of middle portion 116 of heat carrying member 110 between first chassis inner edge 103 and second chassis inner edge 105 to remain substantially the same during the rotational movement of first chassis 102 that causes an angle of rotation relative to the second chassis 104 to increase.

Turning to FIGS. 7A-7I, FIGS. 7A-7I are cross-sectional views of hinge assembly 106 and heat carrying member 110 in various positions during rotational movement of first chassis 102 of electronic device 100 relative to second chassis 104 from a closed position to a fully rotated position. The cross-sectional views in FIGS. 7A-7I show movable guide unit 120, outer frame 150, end frame 160, and heat carrying member 110. Hinge assembly 106 can be coupled to first chassis 102 and second chassis 104 using hinge brackets 172 and 174 (shown in FIG. 3B, for example). Movable guide unit 120 includes first guide member 122 and second guide member 124, which can be supported in a fixed, spaced apart arrangement such that passage area 126 is defined between the convex surfaces of the guide members 122 and 124. Frame extension 158 of outer frame 150 is received in an elongated cavity of a longitudinal extension (shown in FIG. 3D, for example) of movable guide unit 120 to movably connect movable guide unit 120 to outer frame 150. Frame extension 158 may extend through biasing member 138, which biases movable guide unit 120 away from bottom plate 152 of outer frame 150. For clarity, biasing member 138 is not shown in FIGS. 7A-7H, but is shown only in FIG. 7I. Outer frame 150 can be secured to end frame 160, for example, by frame brackets 154 (shown in FIG. 3D, for example) attached to end frame 160 at a bottom side or flanges, for example. Heat carrying member 110 can extend from first chassis 102, through movable guide unit 120 of hinge assembly 106, and into second chassis 104. Middle portion 116 of heat carrying member 110 can be disposed, at least partially, within passage area 126 defined between the convex surfaces of first guide member 122 and second guide member 124.

FIG. 7A illustrates a cross-sectional view of hinge assembly 106 when first chassis 102 is in a closed position. In this scenario, first chassis 102 and second chassis 104 are at least substantially parallel and define an angle of rotation of approximately zero degrees (0°). In some examples, display 109 (shown in FIG. 1C) in first chassis 102 may face second chassis 104 when first chassis 102 is in the closed position. In at least one embodiment, a means for moving movable guide unit 120 (e.g., cam 190, ramp portion 140, biasing member 138 shown in FIG. 3D, for example) may be configured to hold movable guide unit 120 adjacent to bottom plate 152 of outer frame 150 and thus, to hold the midpoint of the convex surface of first guide member 122 in alignment with hinge plane 188 (shown in FIG. 6A, for example). For example, in the closed position, the cam may be positioned against the ramp portion 140 to overcome the bias of biasing member 138 and thus prevent the biasing member from moving guide unit 120 away from bottom plate 152 of outer frame 150. As illustrated, at least part of middle portion 116 of heat carrying member 110 follows the convex surface of first guide member 122 to form an arc when first chassis 102 is in the closed position. In addition, in the closed position, hinge plane 188 and bottom plate 152 may be configured to be generally perpendicular to first chassis 102 and second chassis 104.

FIG. 7B illustrates a cross-sectional view of hinge assembly 106 when first chassis 102 has been rotated relative to second chassis 104 to increase an angle of rotation to approximately forty-five degrees (45°) from a lesser angle of rotation (e.g., from 0°). In at least one embodiment, the means for moving movable guide unit 120 may be configured to hold movable guide unit 120 adjacent to bottom plate 152 of outer frame 150 and thus, to hold the midpoint of the convex surface of first guide member 122 in alignment with hinge plane 188 (shown in FIG. 6A, for example). For example, when first chassis 102 is rotated to forty-five degrees (45°) from a lesser angle of rotation, the simultaneous rotation of cam 190 may be configured such that the cam remains positioned against ramp portion 140 to overcome the bias of biasing member 138 and thus prevent biasing member from moving guide unit 120. Middle portion 116 of heat carrying member 110 continues to follow most of the convex surface of first guide member 122 when first chassis 102 is rotated to forty-five degrees (45°). In addition, when one chassis is rotated and the other chassis is not rotated, movable guide unit 120, outer frame 150, end frame 160, and hinge plane 188, rotate about the hinge axis of the non-rotating chassis, in the same rotational direction as the rotating chassis, but at approximately half the angle of rotation. Thus, rotation of first chassis 102 to forty five degrees relative to second chassis 104 can result in rotation of hinge plane 188 to approximately one hundred twelve and one-half degrees (112.5°) relative to second chassis 104.

FIG. 7C illustrates a cross-sectional view of hinge assembly 106 when first chassis 102 has been rotated relative to second chassis 104 to increase an angle of rotation to approximately ninety degrees (90°) from a lesser angle of rotation (e.g., from 45°). In at least one embodiment, the means for moving movable guide unit 120 may be configured to hold movable guide unit 120 adjacent to bottom plate 152 of outer frame 150 and thus, to hold the midpoint of the convex surface of first guide member 122 in alignment with hinge plane 188 (shown in FIG. 6A, for example). For example, when first chassis 102 is rotated to ninety degrees (90°) from a lesser angle of rotation, the simultaneous rotation of cam 190 may be configured such that the cam remains positioned against ramp portion 140 to overcome the bias of biasing member 138 and thus prevent biasing member from moving guide unit 120. Middle section 116 of heat carrying member 110 may begin to separate from the edges of the convex surface of first guide member 122 as first chassis 102 is rotated to ninety degrees (90°). In addition, rotation of first chassis 102 to ninety degrees (90°) relative to second chassis 104 can result in rotation of hinge plane 188 to approximately one hundred thirty-five degrees (135°) relative to second chassis 104.

FIG. 7D illustrates a cross-sectional view of a portion of hinge assembly 106 when first chassis 102 has been rotated relative to second chassis 104 to increase an angle of rotation to approximately one hundred thirty-five degrees (135°) from a lesser angle of rotation (e.g., from 90°). In at least one embodiment, the means for moving movable guide unit 120 may be configured to cause movable guide unit 120 and specifically, the passage area 126 defined by the movable guide unit, to begin to move away from bottom plate 152 of outer frame 150 and to traverse (e.g., to move partially through) hinge plane 188 of hinge assembly 106. For example, when first chassis 102 is rotated to one hundred thirty-five degrees (135°) from a lesser angle of rotation, the simultaneous rotation of cam 190 may allow the bias of biasing member 138 to begin to move movable guide unit 120 away from bottom plate 152 and to cause the guide unit and specifically, the passage area 126 defined by guide unit 120, to traverse hinge plane 188 in a first linear direction such that first guide member 122 begins to move away from hinge plane 188 and second guide member 124 begins to move toward hinge plane 188. Middle portion 116 of heat carrying member 110 can follow increasingly less of the convex surface of first guide member 122 as first chassis 102 increases its angle of rotation relative to second chassis 104. In addition, rotation of first chassis 102 to one hundred thirty-five degrees (135°) relative to second chassis 104 can result in rotation of hinge plane 188 to approximately one hundred fifty-seven and one-half degrees (157.5°) relative to second chassis 104.

FIG. 7E illustrates a cross-sectional view of a portion of hinge assembly 106 when first chassis 102 has been rotated relative to second chassis 104 to increase an angle of rotation to approximately one hundred eighty degrees (180°) from a lesser angle of rotation (e.g., from) 135°. In at least one embodiment, the means for moving movable guide unit 120 may be configured to cause the movable guide unit 120 and specifically, the passage area 126 defined by the movable guide unit, to move further away from bottom plate 152 of outer frame 150 and to further traverse hinge plane 188 of hinge assembly 106. For example, when first chassis 102 is rotated to one hundred eighty degrees (180°) from a lesser angle of rotation, the simultaneous rotation of cam 190 may allow the bias of biasing member 138 to move movable guide unit 120 further away from bottom plate 152 and cause the guide unit to traverse hinge plane 188 in the first linear direction such that first guide member 122 moves further away from hinge plane 188 and second guide member 124 moves closer to hinge plane 188. Middle portion 116 of heat carrying member 110 may be generally flat in passage area 126 between the convex surfaces of first guide member 122 and second guide member 124. In addition, rotation of first chassis 102 to one hundred eighty degrees (180°) relative to second chassis 104 can result in rotation of hinge plane 188 to approximately one hundred eighty degrees (180°) relative to second chassis 104.

FIG. 7F illustrates a cross-sectional view of hinge assembly 106 when first chassis 102 has been rotated relative to second chassis 104 to increase an angle of rotation to approximately two hundred twenty-five degrees (225°) from a lesser angle of rotation (e.g., from) 180°. In at least one embodiment, the means for moving movable guide unit 120 may be configured to cause the movable guide unit and specifically, the passage area 126 defined by the movable guide unit, to move further away from bottom plate 152 of outer frame 150 and to further traverse hinge plane 188 of hinge assembly 106. For example, when first chassis 102 is rotated to two hundred twenty-five degrees (225°) from a lesser angle of rotation, the simultaneous rotation of cam 190 may allow the bias of biasing member 138 to move movable guide unit 120 further away from bottom plate 152 and cause the guide unit to traverse hinge plane 188 in the first linear direction such that first guide member 122 moves further away from hinge plane 188 and second guide member 124 moves closer to hinge plane 188. Middle portion 116 of heat carrying member 110 may begin to follow the convex surface of second guide member 124 as first chassis 102 is rotated. In addition, rotation of first chassis 102 to two hundred twenty-five degrees (225°) relative to second chassis 104 can result in rotation of hinge plane 188 to two hundred two and one-half degrees (202.5°) relative to second chassis 104.

FIG. 7G illustrates a cross-sectional view of hinge assembly 106 when first chassis 102 has been rotated relative to second chassis 104 to increase an angle of rotation to approximately two hundred seventy degrees (270°) from a lesser angle of rotation (e.g., from 225°). In at least one embodiment, the means for moving movable guide unit 120 may be configured to cause the movable guide unit and specifically, the passage area 126 defined by the movable guide unit, to move further away from bottom plate 152 of outer frame 150 and to further traverse hinge plane 188 of hinge assembly 106. For example, when first chassis 102 is rotated to two hundred seventy degrees (270°) from a lesser angle of rotation, the simultaneous rotation of cam 190 may allow the bias of biasing member 138 to move movable guide unit 120 further away from bottom plate 152 and cause the guide unit to traverse hinge plane 188 in the first linear direction such that first guide member 122 moves further away from hinge plane 188 and second guide member 124 moves closer to hinge plane 188. Middle portion 116 of heat carrying member 110 can follow more of the convex surface of second guide member 124 as first chassis 102 is rotated. In addition, rotation of first chassis 102) to two hundred seventy degrees (270°) relative to second chassis 104 can result in rotation of hinge plane 188 to approximately two hundred twenty-five degrees (225°) relative to second chassis 104.

FIG. 7H illustrates a cross-sectional view of a portion of hinge assembly 106 when first chassis 102 has been rotated relative to second chassis 104 to increase an angle of rotation to approximately three hundred fifteen degrees (315°) from a lesser angle of rotation (e.g., from) 270°. In at least one embodiment, the means for moving movable guide unit 120 may be configured to cause the movable guide unit and specifically, the passage area 126 defined by the movable guide unit, to move further away from bottom plate 152 of outer frame 150 and to further traverse hinge plane 188 of hinge assembly 106. For example, when first chassis 102 is rotated to three hundred fifteen degrees (315°) from a lesser angle of rotation, simultaneous rotation of cam 190 may allow the bias of biasing member 138 to move movable guide unit 120 further away from bottom plate 152 and cause the guide unit to traverse hinge plane 188 in the first linear direction such that first guide member 122 moves further away from hinge plane 188 and second guide member 124 moves closer to hinge plane 188. Middle portion 116 of heat carrying member 110 can follow more of the convex surface of second guide member 124 as first chassis 102 is rotated. In addition, rotation of first chassis 102 to three hundred fifteen degrees (315°) relative to second chassis 104 can result in rotation of hinge plane 188 to approximately two hundred forty-seven and one-half degrees (247.5°) relative to second chassis 104.

FIG. 7I illustrates a cross-sectional view of a portion of hinge assembly 106 when first chassis 102 has been rotated relative to second chassis 104 to increase an angle of rotation to approximately three hundred sixty degrees (360°) from a lesser angle of rotation (e.g., from 315°). This configuration is referred to herein as the "fully rotated position." In at least one embodiment, the means for moving movable guide unit 120 may be configured to cause the movable guide unit and specifically, the passage area 126 defined by the movable guide unit, to move further away from bottom plate 152 of outer frame 150 and to further traverse hinge plane 188 of hinge assembly 106. For example, when first chassis 102 is rotated to three hundred sixty degrees (360°) from a lesser angle of rotation, the simultaneous rotation of cam 190 may allow the bias of biasing member 138 to move movable guide unit 120 further away from bottom plate 152 and cause the guide unit to traverse hinge plane 188 in the first linear direction such that first guide member 122 moves further away from hinge plane 188 and second guide member 124 moves closer to hinge plane 188. In the fully rotated position, the midpoint of the convex surface of second guide member 124 may be aligned with hinge plane 188. Middle portion 116 of heat carrying member 110 can follow increasingly more of the convex surface of second guide member 124 as first chassis 102 is rotated, and can form an arc over the convex surface of second guide member 124 when first chassis 102 is in the fully rotated position. In addition, rotation of first chassis 102 to three hundred sixty degrees (360°) relative to second chassis 104 can result in rotation of hinge plane 188 to approximately two hundred seventy degrees (270°) relative to second chassis 104.

Turning to FIGS. 8A-8E, FIGS. 8A-8E are cross-sectional views of hinge assembly 106 across cam 190 in various positions during rotational movement of first chassis 102 from a one hundred eighty degree (180°) angle of rotation relative to second chassis 104, to a fully rotated position at a three hundred sixty degree (360°) angle of rotation relative to second chassis 104. The cross-sectional view in FIGS. 8A-8E show ramp portion 140 of movable guide unit 120, end frame 160, bottom plate 152 of outer frame 150, cam 190, and first shaft 182. Cut away views of first chassis 102 and second chassis 104 are also shown. Hinge assembly 106 can be coupled to first chassis 102 and second chassis 104 using hinge brackets 172 and 174 (shown in FIG. 3B, for example). First chassis 102 can be rotatable about first shaft 182, and second chassis 104 can be rotatable about second shaft 184, which can share a longitudinal axis with inner portion 192 of cam 190. Outer frame 150 can be secured to end frame 160, for example, by frame brackets 154 (shown in FIG. 3B, for example) of bottom plate 152 attached to end frame 160 by, for example, a bottom side or flanges.

Cam 190 includes inner portion 192, which can be rotatably coupled to second shaft 184 (shown in FIG. 3D, for example). Cam 190 also includes outer portion 194, which can be offset from inner portion 192 and which can engage upper angled surface 144 of ramp portion 140. Ramp portion 140 can be configured as part of longitudinal extension 130 of guide unit 120. Lower surface 142 of ramp portion 140 can be aligned with the longitudinal flat surface of second guide member 124.

Figure 8A:
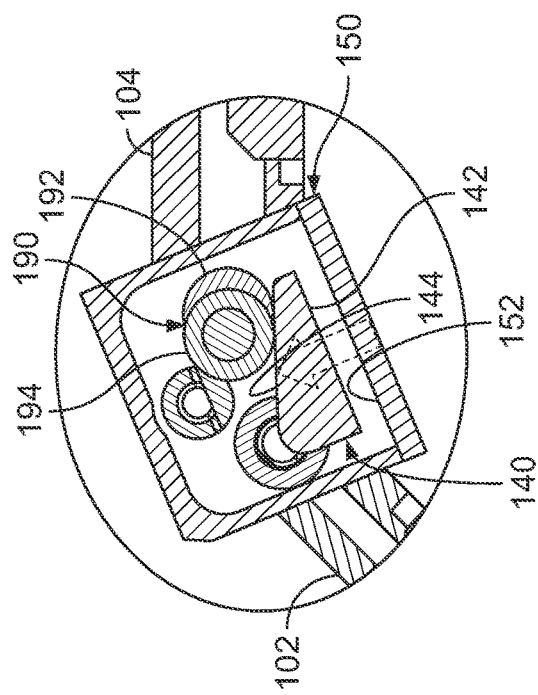
FIGS. 8A-8E are other cross-sectional views of a hinge assembly in various positions during rotational movement of an electronic device with a heat carrying member according to one or more embodiments.

FIG. 8A illustrates a cross-sectional view of hinge assembly 106 at cam 190 when first chassis 102 has been rotated relative to second chassis 104 to increase an angle of rotation to approximately one hundred eighty degrees (180°). When first chassis 102 is rotated to one hundred eighty degrees (180°) from a lesser angle of rotation, the inner portion 192 of cam 190 may be rotated about its longitudinal axis by second shaft 184. Rotation of inner portion 192 causes offset outer portion 194 of cam 190 to eccentrically rotate relative to the longitudinal axis of inner portion 192 (e.g., second hinge axis), and thus to be directed away from upper angled surface 144 of ramp portion 140. Movement of the offset outer portion 194 causes the rotational force of second shaft 184 to be translated into a linear force in which the bias of biasing member 138 against longitudinal extension 130 of movable guide unit 120 causes ramp portion 140 to move in a first linear direction away from bottom plate 152 of outer frame 150, and causes upper angled surface 144 of ramp portion 140 to follow outer portion 194 of cam 190 as it eccentrically rotates about the second hinge axis. Accordingly, second guide member 124, which is coupled to ramp portion 140, also moves in the first linear direction away from bottom plate 152 of outer frame 150, as shown in FIG. 7E.

Figure 8B:
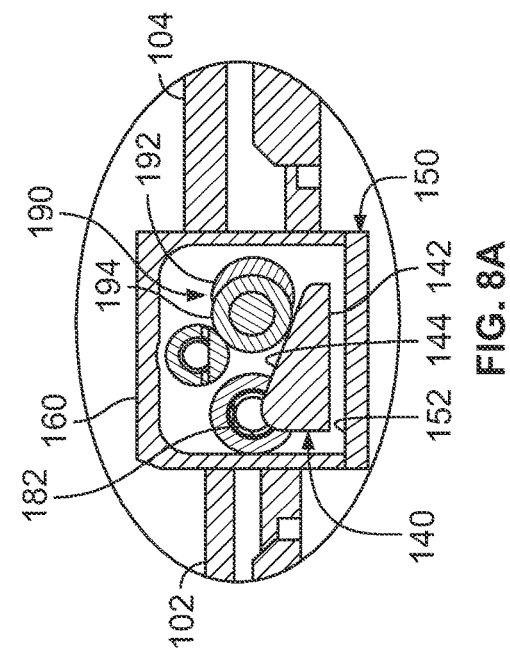

FIG. 8B illustrates a cross-sectional view of hinge assembly 106 at cam 190 when first chassis 102 has been rotated relative to second chassis 104 to increase an angle of rotation to approximately two hundred twenty-five degrees (225°) from a lesser angle of rotation (e.g., from 180°). When first chassis 102 is rotated to two hundred twenty-five degrees (225°) from a lesser angle of rotation, the inner portion 192 of cam 190 may be rotated about its longitudinal axis by second shaft 184. The rotation of inner portion 192 causes offset outer portion 194 of cam 190 to further rotate eccentrically relative to the longitudinal axis of inner portion 192 (e.g., second hinge axis), and thus to be further directed away from upper angled surface 144 of ramp portion 140. Movement of the offset outer portion 194 causes the rotational force of second shaft 184 to be translated into a linear force in which the bias of biasing member 138 against longitudinal extension 130 of movable guide unit 120 causes ramp portion 140 to move in the first linear direction further away from bottom plate 152 of outer frame 150, and causes upper angled surface 144 of ramp portion 140 to follow outer portion 194 of cam 190 as it eccentrically rotates about the second hinge axis. Accordingly, second guide member 124, which is coupled to ramp portion 140, also moves in the first linear direction further away from bottom plate 152 of outer frame 150, as shown in FIG. 7F.

Figure 8D:
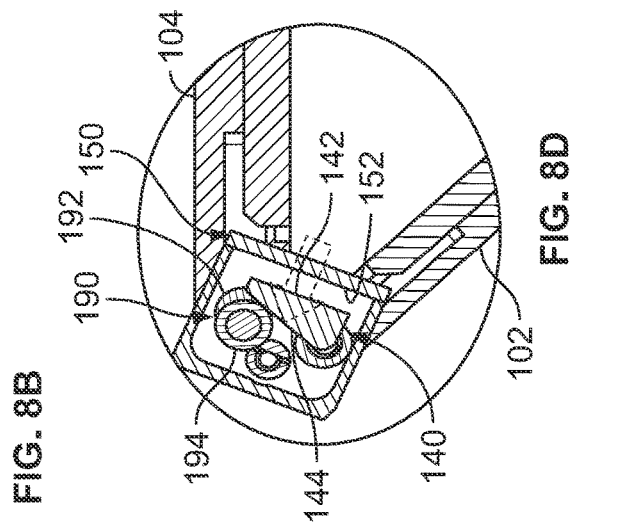
Figure 8E:
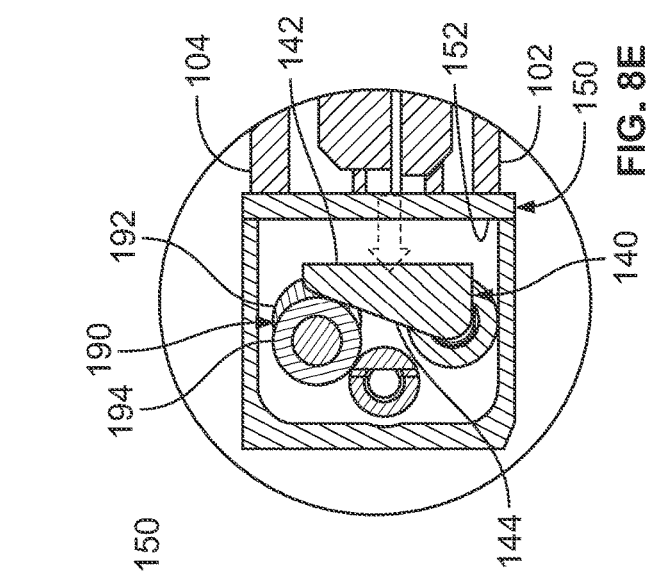
Figure 8C:
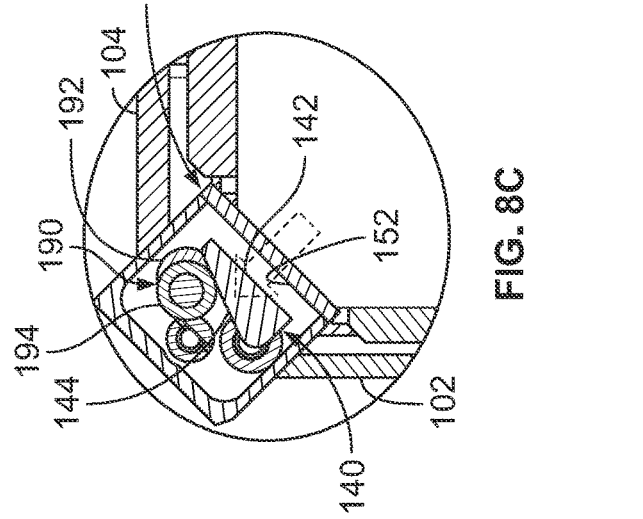

FIG. 8C illustrates a cross-sectional view of hinge assembly 106 at cam 190 when first chassis 102 has been rotated relative to second chassis 104 to increase an angle of rotation to approximately two hundred seventy degrees (270°) from a lesser angle of rotation (e.g., from 225°). When first chassis 102 is rotated to two hundred seventy degrees (270°) from a lesser angle of rotation, the inner portion 192 of cam 190 may be rotated about its longitudinal axis by second shaft 184. The rotation of inner portion 192 causes offset outer portion 194 of cam 190 to further rotate eccentrically relative to the longitudinal axis of inner portion 192 (e.g., second hinge axis), and thus to be further directed away from upper angled surface 144 of ramp portion 140. Movement of the offset outer portion 194 causes the rotational force of second shaft 184 to be translated into a linear force in which the bias of biasing member 138 against longitudinal extension 130 of movable guide unit 120 causes ramp portion 140 to move in the first linear direction further away from bottom plate 152 of outer frame 150, and causes upper angled surface 144 of ramp portion 140 to follow outer portion 194 of cam 190 as it eccentrically rotates about the second hinge axis. Accordingly, second guide member 124, which is coupled to ramp portion 140, also moves in the first linear direction further away from bottom plate 152 of outer frame 150, as shown in FIG. 7G.

FIG. 8D illustrates a cross-sectional view of hinge assembly 106 at cam 190 when first chassis 102 has been rotated relative to second chassis 104 to increase an angle of rotation to approximately three hundred fifteen degrees (315°) from a lesser angle of rotation (e.g., from 270°). When first chassis 102 is rotated to three hundred fifteen degrees (315°) from a lesser angle of rotation, the inner portion 192 of cam 190 may be rotated about its longitudinal axis by second shaft 184. The rotation of inner portion 192 causes offset outer portion 194 of cam 190 to further rotate eccentrically relative to the longitudinal axis of inner portion 192 (e.g., second hinge axis), and thus to be further directed away from upper angled surface 144 of ramp portion 140. Movement of the offset outer portion 194 causes the rotational force of second shaft 184 to be translated into a linear force in which the bias of biasing member 138 against longitudinal extension 130 of movable guide unit 120 causes ramp portion 140 to move in the first linear direction further away from bottom plate 152 of outer frame 150, and causes upper angled surface 144 of ramp portion 140 to follow outer portion 194 of cam 190 as it eccentrically rotates about the second hinge axis. Accordingly, second guide member 124, which is coupled to ramp portion 140, also moves in the first linear direction further away from bottom plate 152 of outer frame 150, as shown in FIG. 7H.

FIG. 8E illustrates a cross-sectional view of hinge assembly 106 at cam 190 when first chassis 102 has been rotated relative to second chassis 104 to increase an angle of rotation to approximately three hundred sixty degrees (360°) from a lesser angle of rotation (e.g., from 270°). When first chassis 102 is rotated to three hundred sixty degrees (360°) from a lesser angle of rotation, the inner portion 192 of cam 190 may be rotated about its longitudinal axis by second shaft 184. The rotation of inner portion 192 causes offset outer portion 194 of cam 190 to further rotate eccentrically relative to the longitudinal axis of inner portion 192 (e.g., second hinge axis), and thus to be further directed away from upper angled surface 144 of ramp portion 140. Movement of the offset outer portion 194 causes the rotational force of second shaft 184 to be translated into a linear force in which the bias of biasing member 138 against longitudinal extension 130 of movable guide unit 120 causes ramp portion 140 to move in the first linear direction further away from bottom plate 152 of outer frame 150, and causes upper angled surface 144 of ramp portion 140 to follow outer portion 194 of cam 190 as it eccentrically rotates about the second hinge axis. Accordingly, second guide member 124, which is coupled to ramp portion 140, also moves in the first linear direction further away from bottom plate 152 of outer frame 150, as shown in FIG. 7I.

Figure 9:
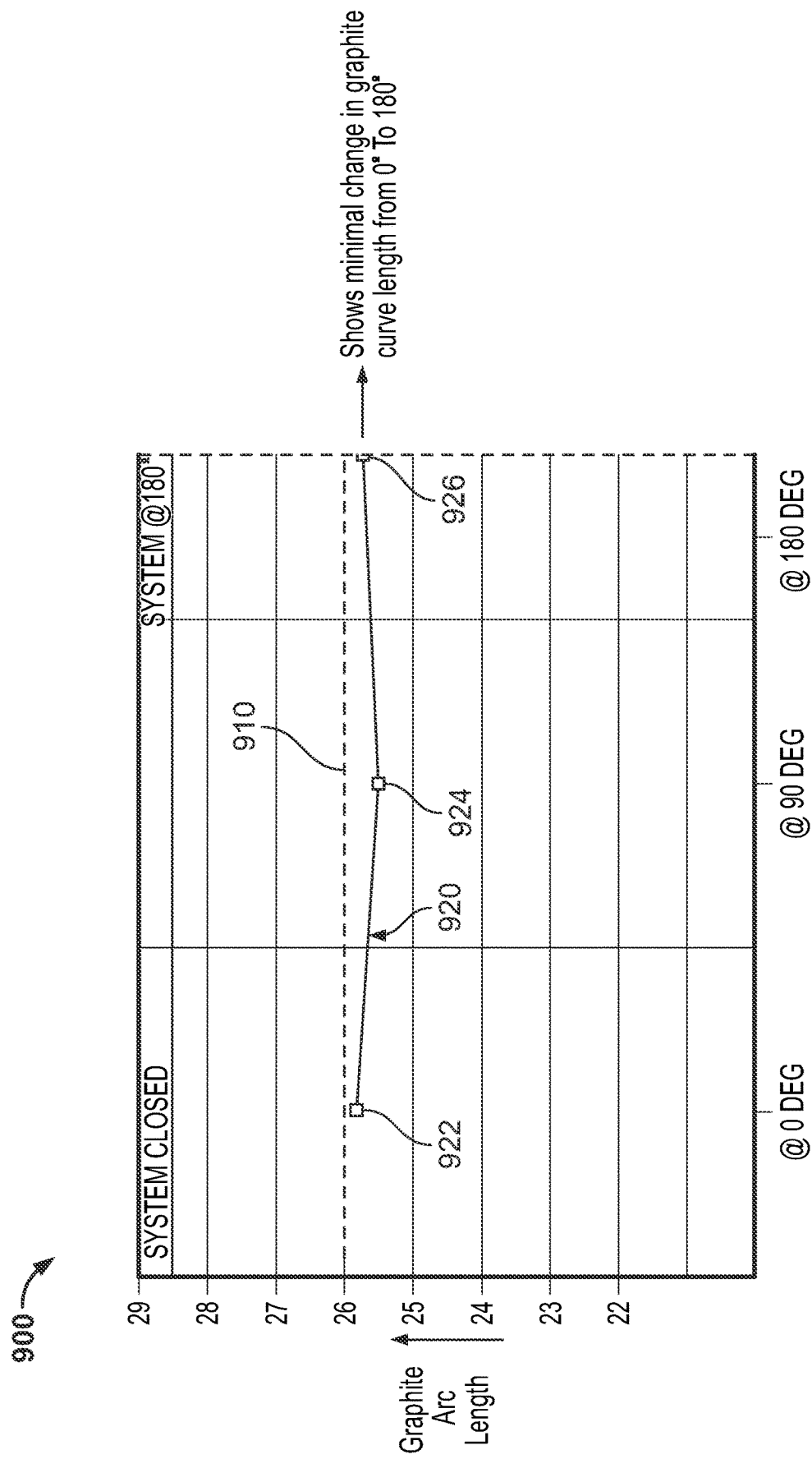
FIG. 9 is a line graph illustrating an example change in a curve length of a heat carrying member during rotational movement of an electronic device.

FIG. 9 is a line graph 900 illustrating the change in a curve length of the middle portion of heat carrying member 110 during rotational movement of a first chassis (e.g., 102) relative to a second chassis (e.g., 104) when an angle of rotation increases from zero degrees (0°) (e.g., in the closed position) to one hundred eighty degrees (180°). The curve length formed in middle portion 116 is approximately 26 mm, as indicated at 910. Without the movable guide unit 120 in hinge assembly 106, during rotation of first chassis 102 relative to second chassis 104, the curve length formed in middle portion 116 experiences some minimal reduction, as shown by line 920. In the closed position, the curve length formed in middle portion 116 is reduced to approximately 25.8 mm, as indicated at 922. At ninety degrees (90°), the length is reduced to approximately 25.5 mm as indicated at 924. At one hundred eighty degrees (180°), the length is increased to approximately 25.75 mm, as indicated at 926.

Figure 10:
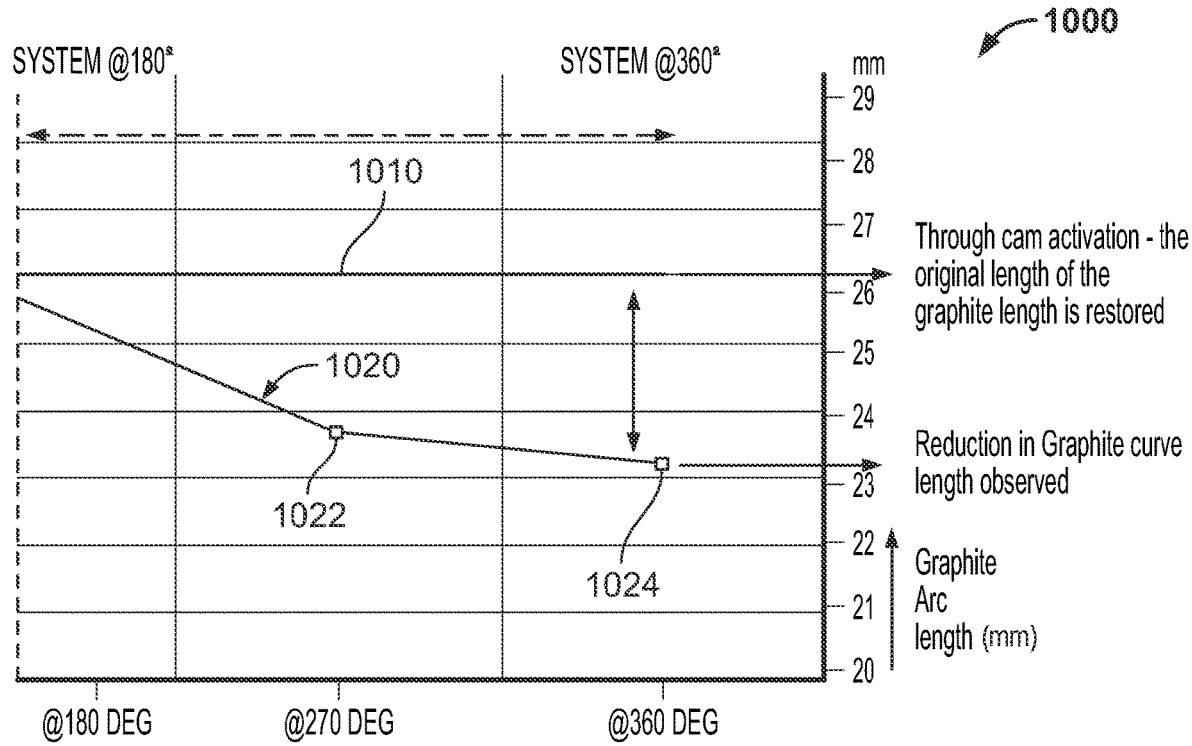
FIG. 10 is a line graph illustrating an example change in the curve length of a heat carrying member during rotational movement of an electronic device with a hinge assembly according to one or more embodiments.

FIG. 10 is a line graph 1000 illustrating the change in a curve length formed in the middle portion 116 of heat carrying member 110 during rotational movement of a first chassis (e.g., 102) relative to a second chassis (e.g., 104) when an angle of rotation increases from one hundred eighty degrees (180°) to three hundred sixty degrees (360°) (e.g., in the fully rotated position). The curve length formed in middle portion 116 is approximately 26 mm, as indicated at 1010.

Typically, when a convertible system is rotated from one hundred eighty degrees (180°) to three hundred sixty degrees (360°), there can be a drastic change in the curve length in a middle portion (e.g., 116) of a heat carrying member (e.g., 110). As shown by line 1020, the curve length could experience significant reduction. In the absence of movable guide unit 120, the heat carrying member can form kinks, folds, or bends as a result of the slack created in the heat carrying member. The middle portion 116 may experience, for example, folding at random points, creases, and cutting of the creases. For example, when first chassis 102 is oriented at one hundred eighty degrees (180°) relative to second chassis 104, the curve length formed in middle portion 116 may be reduced to approximately 25.67 mm. When first chassis 102 is rotated to two hundred seventy degrees (270°), the curve length may be reduced to approximately 23.67 mm, as indicated at 1022. When first chassis 102 is rotated to three hundred sixty degrees (360°), the length may be reduced to approximately 23.25 mm as indicated at 1024.

In hinge assembly 106, the profile of cam 190 works against the spring-loaded movable guide unit 120 to compensate for the slack and to allow the heat carrying member to follow the profile of guide member 122 (or guide member 124 when rotating to the closed position). Consequently, during rotation of first chassis 102 relative to second chassis 104 between one hundred eighty degrees (180°) and three hundred sixty degrees (360°), the movable guide unit functions as a tensioning mechanism to prevent folding and to tension the slack in heat carrying member 110 that results from the rotation. As shown at 1010, the middle portion 116 can maintain the overall curve length of approximately 26 mm. In one example, guide unit 120 may be moved (e.g., away/toward outer frame 150, through hinge plane 188) by approximately 1.5 mm to ensure that the overall curve length is maintained.

Figure 11A:
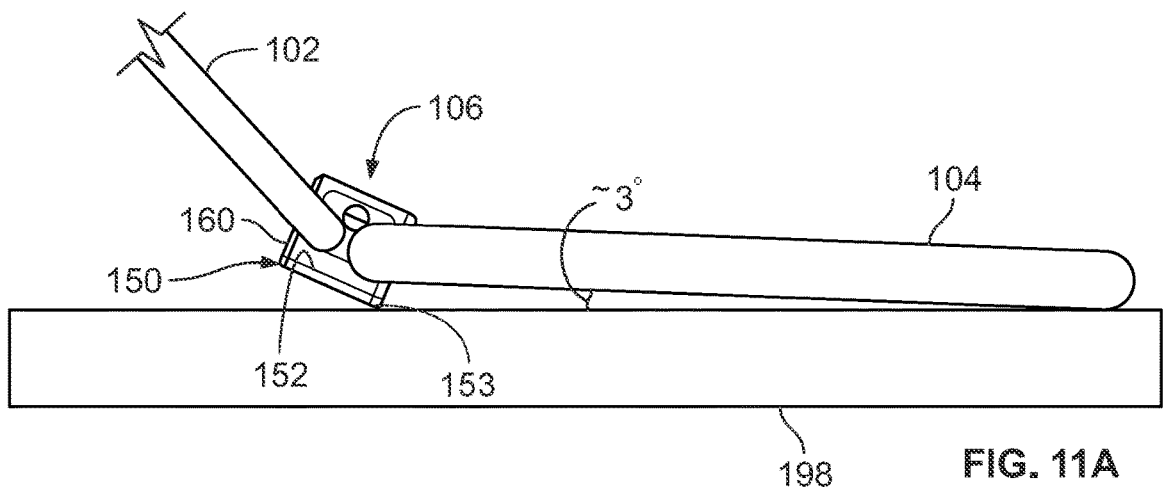
FIG. 11A is a side view of an electronic device with a hinge assembly in an example open position according to one or more embodiments.
Figure 11B:
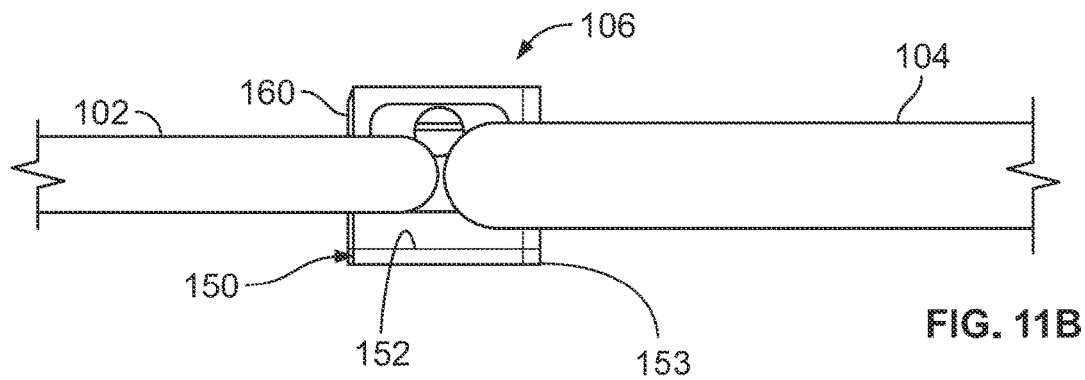
FIG. 11B is a side view of a portion of an electronic device with a hinge assembly in another example open position according to one or more embodiments.

Turning to FIG. 11A, FIG. 11A is a side view of electronic device 100 with hinge assembly 106 in an open position, according to one or more embodiments. FIG. 11A shows first chassis 102, second chassis 104, bottom plate 152 of outer frame 150, and one end frame 160. Electronic device 100 is positioned on a flat surface 198, such as a table or desk. As first chassis 102 is rotated relative to second chassis 104, movable guide unit 120, outer frame 150, and end frame 160 of hinge assembly 106 also rotate in the same rotational direction, but at approximately half the angle of rotation. When first chassis 102 is rotated to have an angle of rotation relative to second chassis 104 of approximately one hundred thirty degrees (130°) to one hundred forty-five degrees (145°), a side section 153 of outer frame 150 can be spaced below a substantially planar, lower side of second chassis 104 to lift the hinge end of the second chassis and create a tilt of approximately three degrees (3°) from the table. In one example, side section 153 can be a side corner, a rounded edge, or any other shape of the outer frame that is suitable for engaging a surface (e.g., 198) to tilt the hinge end of second chassis forward at a slight angle. The tilt can create an ergonomic experience for a user. Such an angle can improve comfort when typing or using another user interface (e.g., trackball, mouse, touchscreen, etc.) on second chassis 104. With reference to FIG. 11B, in one possible configuration, a desirable tilt can be achieved when bottom plate 152 of outer frame 150 is configured to be approximately 2 mm from side section 153 of second chassis 104 when first chassis 102 is positioned at a one hundred eighty degree (180°) angle of rotation from second chassis 103.

Guide Assembly and Hinges

Figure 12A:
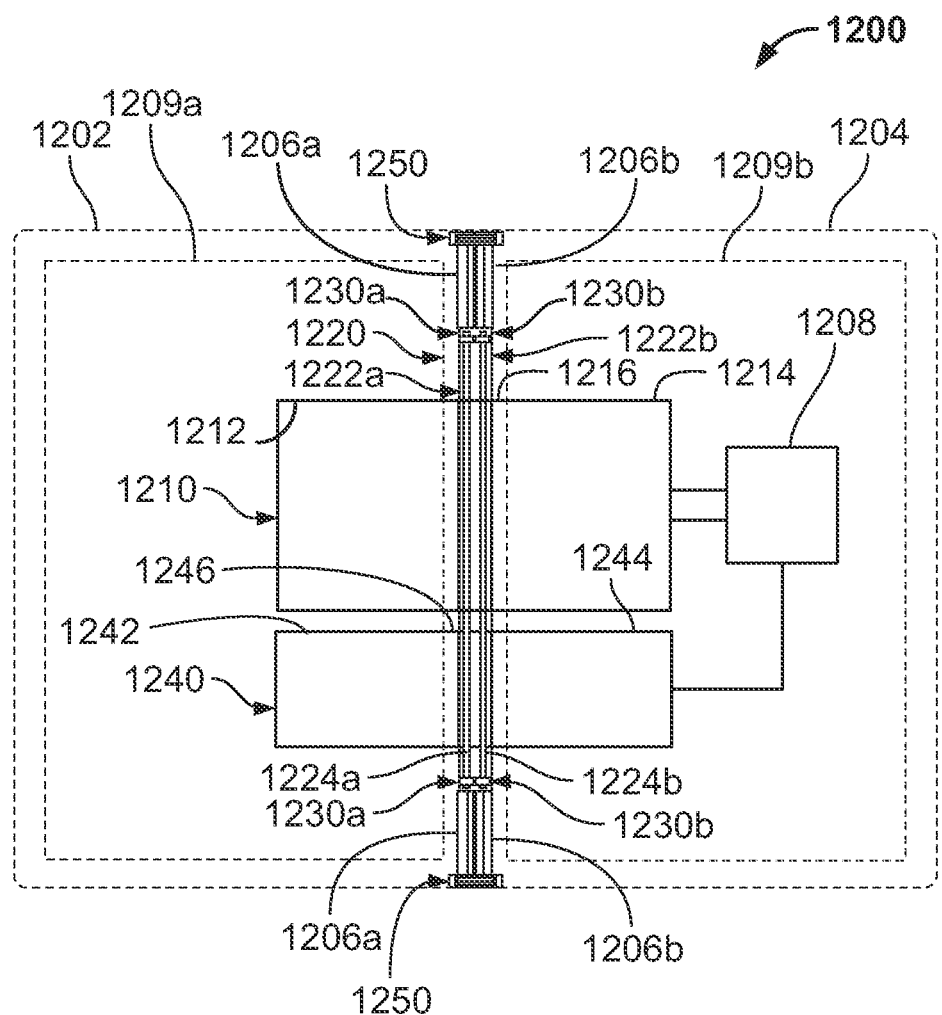
FIG. 12A is a top plan view of an electronic device with a guide assembly and side hinge in an example open position according to one or more embodiments.

In another embodiment of a mechanism to effectively guide a heat carrying member between a first chassis and a second chassis of an electronic device, a guide assembly and a side hinge are also disclosed herein. A guide assembly 1210 and a side hinge 1250, as shown in FIG. 12A, offer an improved approach for effectively sharing cooling in systems having two (or more) chassis that are rotatable relative to each other. Such systems can include, but are not necessarily limited to convertible systems where the range of motion of a chassis relative to another chassis may be from zero degrees to three hundred sixty degrees (0°-360°), or typical display systems where the range of motion of one chassis relative to another chassis may be from zero degrees (0°) to one hundred eighty degrees (180°) or slightly less. The guide assembly is configured to allow a heat carrying member to extend from one chassis of the system (e.g., a lid or first display), through two guide units (also referred to herein as "rollers") of the guide assembly, and into a second chassis of the system (e.g., a base or second display). The guide assembly is further configured to ensure that the overall length of a heat carrying member is maintained, and that stress on the heat carrying member is prevented, as one or both of the first and second chassis of the system are rotated from a closed position (e.g., 0°, or some other minimum angle of rotation for a particular device) to a fully rotated position (e.g., 180°, 360°, or some other maximum angle of rotation for a particular device) or vice versa.

The guide assembly includes an alternative embodiment of a guide unit. The guide assembly may include two generally parallel guide units (also referred to herein as "rollers") between side hinges. A heat carrying member passes through both rollers and can be securely attached to at least one roller. Each roller may be coupled to a respective chassis and rotatable with respect to a hinge axis associated with the chassis. A roller can be tilted during rotation of its chassis. In at least one embodiment, the heat carrying member may be a graphite layer that carries and spreads the heat, and the graphite layer may be at least partially enclosed in a protective layer such as microfabric. Placement of the side hinge on the outer sides of each chassis opens up coveted space within the real estate of each chassis. Accordingly, in addition to the heat carrying member, electrical signals may be routed through the guide assembly via a flexible printed circuit. A side hinge may include two gears, such as spur gears for example, with interlocking teeth.

The guide assembly can offer numerous advantages for electronic devices that use a heat carrying member to spread heat between two chassis. The mechanism can allow the heat carrying member and FPC to maintain their respective lengths through the range of rotation (e.g., 0°-360°), without inducing unnecessary stress on the heat carrying member or the FPC. The guide assembly and side hinge enable ergonomic comfort preferences to be attained and/or requirements associated with relative temperatures between two displays (e.g., dual display device) or compartments to be fulfilled. Thus, the guide assembly can protect a user from the risk of touching a hot surface. In addition, thinner converged mobility devices are enabled because the guide assembly and side hinge provide more space to accommodate both a heat carrying member and a flexible printed circuit (FPC) to route electrical signals rather than common cables being routed across displays in different chassis. The number of cables may also be reduced by allowing partial FPC cross routing. In addition, the hinge supply chain can achieve independence by eliminating cables from the hinge assembly. Accordingly, cables are prevented from damage when an FPC is used with a guide assembly. Finally, since the cable is not routed between the chassis, the cost of the guide assembly may decrease and the yield rate may increase.

Turning to FIG. 12A, FIG. 12A is a plan view of a convertible electronic device 1200 in an open position in which first chassis 1202 and second chassis 1204 are configured at an angle of approximately one hundred eighty degrees (180°). Electronic device 1200 is configured with a guide assembly 1220, side hinges 1250, a heat carrying member 1210, and a flexible printed circuit (FPC) 1240 according to one or more embodiments. In this example, electronic device 1200 may be a dual display device, including a first chassis 1202 containing a first display 1209a and a second chassis 1204 containing a second display 1209b. In at least one embodiment, second chassis 1204 may house significant heat sources 1208 such as compute (e.g., central processing unit (CPU), graphics processing unit (GPU), etc.) and other high power components, for example.

Side hinges 1250 can rotatably couple first chassis 1202 to second chassis 1204. First chassis 1202 may be capable of rotation relative to second chassis 1204, and second chassis 1204 may be capable of rotation relative to first chassis 1202. In at least one embodiment, electronic device 1200 is convertible, in which first chassis 1202 is rotatable between zero degrees (0°) and three hundred sixty degrees (360°) relative to second chassis 1204, and/or second chassis 1204 is rotatable between zero degrees (0°) and three hundred sixty degrees (360°) relative to first chassis 1202. Although electronic device 1200 is illustrated as a convertible laptop, embodiments herein may be implemented in numerous other types of devices that are not necessarily convertible. While a convertible laptop may have a range of rotation from zero to three hundred sixty degrees (0°-360°) between the first chassis and second chassis, other devices implemented with guide assembly 1220 and/or side hinge 1250 can have less than a three hundred sixty degree (360°) range of rotation. In one non-limiting example, a typical laptop may have a first chassis with a display that has a range of rotation from zero to approximately one hundred eighty degrees (0°-180°) relative to a second chassis with a keyboard.

Guide assembly 1220 can include a first roller 1222a coupled to first chassis 1202 and a second roller 1222b coupled to second chassis 1204 for guiding heat carrying member 1210 and optionally, FPC 1240 between the two chassis according to the usage of electronic device 1200. First roller 1222a can include a first guide shaft 1224a, a second guide shaft 1225a (shown in FIG. 15A, for example), and end caps 1230a. End caps 1230a can be configured to support first guide shaft 1224a and second guide shaft 1225a in a parallel, spaced apart arrangement such that middle portion 1216 of heat carrying member 1210 and/or middle FPC portion 1246 of FPC 1240 may be disposed therebetween. In at least one embodiment, first roller 1222a is rotatably coupled to first chassis 1202 by any suitable means to enable the first roller to rotate as the first chassis is rotated. For example, a circular hole or projection may be configured to enable rotation. In at least one embodiment, end caps 1230a can be received in guide cavities defined by first chassis guide holders 1206a that protrude from an inner edge of first chassis 1202 to couple first roller 1222a to first chassis 1202.

In at least one embodiment, second roller 1222b can have the same or substantially the same configuration as second roller 1222b. Second roller 1222b can include a first guide shaft 1224b, a second guide shaft 1225b (shown in FIG. 14B, for example), and end caps 1230b. End caps 1230b can be configured to support first guide shaft 1224b and second guide shaft 1225b in a parallel, spaced apart arrangement such that middle portion 1216 of heat carrying member 1210 and/or middle FPC portion 1246 of FPC 1240 may be disposed therebetween. Second roller 1222b is rotatably coupled to second chassis 1204 by any suitable means to enable the second roller to rotate as the second chassis is rotated. For example, a circular hole or projection may be configured to enable rotation. In at least one embodiment, end caps 1230b can be received in guide cavities defined by second chassis guide holders 1206b that protrude from an inner edge of second chassis 1204 to couple second roller 1222b to second chassis 1204.

Heat carrying member 1210 can extend from first chassis 1202, through guide assembly 1220, to second chassis 1204. Heat carrying member 1210 includes a first chassis portion 1212 disposed in first chassis 1202, a second chassis portion 1214 disposed in second chassis 1204, and middle portion 1216 extending through a first roller 1222a in first chassis 1202 and through a second roller 1222b in second chassis 1204. In one example, first chassis portion 1212 of heat carrying member 1210 may be disposed behind first display 1209a contained in first chassis 1202, and second chassis portion 1214 of heat carrying member 1210 may be disposed behind second display 1209b contained in second chassis 1204.

Heat carrying member 1210 is configured to facilitate shared cooling between first chassis 1202 and second chassis 1204. In this example, most heat associated with electronic device 1200 is generated by heat sources 1208 in second chassis 1204. Heat sources 1208 can include compute (e.g., central processing unit (CPU), graphical processing unit (GPU), etc.) and other high power components, for example. Second chassis portion 1214 of heat carrying member 1210 can be configured to receive heat from heat sources 1208 and to transfer at least some of the heat received from heat sources 1208 to first chassis portion 1212 of heat carrying member 1210 by the heat flowing through middle portion 1216 to first chassis portion 1212. First chassis 1202 may provide additional surface area through which the thermal energy that spreads into first chassis portion 1212 can escape. Thus, use of heat carrying member 1210 facilitates heat dissipation via the surface areas of first chassis 1202, in addition to heat dissipation already occurring in second chassis 1204. Consequently, heat produced in one area (e.g., heat sources 1208) can be spread across electronic device 1200, which can increase cooling capacity and prevent damage to heat sources 1208 and other components in close proximity to heat sources 1208.

In at least one embodiment, heat carrying member 1210 can be securely attached to the two chassis. For example, first chassis portion 1212 of heat carrying member 1210 may be securely attached within first chassis 1202, and second chassis portion 1214 of heat carrying member 1210 may be securely attached within second chassis 1204. Any suitable attachment means may be used to securely attach heat carrying member 1210 to first chassis 1202 and second chassis 1204 (e.g., fasteners, screws, nuts, bolts, adhesive, etc.). Such attachment means may attach the heat carrying member directly to the two chassis or to one or more components or elements within first chassis 1202 and/or second chassis 1204. Middle portion 1216 of heat carrying member 1210, may also be fixedly attached to first guide shaft 1224a, second guide shaft 1225a, or both first and second guide shafts 1224a and 1225a.

FPC 1240 can also extend from first chassis 1202, through guide assembly 1220, and to second chassis 1204. FPC 1240 includes a first FPC portion 1242 disposed in first chassis 1202, a second FPC portion 1244 disposed in second chassis 1204, and a middle FPC portion 1246 extending through first roller 1222a in first chassis 1202 and through second roller 1222b in second chassis 1204. In one example, first FPC portion 1242 of FPC 1240 may be disposed behind and operably connected to first display 1209a contained in first chassis 1202, and second FPC portion 1244 of FPC 1240 may be disposed behind and operably connected to second display 1209b contained in second chassis 1204. In this embodiment, the FPC may replace one or more cables that carry electrical signals between chassis 1202 and 1204. For example, an FPC may carry electrical signals from a CPU or GPU in second chassis 1204 (e.g., part of heat sources 1208) to display 1209a in first chassis 1202. Touch screen functionalities in display 1209a may detect input and FPC 1240 may carry electrical signals representing the touch input to compute elements in second chassis 1204.

Figure 12B:
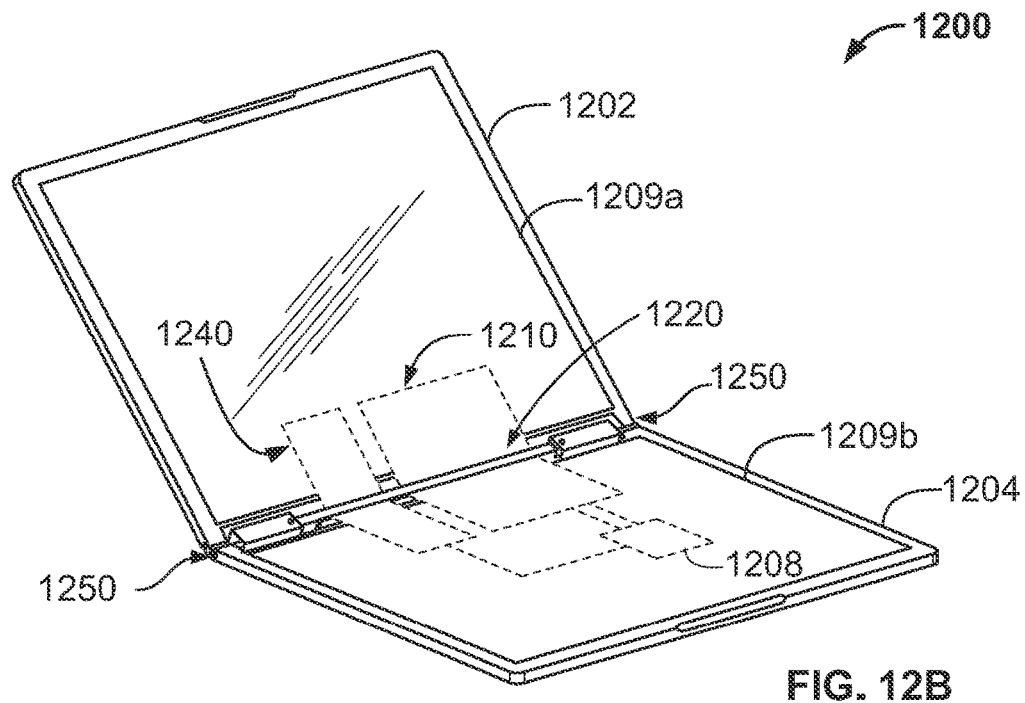
FIG. 12B is an isometric view of an electronic device with a guide assembly and side hinge in an example open position according to one or more embodiments.

FIG. 12B is an isometric interior view of a convertible electronic device 1200 in an open position. FIG. 12B illustrates the dual displays of convertible electronic device 1200. In particular, first display 1209a contained in first chassis 1202 and second display 1209b contained in second chassis 1204. First chassis 1202 and second chassis 1204 are rotatably coupled via side hinges 1250 on each side of first chassis 1202 and second chassis 1204. Guide assembly 1220 is disposed between side hinges 1250. Guide assembly 1220 includes first roller 1222a coupled to first chassis 1202 at an inner edge of first chassis 1202 and a second roller 1222b coupled to second chassis 1204 at an inner edge of second chassis 1204, where the inner edge of first chassis 1202 opposes the inner edge of second chassis 1204.

Figure 12C:
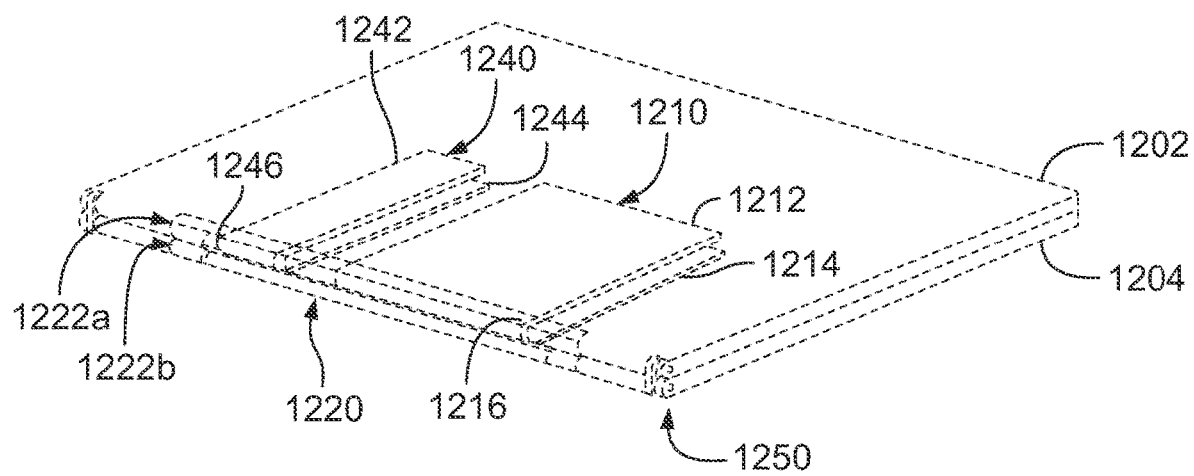
FIG. 12C is an isometric view of an electronic device with a guide assembly and side hinge in a closed position according to one or more embodiments.

FIG. 12C is an isometric view of convertible electronic device 1200 in a closed position. FIG. 12C shows first chassis portion 1212 of heat carrying member 1210 extending into first chassis 1202, second chassis portion 1214 of heat carrying member 1210 extending into second chassis 1204, and middle portion 1216 of heat carrying member 1210 extending through first roller 1222*a* and second roller 1222*b*. First FPC portion 1242 is shown extending into first chassis 1202, second FPC portion 1244 is shown extending into second chassis 1204, and middle FPC portion 1246 is shown extending through first roller 1222*a* and second roller 1222*b*. Although heat carrying member 1210 is illustrated in a generally rectangular shape sized to extend across a large area of first chassis 1202 and second chassis 1204, heat carrying member 1210 may be different dimensions and shapes, depending on particular implementations and needs of electronic device 1200. Similarly, FPC 1240 may be configured in any suitable size and shape depending on particular implementations and needs. For dual display devices, first chassis 1202 and second chassis 1204 may have approximately the same thickness (or depth). As shown in FIG. 12C, in the closed position, first chassis 1202 and second chassis 1204 are substantially parallel and thus, define an angle of rotation of zero degrees (0°). From any other position, such as the open position shown in FIG. 12A or 12B, first chassis 1202 may be rotated about side hinges 1250 toward second chassis 1204 until first chassis 1202 is substantially parallel to second chassis 1204 such that no angle is defined between them. In the closed position, a display (e.g., 1209*a*) contained in first chassis 1202 and a display (e.g., 1209*b*) contained in second chassis 1204 may oppose each other such that both displays are fully (or partially) hidden from view.

Figure 12D:
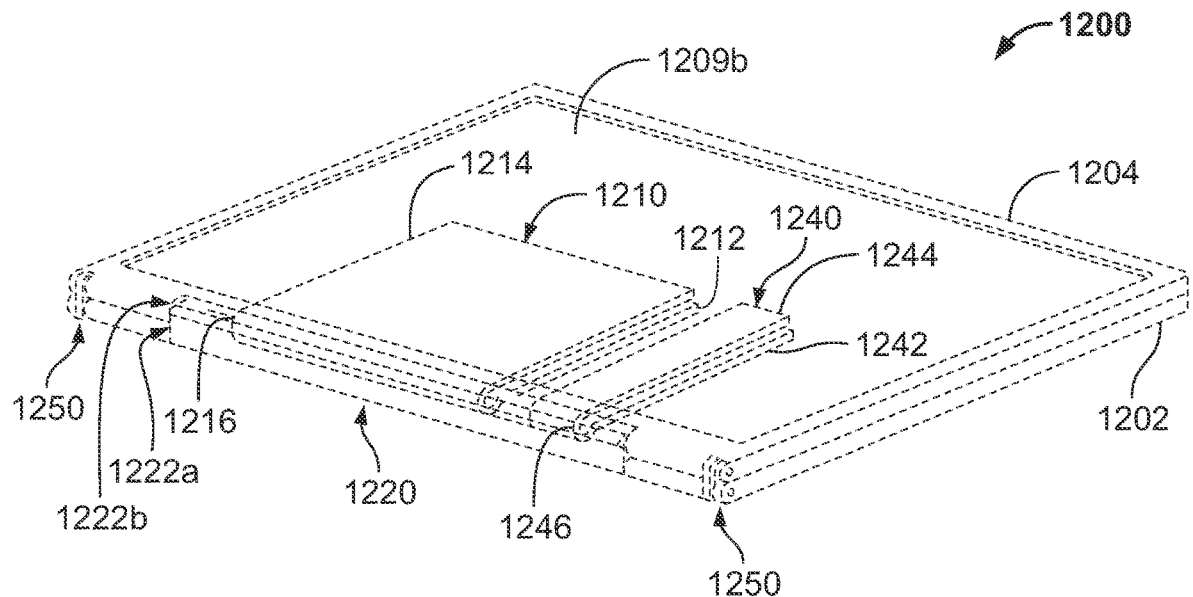
FIG. 12D is an isometric view of an electronic device with a guide assembly and side hinge in a fully rotated position according to one or more embodiments.

FIG. 12D is an isometric view of convertible electronic device 1200 in a fully rotated position. First chassis portion 1212 of heat carrying member 1210 is shown extending into first chassis 1202, second chassis portion 1214 of heat carrying member 1210 is shown extending into second chassis 1204, and middle portion 1216 of heat carrying member is shown extending through first roller 1222*a* and second roller 1222*b*. First FPC portion 1242 is shown extending into first chassis 1202, second FPC portion 1244 is shown extending into second chassis 1204, and middle FPC portion 1246 is shown extending through first roller 1222*a* and second roller 1222*b*. As shown in FIG. 12D, in the fully rotated position, first chassis 1202 and second chassis 1204 are substantially parallel and thus, define an angle of rotation of three hundred sixty degrees (360°). From any other position, such as the closed position shown in FIG. 12C, first chassis 1202 may be rotated about side hinges 1250 toward second chassis 1204 until first chassis 1202 is substantially parallel to second chassis 1204 such that a three hundred sixty degree (360°) angle of rotation is defined between them. In the fully rotated position, second display 1209*b* contained in second chassis 1204 faces outwardly, away from first chassis 1202, and first display 1209*a* (not shown in FIG. 12D) contained in first chassis 1202 faces outwardly, away from second chassis 1204. Thus, a dual display tablet configuration may be achieved.

As shown in FIG. 12C and FIG. 12D, middle portion 1216 of heat carrying member 1210 and middle FPC portion 1246 of FPC 1240 each adapt a first a curve when first chassis 1202 is rotated to a closed position and adapt to a generally inverted second curve when first chassis 1202 is rotated to a fully rotated position. Without proper support in guide assembly 1220, heat carrying member 1210 and/or FPC 1240 can be damaged during the rotational movement of one chassis relative to the other. For example, rotational movement of a chassis may cause heat carrying member 1210 and/or FPC 1240 to experience a bend, warp, fold, crease, or other deformity. Some hinges that include support to minimize deformities in a heat carrying member may instead (or in addition) cause stress to be applied to a middle portion and possibly other areas of the heat carrying member that results in stretching, taughtness, tearing, or other degradation of the heat carrying member. The same issues could occur in an FPC. Over time, stress can cause a heat carrying member such as a graphite sheet to lose its properties, which can detrimentally affect its overall performance. Similarly, stress can damage electrical connections configured by FPC 1240.

Guide assembly 1220 is designed to substantially or totally prevent stress to heat carrying member 1210 and FPC 1240 while simultaneously preventing deformation of the heat carrying member and FPC during rotational movement of the first chassis relative to the second chassis, or vice versa, or simultaneous rotational movement of the first and second chassis. First roller 1222*a* and second roller 1222*b* of guide assembly 1220 are configured to accommodate a rotational range from a closed position at zero degrees (0°), in which middle portion 1216 forms a first curve profile, to a fully rotated position at three hundred sixty degrees (360°), in which middle portion 1216 transforms to a generally inverted second curve profile. Similarly, middle FPC portion 1246 forms a first curve profile when the device is in the closed position, and transforms to generally inverted second curve profile when the device is rotated to a fully rotated position.

In an example implementation, electronic device 1200 is intended to include a computer, a laptop (e.g., clamshell with screen on one of its inner sides and a user interface such as a keyboard on the opposite inner side facing the display), subnotebook or ultraportable (e.g., a laptop having a smaller more portable design) or ultraportable, a netbook (e.g., laptop especially suited for wireless communication), a convertible (e.g., device with combination of features from laptops and tablets), desktop replacement (e.g., larger device that is a transportable alternative to a desktop computer), rugged laptop (e.g., laptop designed to work in harsh conditions), business laptop (e.g., designed for use in a workplace), a personal digital assistant (PDA), an electronic notebook, a mobile phone, or any other device that includes a heat source (e.g., CPUs, GPUs, memory elements, displays, etc.), and at least two chassis, where at least one of the chassis is rotatable about a hinge relative to the other chassis. In one example, electronic device 1200 may be implemented as a converged mobility device. Although electronic device 1200 is shown having two displays 1209*a* and 1209*b* in first and second chassis 1202 and 1204, respectively, it should be apparent that, in other embodiments, a single display, or more than two displays, may be provided in an electronic device configured with guide assembly 1220 and/or side hinge 1250. Other such embodiments may be configured with two or more chassis at least some of which are rotatable generally about a hinge that connects at least some of the two or more chassis. Additionally, various user interfaces and other components may be provided in one or both of the chassis (or other chassis if configured) such as, for example, a keyboard, a touchpad, a fingerprint sensor, a camera, a microphone, an audio device, and any other user interface or other components.

Figure 13:
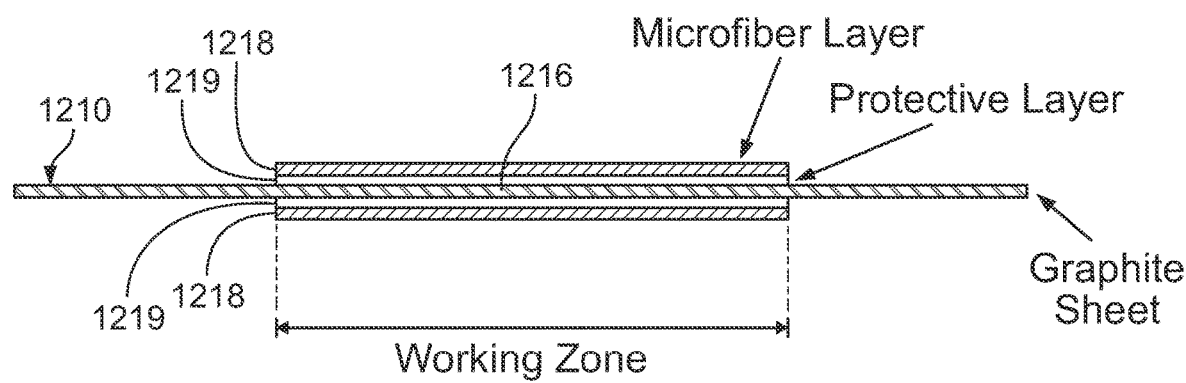
FIG. 13 is a cross-sectional view of a heat carrying member with a multiple protective layers according to one or more embodiments.

FIG. 13 is a cross-sectional view of one example implementation of heat carrying member 1210 for electronic device 1200. In this example, a "bend area" or "working zone" of heat carrying member 1210 may be sandwiched between first protective layers 1218 and optionally, second protective layers 1219. The bend area may comprise middle portion 1216 of heat carrying member 1210 or a part thereof. Heat carrying member 1210 may be made of any material having sufficiently high thermal conductivity to enable the heat carrying member to transfer thermal energy from a heat source in one chassis to another chassis, and sufficient yield strength to enable middle portion 1216 of heat carrying member 110 to transform between a first curve profile to a generally inverted second curve profile, repeatedly without breaking or becoming permanently deformed. Examples of possible materials that may be used to implement heat carrying member 1210 include, but are not necessarily limited to, graphite, copper, and aluminum. In one example, heat carrying member 1210 may be formed from a graphite sheet of approximately 0.1 mm thickness (or depth) having conductivity greater than 700 W/mK.

Protective layers 1218 and 1219 protect heat carrying member 1210 from physical damage as well as ensuring that the hot surface does not come into contact with a user. In at least one embodiment, first protective layers 1218 and optionally, second protective layers 1219 can be bonded to the working zone of heat carrying member 1210. In other embodiments, first protective layers 1218 and/or second protective layers 1219 can be extended to sandwich at least part of first chassis portion 1212, second chassis portion 1214, or parts of chassis portions 1212 and 1214.

First and second protective layers 1218 and 1219 may be made of any material that is sufficiently heat-resistant to withstand heat transferred via heat carrying member 1210 and that is strong enough to protect heat carrying member 1210 from wear and tear and other potential external damage. In one example, protective layers 1218 may be made of a microfabric material, which provides durability and stain resistance. Examples of microfabric material that may be used can include but are not necessarily limited to synthetic fibers such as polyester, polyamides (e.g., nylon, aramid, trogamide, etc.), polypropylenes, or any suitable combination thereof. Second protective layers 1219 may be made from a nickel titanium ally (e.g., nitinol) or from a thin plastic later (e.g., polypropylene) and may be configured having 0.15 mm maximum thickness, in one possible example. It should be noted that first protective layers and optionally, second protective layers as described herein may also be employed to protect flexible printed circuit (FPC) 1240 in one or more embodiments.

Figure 14A:
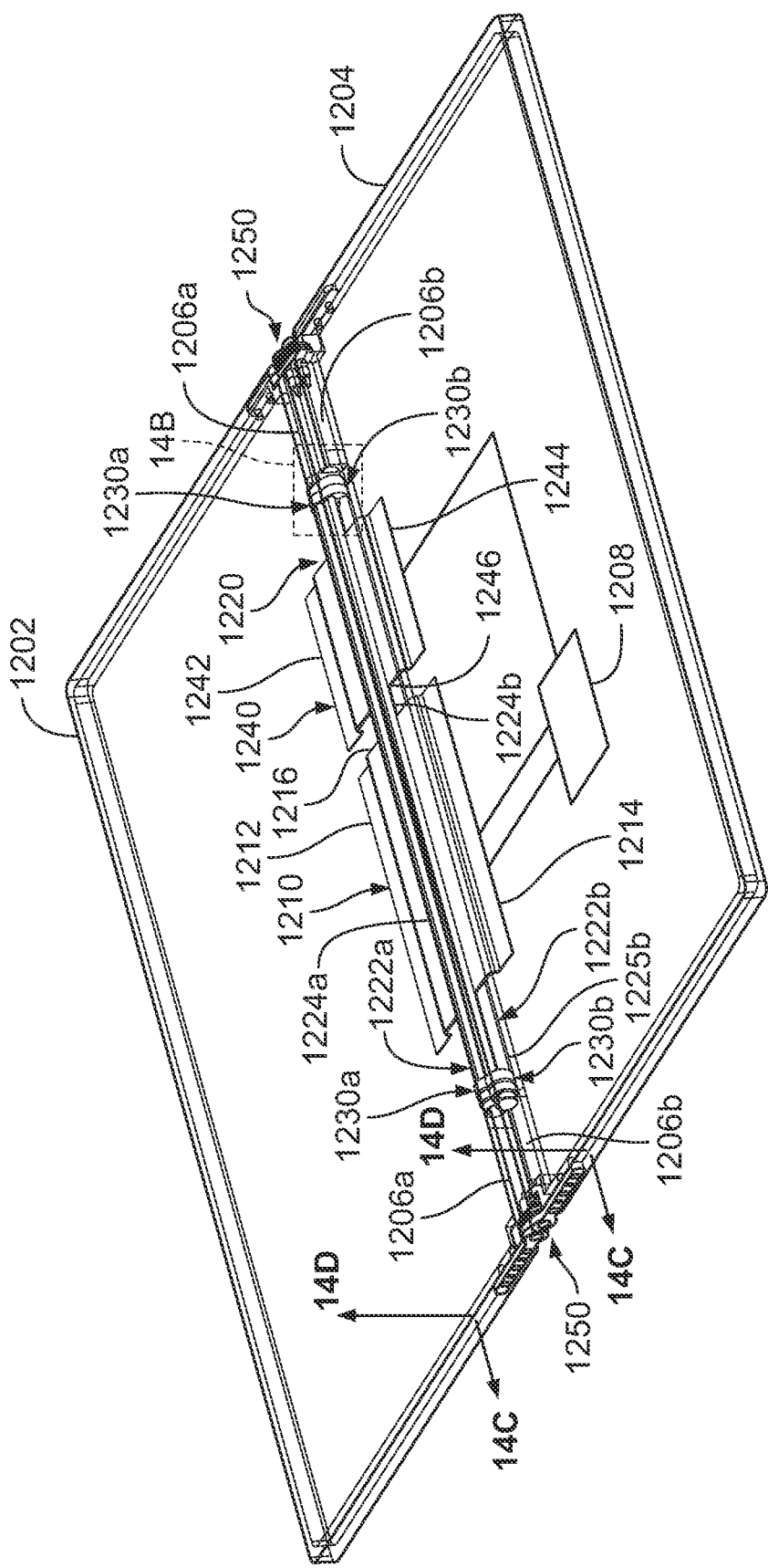
FIG. 14A is an isometric interior view of an electronic device in an example open position with a guide assembly and side hinge according to one or more embodiments.

Turning to FIG. 14A, FIG. 14A is isometric interior view of convertible electronic device 1200 in an open position in which first chassis 1202 and second chassis 1204 are configured at an angle of approximately one hundred eighty degrees (180°) relative to each other. FIG. 14A shows first chassis 1202 with first display 1209a removed, and second chassis 1204 with second display 1209b removed. Electronic device 1200 may include side hinges 1250 to rotatably couple first and second chassis 1202 and 1204, guide assembly 1220, heat carrying member 1210, heat sources 1208, and flexible printed circuit (FPC) 1240. Heat carrying member 1210 can include first chassis portion 1212, second chassis portion 1214, and middle portion 1216. FPC 1240 can include first FPC portion 1242, second FPC portion 1244, and middle FPC portion 1246. Guide assembly 1220 can include first roller 1222a and second roller 1222b. In at least one embodiment, axes of side hinges 1250 can be aligned with axes of rollers 1222a and 1222b.

Heat carrying member 1210 can extend from first chassis 1202, through first roller 1222a, through second roller 1222b, into second chassis 1204. First roller 1222a can include first guide shaft 1224a, second guide shaft 1225a (shown in FIG. 15A, for example), and end caps 1230a at each end of first and second guide shafts 1224a and 1225a. Second roller 1222b can include first guide shaft 1224b, second guide shaft 1225b, and end caps 1230b at each end of first and second guide shafts 1224b and 1225b. Guide cavities defined by first chassis guide holders 1206a (partially shown in FIG. 14A) can be configured for receiving end caps 1230a of first roller 1222a and rotatably securing first roller 1222a to first chassis 1202. Guide cavities defined by second chassis guide holders 1206b (partially shown in FIG. 14A) can be configured for receiving end caps 1230b of second roller 1222b and rotatably securing second roller 1222b to second chassis 1204.

Figure 14B:
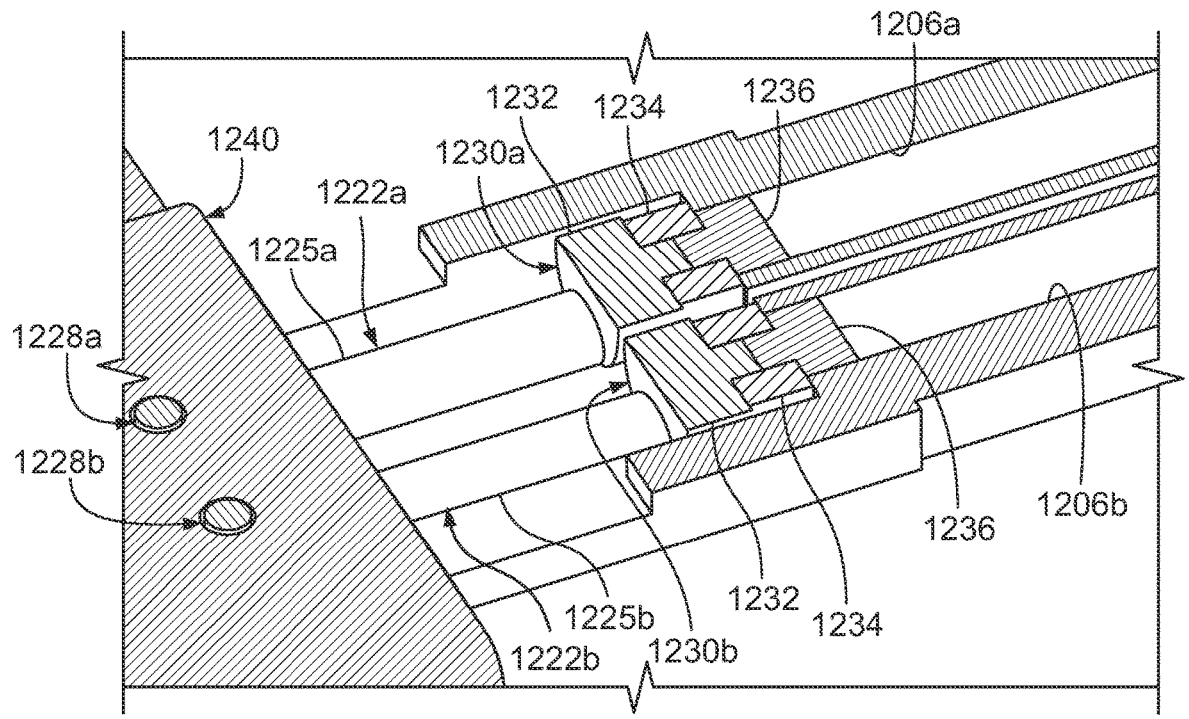
FIG. 14B is a cut away view of one side of a guide assembly for an electronic device according to one or more embodiments.

FIG. 14B is a cut away cross-sectional view of one side of dual guide assembly 1220 in electronic device 1200 shown in FIG. 14A. The cross section may be cut through passage areas defined between first guide shaft 1224a and second guide shaft 1225a and between first guide shaft 1224b and second guide shaft 1225b. In FIG. 14B, the cross section of first roller 1222a shows second guide shaft 1225a and end cap 1230a attached to one end of second guide shaft 1225a. The cross section of second roller 1222b shows second guide shaft 1225b and end cap 1230b attached to one end of second guide shaft 1225b. In one example, end cap 1230a of first roller 1222a and end cap 1230b of second roller 1222b can each include an inner plug 1232, a spacer 1234, and an outer fastener 1236. Inner plug 1232 of end cap 1230a can be configured to receive one end of second guide shaft 1225a (and one end of first guide shaft 1224a shown in FIG. 15A, for example). Inner plug 1232 of end cap 1230b can be configured to receive one end of second guide shaft 1225b (and one end of first guide shaft 1224b shown in FIG. 15A, for example). Rollers 1222a and 1222b may be screwed or otherwise rotatably connected to their respective chassis 1202 and 1204 to allow one Degree of Freed (DOF), i.e., rotational motion. In one example, first guide holder 1206a of first chassis 1202 can be configured to define a guide cavity to receive outer fastener 1236 of end cap 1230a such that it can freely rotate. Thus, first roller 1222a can pivot with first chassis 1202 when the first chassis is rotated. Second guide holder 1206b of second chassis 1204 can be configured to define a guide cavity to receive outer fastener 1236 of end cap 1230b such that it can freely rotate. Thus, second roller 1222b is rotatably coupled to second chassis 1204 and can pivot with second chassis 1204 when the second chassis is rotated.

As further illustrated in FIG. 14B, FPC 1240 can be secured between first guide shaft 1224a and second guide shaft 1225a of first roller 1222a by, for example, one or more pins 1228a formed in second guide shaft 1225a that are inserted through holes in the FPC 1240 into corresponding, axially aligned openings defined in first guide shaft 1224a. In at least one embodiment, FPC 1240 can be secured between first guide shaft 1224b and second guide shaft 1225b of second roller 1222b by, for example, one or more pins 1228b formed in second guide shaft 1225b that are inserted through holes in FPC 1240 into corresponding, axially aligned openings defined in first guide shaft 1224b. The passage area defined by the spacing between first guide shaft 1224a and second guide shaft 1225a of first roller 1222a, through which FPC 1240 (and heat carrying member 1210) extend, may be aligned with an opening in first chassis 1202 through which FPC 1240 (and heat carrying member 1210) can be routed. Also, the passage area defined by the spacing between first guide shaft 1224b and second guide shaft 1225b of second roller 1222b, through which FPC 1240 (and heat carrying member 1210) extend, may be aligned with an opening into second chassis 1204 through which FPC 1240 (and heat carrying member 1210) can be routed.

Figure 14C:
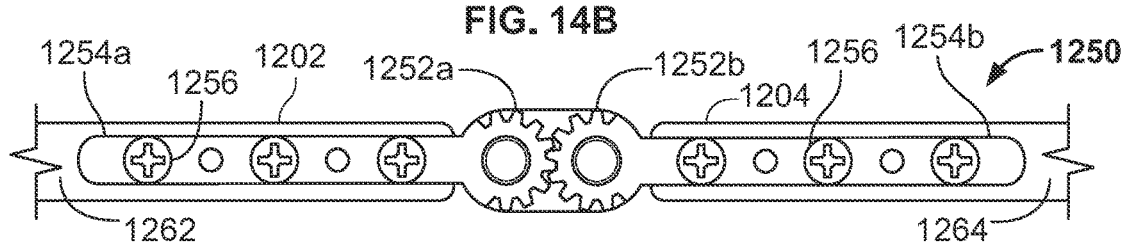
FIG. 14C is a side elevation view of a side hinge for an electronic device according to one or more embodiments.
Figure 14D:
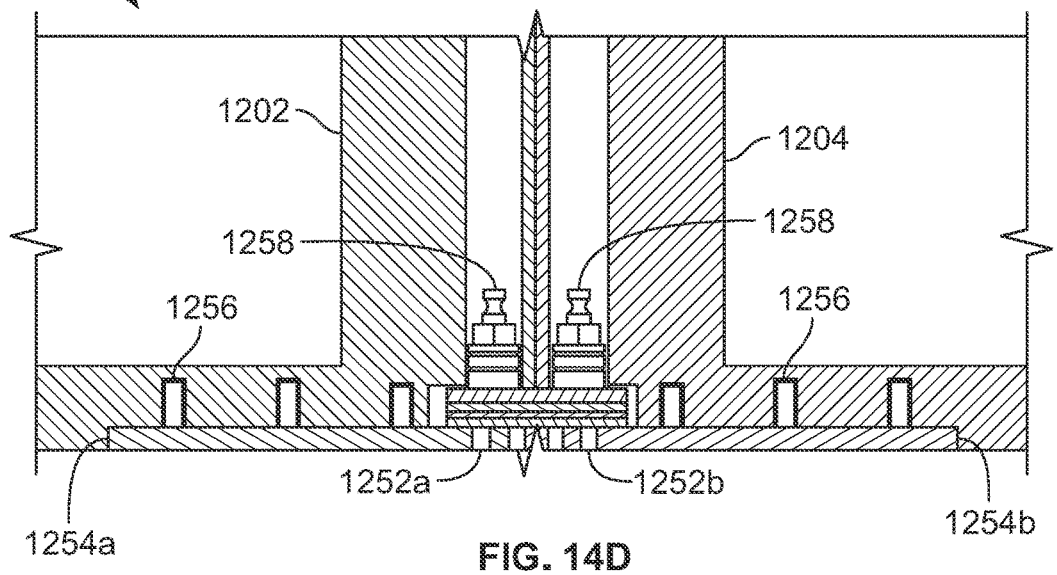
FIG. 14D is a cut away cross-sectional view of a side hinge for an electronic device according to one or more embodiments.

With reference to FIGS. 14C and 14D, FIG. 14C is a side elevation view of one side hinge 1250, and FIG. 14D is a cross-sectional view of side hinge 1450 in electronic device 1200 according to one or more embodiments. In one or more embodiments, side hinge 1250 can be attached to left side surfaces (e.g., 1262 and 1264) of first and second chassis 1202 and 1204 that are aligned, and a duplicate side hinge 1250 can be attached to the right side surfaces (not shown in FIGS. 14B-14C) of the first and second chassis 1202 and 1204 that are aligned. The side hinges can rotatably couple first chassis 1202 and second chassis 1204 to each other.

In one embodiment, side hinge 1250 can include a first gear 1252a and a second gear 1252b, which allow first chassis 1202 to be rotated between zero degrees (0°) and three hundred sixty degrees (360°) relative to second chassis 1204. Second chassis 1204 may also be rotatable relative to first chassis 1202. Shafts 1258 of gears 1252a and 1252b can be connected to torque rings 1259, which operably couple gears 1252a and 1252b to engage and rotate. The hinge axes of first gear 1252a and second gear 1252b may be aligned with first roller 1222a and second roller 1222b, respectively (shown in FIG. 14A, for example). Side hinge 1250 can include a first bracket 1254a connected to first gear 1252a and a second bracket 1254b connected to second gear 1252b. First bracket 1254a can be attached to side surface 1262 of first chassis 1202 using any suitable fastener such as, for example screws 1256. Second bracket 1254b can be attached to side surface 1264 of second chassis 1204 using any suitable fastener such as, for example screws 1256. The side surface 1262 of first chassis 1202 can be aligned with side surface 1264 of second chassis 1204 and may be spaced to enable interlocking teeth of gears 1252a and 1252b to be rotatably engaged. In one nonlimiting example, gears 1252a and 1252b may be configured as spur gears. However, any other suitable gears (e.g., helical gears, etc.) may be implemented based on particular needs and implementations.

Placement of side hinges (such as side hinge 1250) on the aligned side surfaces of an electronic device can enhance the screen-to-body ratio as only the gear mechanism and torque rings are accommodated. The configuration and placement of side hinge 1250 also makes space available to enable a flexible printed circuit (FPC) to be routed between first chassis 1202 and second chassis 1204. The use of an FPC can reduce the cables needed to pass electrical signals between the chassis 1202 and 1204.

Figure 15A:
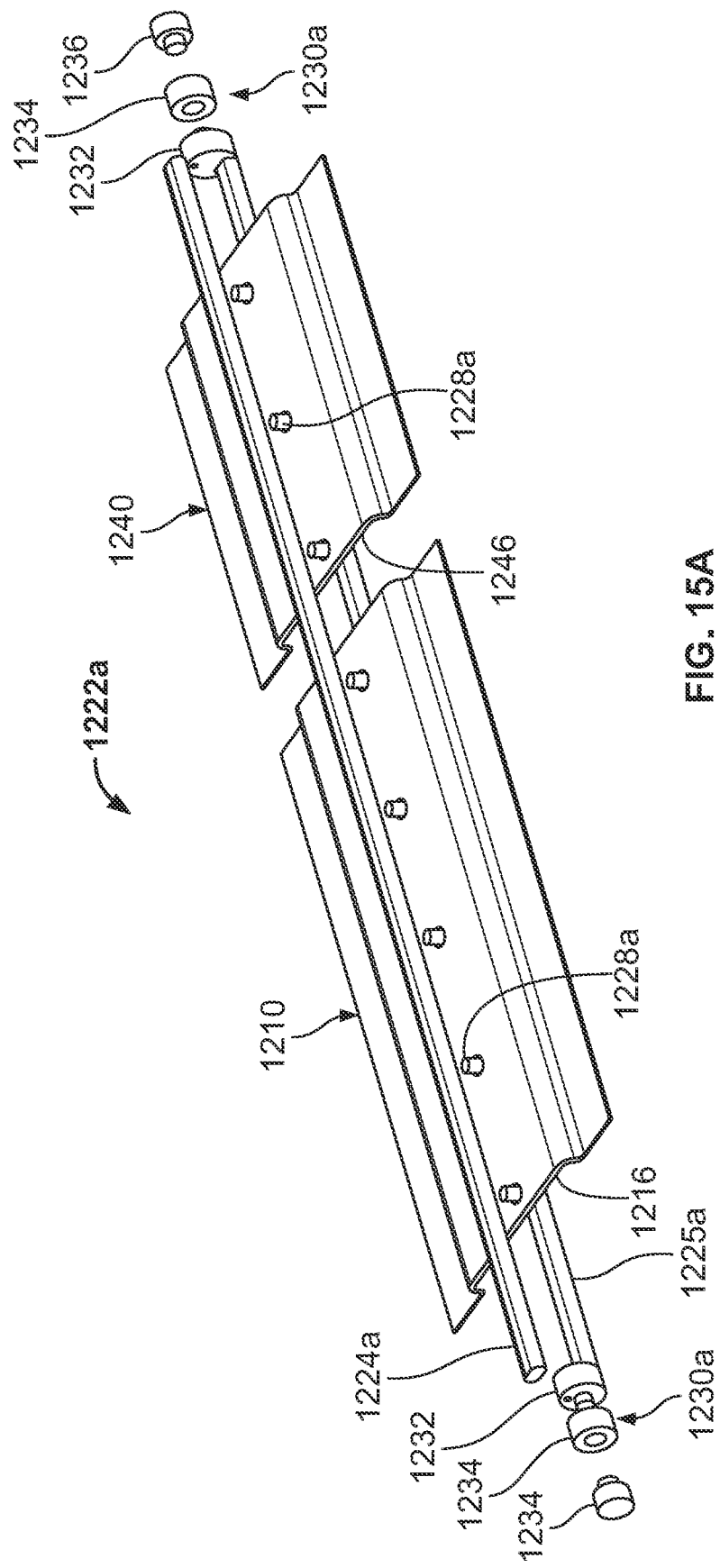
FIG. 15A is an exploded view of a heat carrying member, a flexible printed circuit (FPC), and one guide unit of a guide assembly for an electronic device according to one or more embodiments.

Turning to FIG. 15A, FIG. 15A is an exploded view of one example roller (e.g., first roller 1222a) through which both heat carrying member 1210 and flexible printed circuit (FPC) extend. First roller 1222a includes first guide shaft 1224a, second guide shaft 1225a and two end caps 1230a. In at least one embodiment, first guide shaft 1224a and second guide shaft 1225a can be configured to have the same length and rounded profiles. In one example, each guide shaft 1224a and 1225a may have a generally oblong profile. It should be apparent, however, that any other suitable rounded or curved or at least partially rounded or curved profile may be used. Each end cap 1230a can include inner plug 1232, spacer 1234, and outer fastener 1236. Each inner plug 1232 may be configured with two openings to receive an end from first guide shaft 1224a and an end from second guide shaft 1225a. Inner plugs 1232 may be configured to support guide shafts 1224a and 1225a in a spaced apart parallel arrangement. The spacing between guide shafts 1224a and 1225a can define a first passage area sized to receive a middle portion 1216 of heat carrying member 1210 and middle FPC portion 1246 of FPC 1240.

Middle portion 1216 of heat carrying member 1210 and middle FPC portion 1246 of FPC 1240 may be secured between the two guide shafts 1224a and 1225a using any suitable securing means to minimize curve length change of the middle portion 1216 of heat carrying member 1210 and of middle FPC portion 1246. In an example, multiple pins 1228a may be provided on one guide shaft (e.g., second guide shaft 1225a) and corresponding openings may be defined in the corresponding parallel guide shaft (e.g., first guide shaft 1224a). The guide shafts can be oriented in inner plugs 1232 so that the pins in second guide shaft 1225a are facing and axially aligned with the openings in first guide shaft 1224a. Multiple holes may be defined in middle portion 1216 of heat carrying member 1210 and in middle FPC portion 1246 of FPC 1240. The holes can be spaced along middle portion 1216 and middle FPC portion 1246 to allow axial alignment with openings in first guide shaft 1224a and corresponding pins 1228a in second guide shaft 1225a.

FIG. 15B is an isometric view of one example roller (e.g., first roller 1222a) through which both heat carrying member 1210 and flexible printed circuit (FPC) 1240 extend. First roller 1222a can include two first guide shaft 1224a and second guide shaft 1225a held in a fixed parallel arrangement by end caps 1230a. End caps 1230a can include inner plugs 1232, spacers 1234, and outer fasteners 1236. First passage area 1226a is defined in the space between the guide shafts 1224a and 1225b. Middle portion 1216 of heat carrying member 1210 and middle FPC portion 1246 of FPC 1240 may be locked or rigidly held in place between first guide shaft 1224a and second guide shaft 1225a by any suitable means. For example, spaced pins on one guide shaft may be inserted through corresponding spaced holes in middle portion 1216 and middle FPC portion 1246, and into corresponding spaced openings in the opposing parallel guide shaft. In other embodiments, other means of attachment may be used such as, for example, bonding with an adhesive or suitable fasteners.

FIG. 15C is a cross-sectional view of one example roller (e.g., first roller 1222a) of guide assembly 1220 through which both heat carrying member 1210 and flexible printed circuit (FPC) 1240 extend. In at least one embodiment, first roller 1222a includes first guide shaft 1224a and second guide shaft 1225b, which are held in a parallel spaced apart arrangement by end caps 1230a such that the guide shafts define a first passage area 1226a therebetween. Heat carrying member 1210 and optionally, FPC 1240 can extend through passage area 1226a and can be axially spaced from each other. Each end cap 1230a may include inner plug 1232 for receiving one end of first guide shaft 1224a and one end of second guide shaft 1225a, spacer 1234, and outer fastener 1236. Outer fastener 1236 may be rotatably coupled to first chassis 1202. Second guide shaft 1225a can include pins 1228a that project through holes in heat carrying member 1210 and FPC 1230, and into corresponding openings in first guide shaft 1224a to secure the heat carrying member and FPC between the guide shafts. In at least one embodiment, a distance between the guide shafts remains fixed. It should be understood that second roller 1222b may have the same or substantially the same configuration as first roller 1222a.

Turning to FIGS. 16A-16F, are cross-sectional views of guide assembly 1220 and heat carrying member 1210 in various positions during rotational movement of first chassis 1202 of electronic device 1200 from a closed position to a fully rotated position. The cross-sectional views in FIGS. 16A-16F show first roller 1222a, second roller 1222b, and heat carrying member 1210 extending from first chassis

1202, through first roller 1222a, through second roller 1222b, and into second chassis 1204. Cut away views of first chassis 1202 and second chassis 1204 are also shown. First roller 1222a may be rotatably coupled to first chassis 1202 by end caps 1230a fixed in first chassis 1202, as shown in FIG. 14B, for example. Similarly, second roller 1222b can be rotatably coupled to second chassis 1204 by end caps 1230b fixed in second chassis 1204. First roller 1222a can include first guide shaft 1224a and second guide shaft 1225a in a parallel, spaced apart arrangement that defines first passage area 1226a therebetween for receiving middle portion 1216 of heat carrying member 1210. First passage area 1226a can be aligned with a slit opening defined at an inner edge 1203 of first chassis 1202 through which heat carrying member 1210 can pass into the interior of first chassis 1202. First chassis portion 1212 of heat carrying member 1210 can be attached to first chassis 1202. Second roller 1222b can include first guide shaft 1224b and second guide shaft 1225b in a parallel, spaced apart arrangement that defines second passage area 1226b therebetween for receiving middle portion 1216 of heat carrying member 1210. Second passage area 1226b can be aligned with a slit opening defined at an inner edge 1205 of second chassis 1204 through which heat carrying member 1210 can pass into the interior of second chassis 1204. Second chassis portion 1214 of heat carrying member 1210 can be attached to second chassis 1204.

As shown FIGS. 16A-16F, in each angle of rotation defined between first chassis 1202 and second chassis 1204, roller 1222a rotates to the orientation of first chassis 1202 such that a substantially straight first path is provided for heat carrying member 1210 to pass through the slit opening defined at inner edge 1203 of first chassis 1202 and into first passage area 1226a of first roller 1222a. Roller 1222b can similarly rotate to the orientation of second chassis 1204 such that a substantially straight second path is provided for heat carrying member 1210 to pass through the slit opening defined at inner edge 1205 of second chassis 1204 and into second passage area 1226b of second roller 1222b. As first chassis 1202 is rotated relative to second chassis 1204, both the first path and the second path can remain substantially straight. This can be achieved by using two rollers 1222a and 1222b coupled to chassis 1202 and 1204, respectively, in a manner that allows a roller to rotate freely with the attached heat carrying member 1210, along with a microfiber layer and other protective layers (if any), driving the rotation of the rollers to orient them to create substantially straight paths into their respective chassis as one or both of the chassis are rotated. Heat carrying member 110 takes a shape based on the orientation of first roller 1222a and second roller 1222b, which can be controlled by the position of first chassis 1202 and second chassis 1204.

Although a portion of heat carrying member 1210 between first roller 1222a and second roller 1222b changes its shape as it inverts from a closed chassis curve when the system is in the closed position (e.g., shown in FIG. 16A) to an inverted curve when the system is in the fully rotated position (e.g., shown in FIG. 16F), a curve length of heat carrying member 1210 can remain substantially the same length throughout the rotation in one or more embodiments. The curve length may be measured from inner edge 1203 of first chassis 1202 to inner edge 1205 of second chassis 1205. The curve length can stay the same at least partially because second roller 1222b attached to second chassis 1204 is axially aligned with the second chassis hinge axis (e.g., longitudinal axis of second gear 1252b) about which first chassis 1202 is rotated. Similarly, first roller 1222a attached to first chassis 1202 is axially aligned with the first chassis hinge axis (e.g., longitudinal axis of first gear 1252a) about which second chassis 1204 is rotated. By minimizing changes to the curve length of the heat carrying member 1210, its integrity can be preserved as the system is rotated during normal usage.

In one example scenario referenced in the description of FIGS. 16A-16F, a guide assembly can minimize curve length changes as a system (e.g., dual display) is rotated. In the example scenario, the first chassis and the second chassis are each 6.6 mm in thickness (or depth), and the H2H gap is approximately 0.6 mm. A bend radius of the middle portion of the heat carrying member is approximately 3.1 mm. In this scenario, the curve length can vary between 31.2 mm to 31.7 mm as the system is rotated between a closed position and a fully rotated position.

Figure 16A:
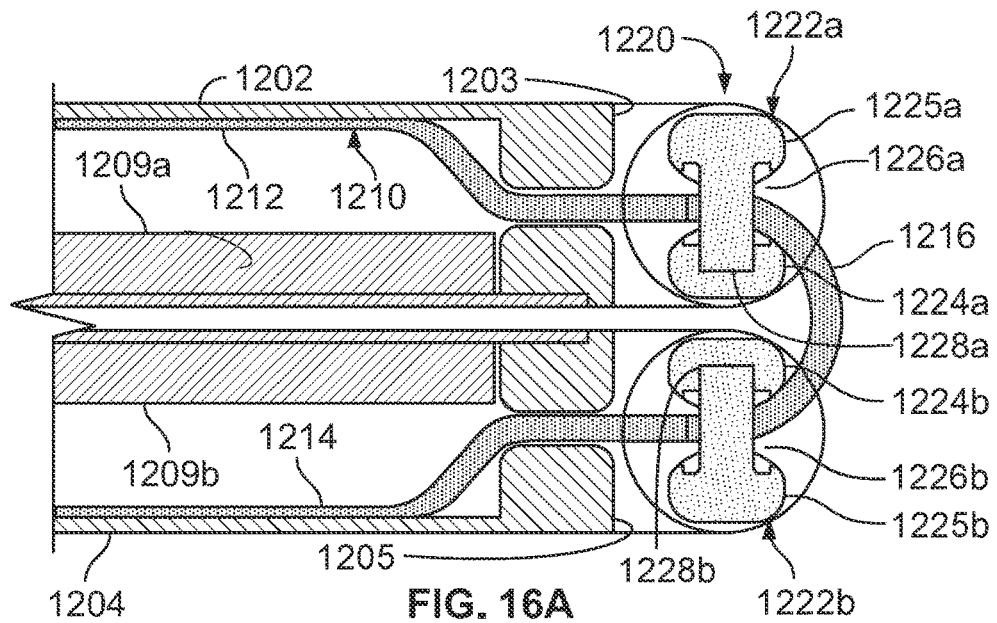
FIGS. 16A-16F are cross-sectional views of a guide unit and heat carrying member in various positions during rotational movement of an electronic device according to one or more embodiments.

FIG. 16A shows a cross-sectional view taken along guide assembly 1220 where pin 1228a in first roller 1222a and pin 1228b in second roller 1222b are aligned. Second guide shaft 1225a of first roller 1222a may include one or more pins, such as pin 1228a, optionally spaced at regular intervals. Second guide shaft 1225b of second roller 1222b may include one or more pins, such as pin 1228b, optionally spaced at regular intervals and optionally aligned with pins of first roller 1222a. Pin 1228a on second guide shaft 1225a of first roller 1222a can be inserted through a hole in heat carrying member 1210, and the end of pin 1228a can be received in a corresponding and axially aligned opening formed in the opposing guide shaft 1224a. Pin 1228b on second guide shaft 1225b of second roller 1222b can be inserted through a hole in heat carrying member 1210, and the end of pin 1228b can be received in a corresponding and axially aligned opening formed in the opposing guide shaft 1224b. Pin 1228a (and possibly other pins along second guide shaft 1225a) can secure heat carrying member 1210 between the guide shafts 1224a and 1225a of first roller 1222a. Pin 1228b (and possibly other pins along second guide shaft 1225b) can secure heat carrying member 1210 between the guide shafts 1224b and 1225b of second roller 1222b.

The cross-sectional view of FIG. 16A illustrates guide assembly 1220 when first chassis 1202 is in a closed position. In this scenario, first chassis 1202 and second chassis 1204 are at least substantially parallel and define an angle of rotation of approximately zero degrees (0°). In some examples, display 1209a in first chassis 1202 may face display 1209b in second chassis 1204 when first chassis 1202 is in the closed position. In the closed position, middle portion 1216 of heat carrying member 1210 may form a closed chassis curve between the longitudinal guide axis of first roller 1222a (e.g., where middle portion 1216 is secured between first and second guide shafts 1224a and 1225a) and the longitudinal guide axis of second roller 1222b (e.g., where middle portion 1216 is secured between first and second guide shafts 1224b and 1225b). In the example scenario, the curve length of middle portion 1216 of heat carrying member 1210 could be 31.65 mm.

Figure 16B:
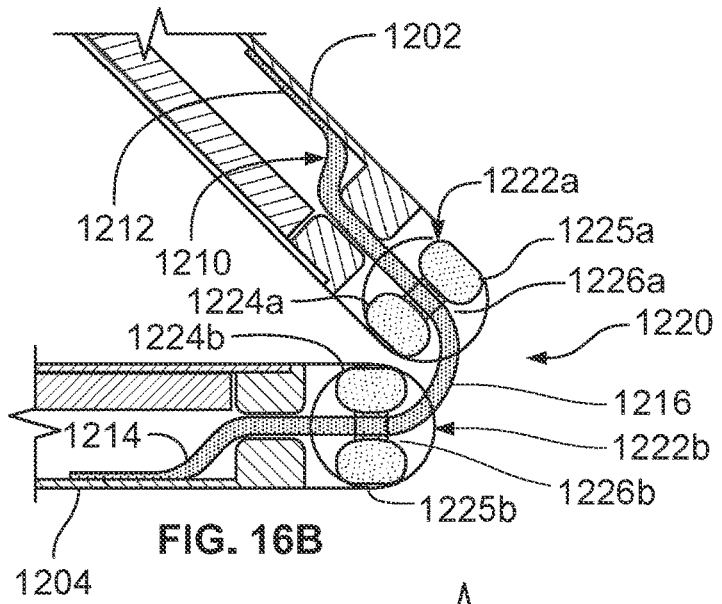

FIG. 16B illustrates a cross-sectional view of guide assembly 1220 when first chassis 1202 has been rotated to approximately forty-five degrees (45°) relative to second chassis 1204. FIG. 16B shows a cross-sectional view taken along guide assembly 1220 between two pins (e.g., 1228a) in first roller 1222a and two pins (e.g., 1228b) in second roller 1222b that are aligned with the two pins of the first roller. When first chassis 1202 is rotated to forty-five degree (45°) from a lesser angle of rotation (e.g., from 0°), the shape of heat carrying member 1210 between the longitudinal guide axis of first roller 1222a and the longitudinal guide axis of second roller 1222b changes as the curvature decreases. In the example scenario, the curve length of middle portion 1216 of heat carrying member 1210 can be 31.37 mm when the system is opened to forty-five degree (45°).

Figure 16C:
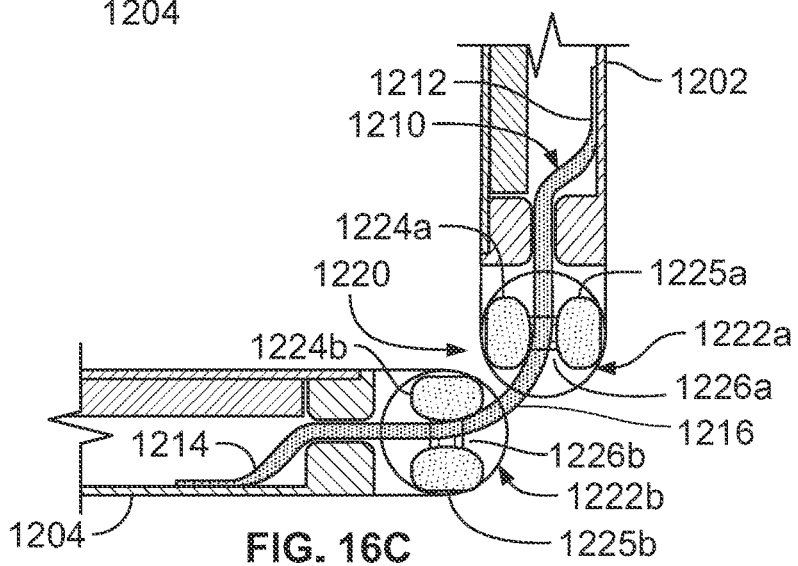

FIG. 16C shows a cross-sectional view taken along guide assembly 1220 between two pins (e.g., 1228a) in first roller 1222a and two pins (e.g., 1228b) in second roller 1222b that are aligned with the two pins of the first roller. The cross-sectional view of FIG. 16C illustrates guide assembly 1220 when first chassis 1202 has been rotated to approximately ninety degrees (90°) relative to second chassis 1204. When first chassis 1202 is rotated to ninety degrees (90°) from a lesser angle of rotation (e.g., from 45°), the shape of heat carrying member 1210 between the longitudinal guide axis of first roller 1222a and the longitudinal guide axis of second roller 1222b changes as the curvature decreases. In the example scenario, the curve length of middle portion 1216 of heat carrying member 1210 can be 31.26 mm when the system is opened to ninety degrees (90°).

Figure 16D:
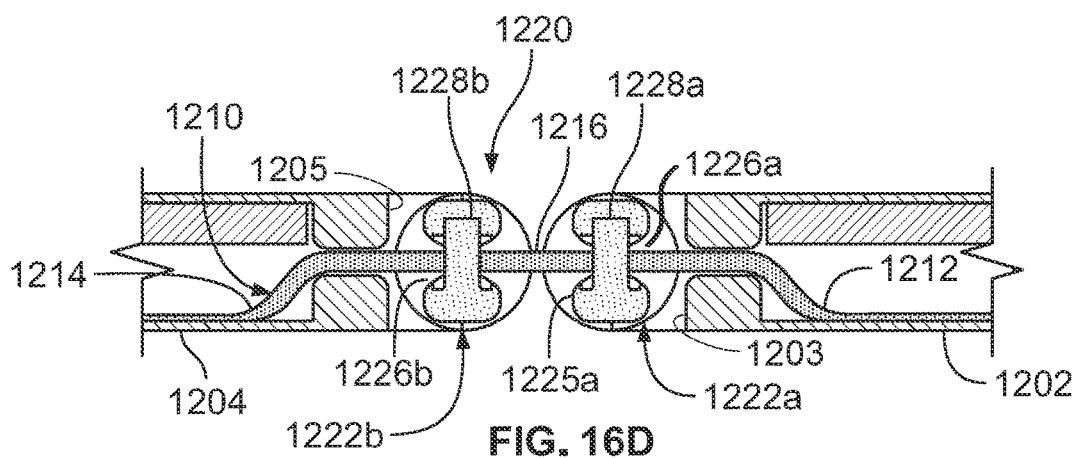

FIG. 16D shows a cross-sectional view taken along guide assembly 1220 where pin 1228a in first roller 1222a and pin 1228b in second roller 1222b are aligned. The cross-sectional view of FIG. 16D illustrates guide assembly 1220 when first chassis 1202 has been rotated relative to second chassis 1204 to approximately one hundred eighty degrees (180°). When first chassis 1202 is rotated to one hundred eighty degrees (180°) from a lesser angle of rotation (e.g., from 90°), the shape of heat carrying member 1210 between the longitudinal guide axis of first roller 1222a and the longitudinal guide axis of second roller 1222b changes as the curvature further decreases. Generally, when the first and second chassis are open to one hundred eighty degrees (180°), the shape of middle portion 1216 can be generally straight, where the middle portion 1216 extends from the slit formed in inner edge 1203 of first chassis 1201, to first passage area 1226a of first roller 1222a, to second passage area 1226b of second roller 1222b, to the slit formed in inner edge 1205 of second chassis 1204. In the example scenario, the curve length of middle portion 1216 of heat carrying member 1210 can be 31.64 mm when the system is opened to one hundred eighty degrees (180°).

Figure 16E:
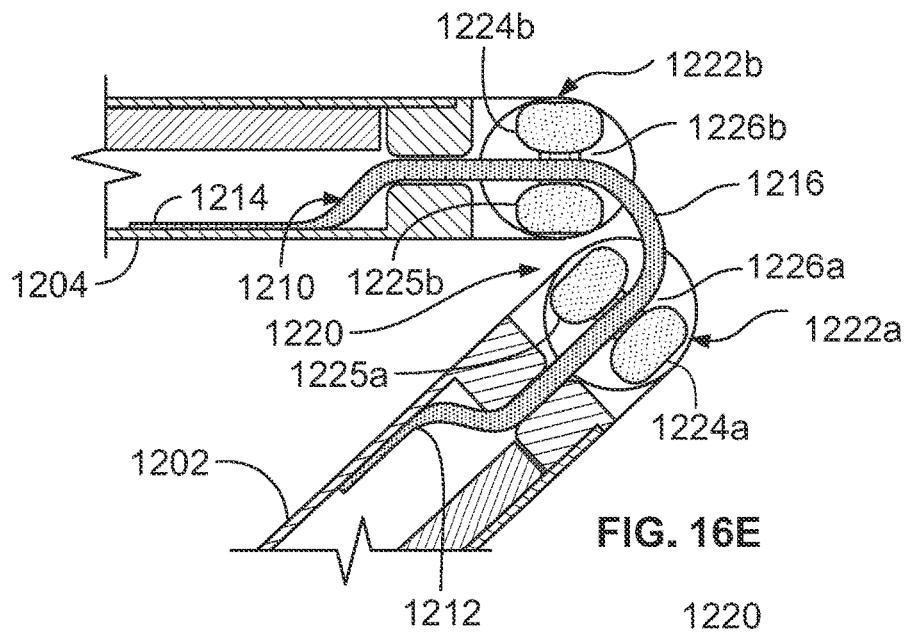

FIG. 16E shows a cross-sectional view taken along guide assembly 1220 between two pins (e.g., 1228a) in first roller 1222a and two pins (e.g., 1228b) in second roller 1222b that are aligned with the two pins of the first roller. The cross-sectional view of FIG. 16E illustrates guide assembly 1220 when first chassis 1202 has been rotated to approximately three hundred fifteen degrees (315°) relative to second chassis 1204. When first chassis 1202 is rotated to two hundred seventy degrees (270°) from a lesser angle of rotation (e.g., from 180°) the shape of middle portion 1216 of heat carrying member 1210 between the longitudinal guide axis of first roller 1222a and the longitudinal guide axis of second roller 1222b changes as the curve begins to invert. In the example scenario, the curve length can be 31.58 mm when the system is opened to three hundred fifteen degrees (315°).

Figure 16F:
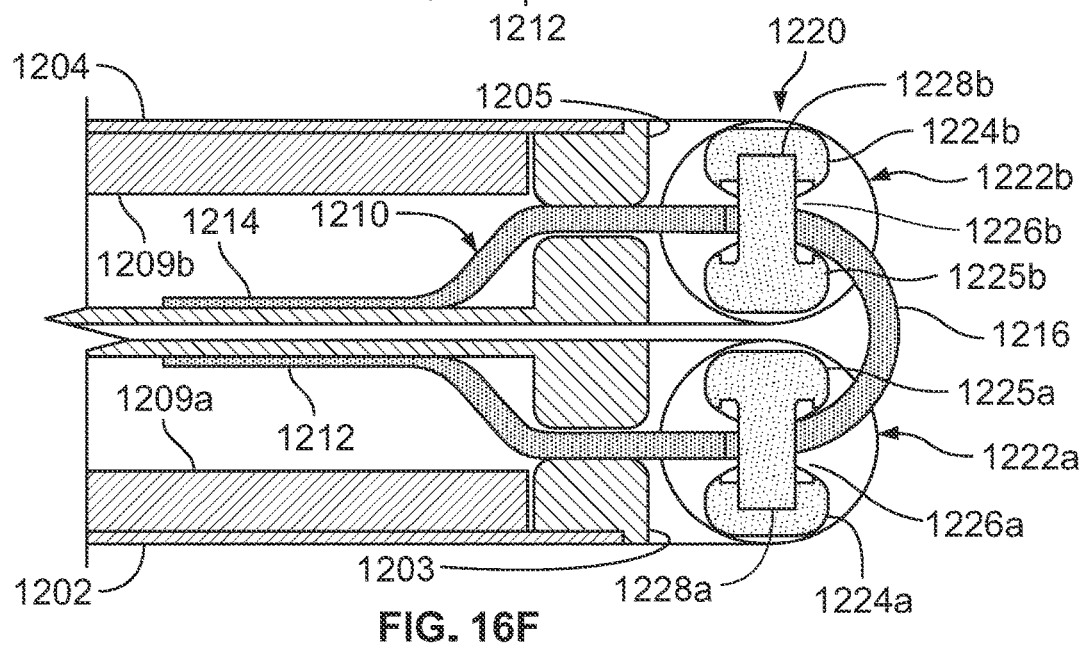

FIG. 16F shows a cross-sectional view taken along guide assembly 1220 where pin 1228a in first roller 1222a and pin 1228b in second roller 1222b are aligned. The cross-sectional view of FIG. 16F illustrates guide assembly 1220 when first chassis 1202 has been rotated to a fully rotated position of approximately three hundred sixty degrees (360°) relative to second chassis 1204. When first chassis 1202 is rotated to three hundred sixty degrees (360°) from a lesser angle of rotation (e.g., from 315°) the shape of heat carrying member 1210 between the longitudinal guide axis of first roller 1222a and the longitudinal guide axis of second roller 1222b changes as the curvature (of the inverted curve) increases. In the example scenario, the curve length of middle portion 1216 of heat carrying member 1210 can be 31.7 mm when the system is in the fully rotated position. In this example scenario, slack variation is 0.4 mm-0.5 mm at different angles. As the rollers 1222a and 1222b get tilted, the slack is adjusted. Accordingly, the maximum curve length change is approximately 0.5 mm. Use of guide assembly 1220 in a dual display device can minimize curve length change of the heat carrying member. Accordingly, the integrity of the heat carrying member 1210 can be maintained during normal usage of the system.

Although FIGS. 16A-16F are shown and described with reference to heat carrying member 1210, it should be apparent that a flexible printed circuit (FPC), such as FPC 1240, could also benefit from the design of guide assembly 1220. In particular, changes to a curve length of middle FPC portion 1246 of FPC 1240, for example, may also be minimized during rotational movement of the system between a closed position and fully rotated position. Thus, the integrity of FPC 1240 can be preserved during the normal usage of the system.

Figure 17:
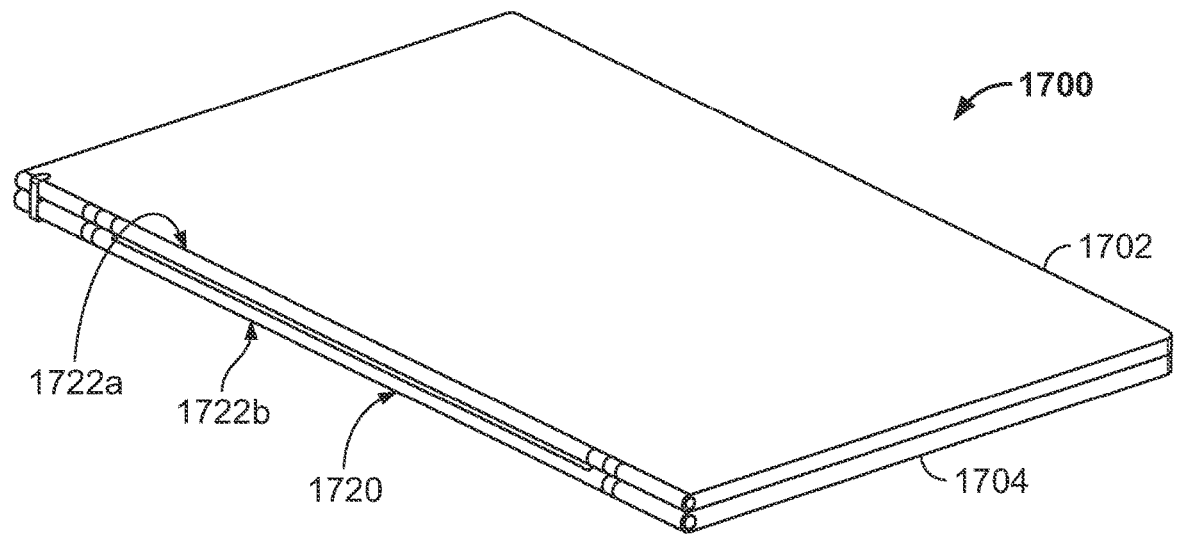
FIG. 17 is an isometric view of another embodiment of a guide assembly in an electronic device in a closed position according to one or more embodiments.

Turning to FIG. 17, FIG. 17 is an isometric view illustrating an embodiment of a guide assembly 1720 for a convertible electronic device 1700. Convertible electronic device 1700 is in a closed position in FIG. 17. Convertible electronic device 1700 can include a first chassis 1702 and a second chassis 1704. In at least one embodiment, first chassis 1702 and second chassis 1704 have different thicknesses (or depths). In the example of FIG. 17, first chassis 1702 may be thinner and therefore, may have less depth than second chassis 1704. A typical laptop with a lid having a display and a base having a keyboard (or other user interface) may have this configuration where the lid is thinner than the base.

Guide assembly 1720 can include a first roller 1722a coupled to first chassis 1702 and a second roller 1722b coupled to second chassis 1704. A heat carrying member 1710 may extend between first roller 1722a and second roller 1722b. First roller 1722a can be configured with substantially the same diameter as the thickness of first chassis 1202. Second roller 1722b can be configured with a diameter that is substantially the same as the thickness of second chassis 1704. In one example, first chassis 1702 may be configured to have a thickness of approximately 5 mm, and second chassis 1704 may be configured to have a thickness of approximately 8 mm. Accordingly, in this example, first roller 1722a can be configured to have a diameter of 5 mm, and second roller 1722b can be configured to have a diameter of 8 mm.

Figure 18:
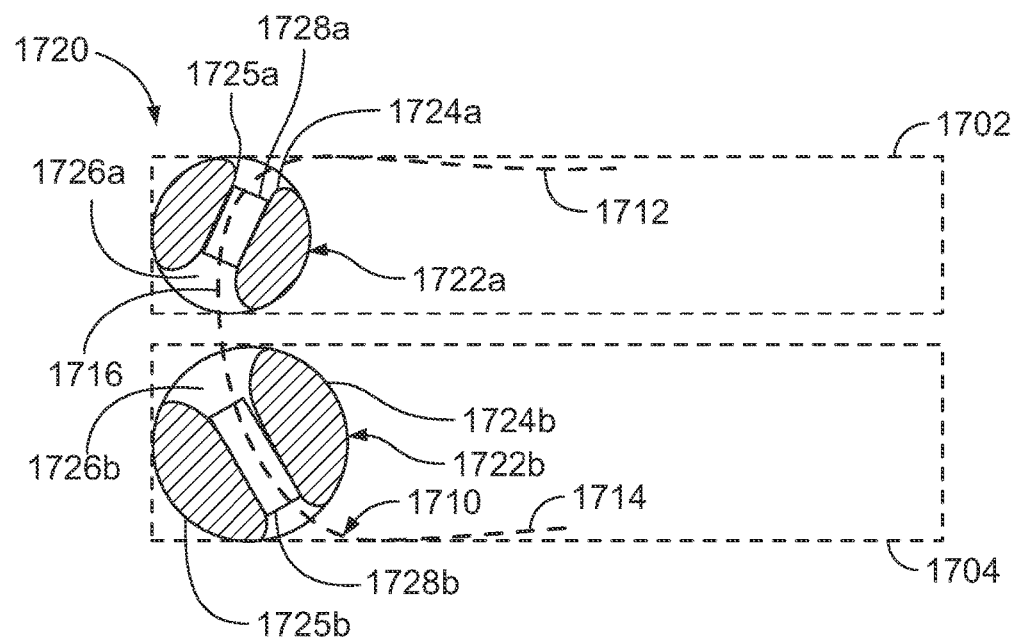
FIG. 18 is a schematic cross-sectional view of another embodiment of a guide assembly in an electronic device in a closed position according to one or more embodiments.

FIG. 18 is a schematic diagram illustrating a cross-sectional view of guide assembly 1720 when electronic device 1700 is in a closed position according to one or more embodiments. Guide assembly 1720 can include a first roller 1722a coupled to first chassis 1702 and a second roller 1722b coupled to second chassis 1704 for guiding heat carrying member 1710 and optionally, a flexible printed circuit (e.g., FPC 1240) between the two chassis according to the usage of electronic device 1700. Generally, first roller 1722a and second roller 1722b may be configured in a similar manner as rollers 1222a and 1222b, previously described herein. First roller 1722a can include a first guide shaft 1724a and a second guide shaft 1725a, which may coupled to each other by end caps (not shown). The end caps can be configured to support first guide shaft 1724a and second guide shaft 1725*a* in a parallel, spaced apart arrangement such that a middle portion 1716 of heat carrying member 1710 (and optionally an FPC) may be disposed in a first passage area 1726*a* defined between first guide shaft 1724*a* and second guide shaft 1725*a*. Second roller 1722*b* can include a first guide shaft 1724*b* and a second guide shaft 1725*b*, which may coupled to each other by end caps (not shown). The end caps can be configured to support first guide shaft 1724*b* and second guide shaft 1725*b* in a parallel, spaced apart arrangement such that middle portion 1716 of heat carrying member 1710 (and optionally an FPC) may be disposed in a second passage area 1726*b* defined between first guide shaft 1724*b* and second guide shaft 1725*b*.

Heat carrying member 1710 may be configured to facilitate shared cooling between first chassis 1702 and second chassis 1704. Heat carrying member 1710 can extend from within first chassis 1702, through guide assembly 1706, into second chassis 1704. Heat carrying member 1710 can include a first chassis portion 1712 disposed in first chassis 1702, a second chassis portion 1714 disposed in second chassis 1704, and middle portion 1716 extending through guide assembly 1720 and disposed between the first chassis and the second chassis. In one example, first chassis portion 1712 of heat carrying member 1710 may be disposed behind a display (not shown) contained in first chassis 1702. Similarly, second chassis portion 1714 of heat carrying member 1710 may be disposed behind a keyboard, a second display, or any other outwardly facing user interface or other components contained in second chassis 1704.

Heat carrying member 1710 can be fixedly secured to the chassis. For example, first chassis portion 1712 of heat carrying member 1710 can be fixedly secured within first chassis 1702, and second chassis portion 1714 of heat carrying member 1710 can be fixedly secured with second chassis 1704. Middle portion 1716 of heat carrying member 1710 can extend through guide assembly 1706 and may be fixedly secured to guide assembly 1720. For example, middle portion 1716 can be secured between first and second guide shafts 1724*a* and 1725*a* of first roller 1722*a*, and between first and second guide shafts 1724*b* and 1725*b* of second roller 1722*b*. The heat carrying member 1710 can be secured using any suitable means including, but not necessarily limited to, riveting, fastening, and/or permanent bonding (e.g., adhesives, etc.). In one example, one of the guide shafts may be configured with pins and the other guide shaft may be configured with corresponding axially aligned openings as described with reference to guide assembly 1220, to secure heat carrying member 1710 between the first and second guide shafts of one or both of the rollers 1722*a* and 1722*b*.

First roller 1722*a* can be rotatably coupled to first chassis 1702 using any suitable means. For example, end caps of first roller 1722*a* may be rotatably positioned in cavities formed within first chassis 1702. Second roller 1722*b* can be rotatably coupled to second chassis 1704 using any suitable means. For example, end caps of second roller 1722*b* may be rotatably positioned in cavities formed within second chassis 1204. Each of the rollers 1722*a* and 1722*b*, however, has a free pivoting constraint within their respective chassis 1702 and 1704. In at least one embodiment, heat carrying member 1710 along with the microfiber layer and protective layer (if any) can drive the rotation of the free pivoting rollers 1722*a* and 1722*b*. Heat carrying member 1710 takes a shape based on the orientation of the first roller 1722*a* and second roller 1722*b*, which can be controlled by the position of first chassis 1702 and second chassis 1704.

Figure 19A:
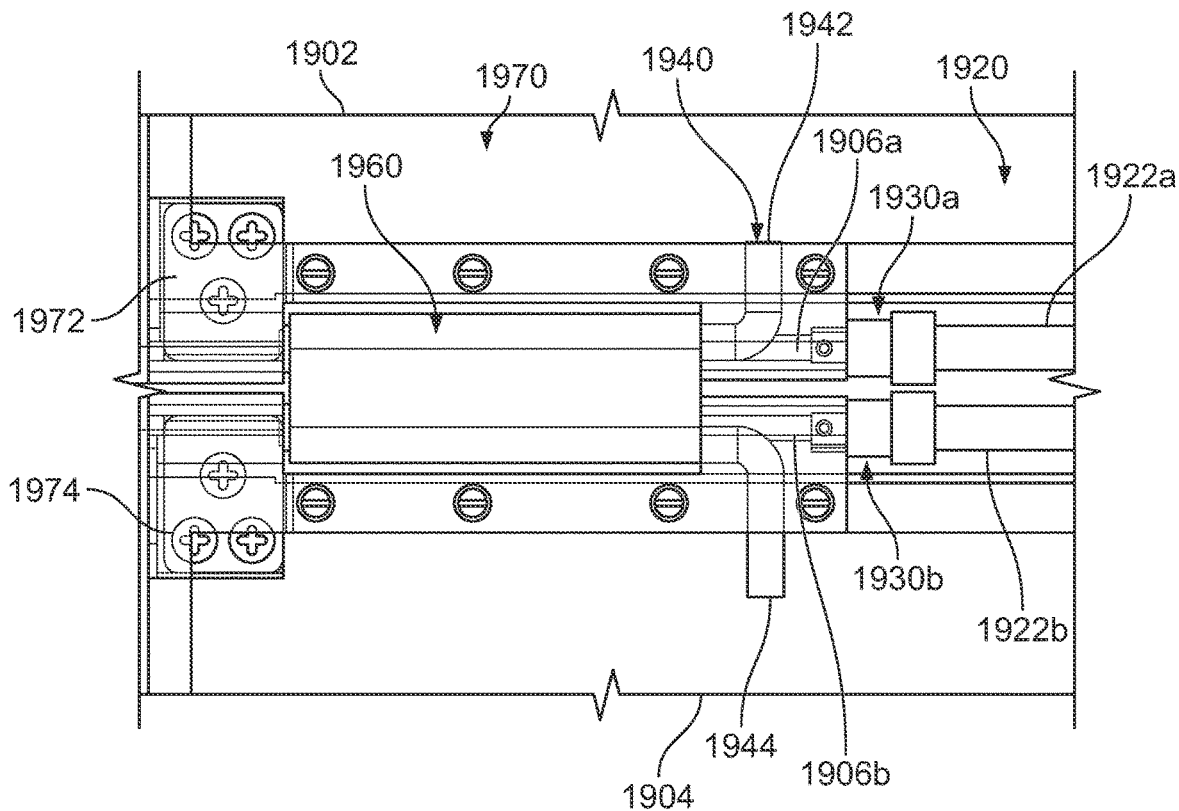
FIG. 19A is a top plan view of an alternative hinge that may be used with a guide assembly in an electronic device according to one or more embodiments.
Figure 19B:
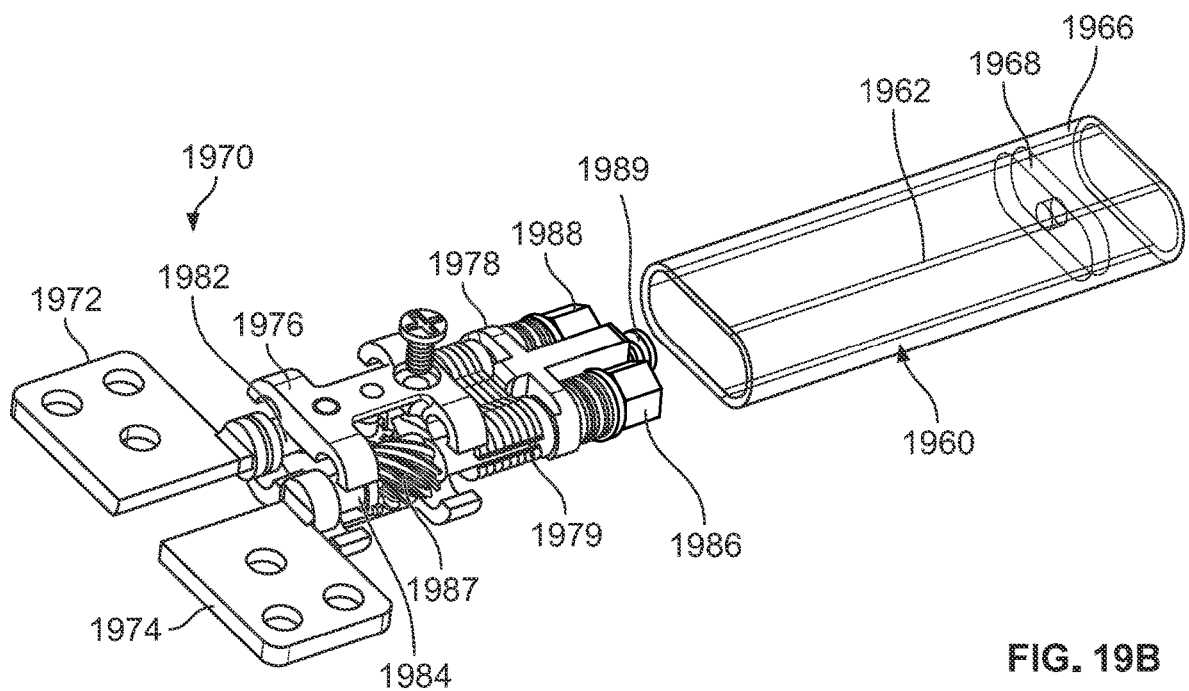
FIG. 19B is a partially exploded view of an alternative hinge for an electronic device according to one or more embodiments.
Figure 19C:
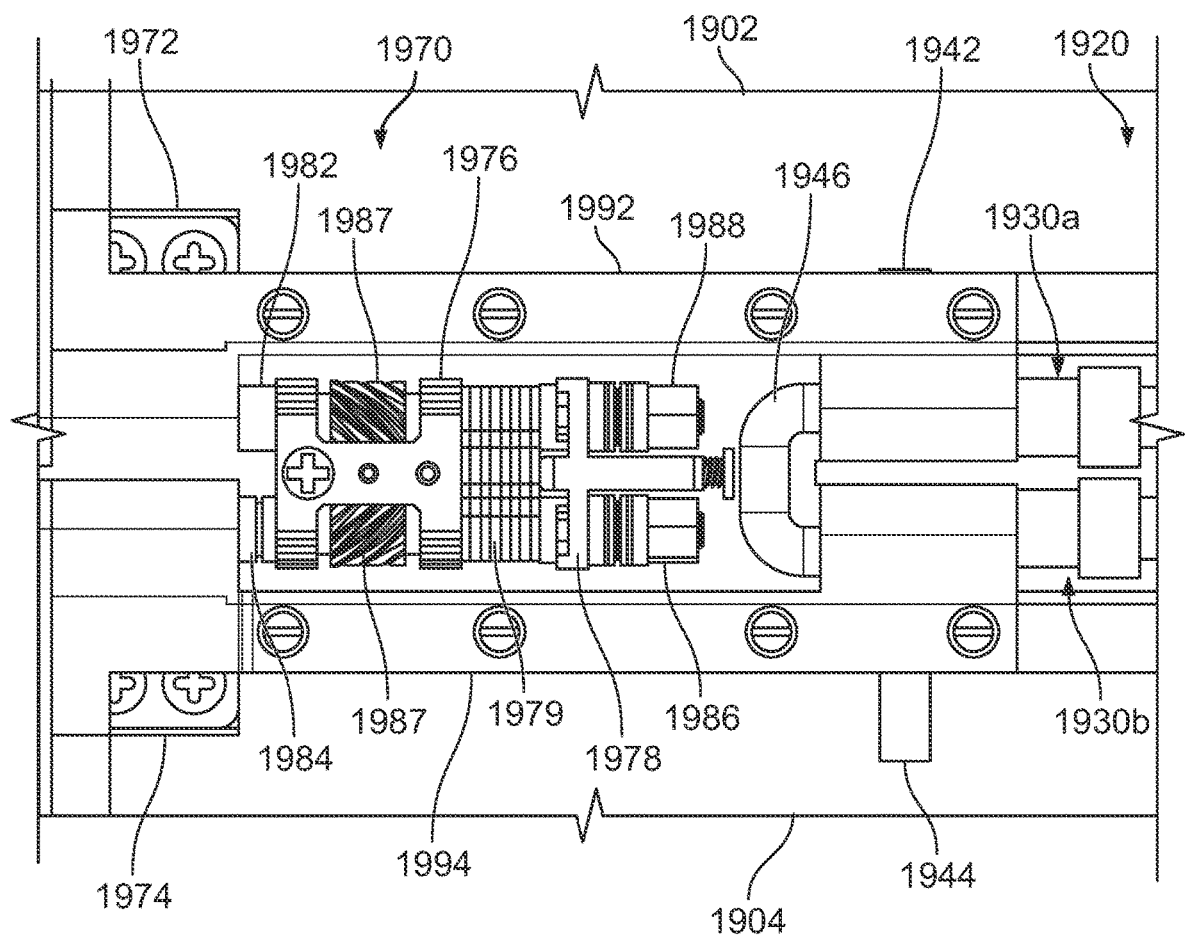
FIG. 19C is a top plan view of an alternative hinge for an electronic device according to one or more embodiments.

Turning to FIGS. 19A-19C, FIGS. 19A-19C are various views of an alternative embodiment for a hinge that may be used in conjunction with a guide assembly that is the same or similar to guide assemblies 1220 or 1720. FIG. 19A is a top plan view of one side of a guide assembly 1920 and one hinge 1970 of a pair of hinges for an electronic device. For example, hinge 1970 may be configured on a left side of an electronic device with a first chassis 1902 and a second chassis 1904, such that first chassis 1902 can be rotatable relative to second chassis 1904, second chassis 1904 can be rotatable relative to first chassis 1902, and/or both first and second chassis 1902 and 1904 can be simultaneously rotatable relative to each other. It should be apparent that another hinge that is complementary to hinge 1970 shown in FIGS. 19A-19C can be attached to a right side of the electronic device. In one example, the other hinge may be a mirror image of hinge 1970.

Hinge 1970 can include an attachment mechanism to attach hinge 1970 to first and second chassis 1902 and 1904. In one example, the attachment mechanism can include a first hinge bracket 1972 configured for attachment to first chassis 1902 and a second hinge bracket 1974 figured for attachment to second chassis 1904. The attachment mechanism can be any suitable fastener, such as those previously described herein for example. A hinge cap 1960 may surround hinge elements connected to hinge brackets 1972 and 1974. The hinge elements can enable rotation of first chassis 1902 and/or second chassis 1904 relative to each other. A cable 1940 can be routed from first chassis 1902 through hinge cap 1960, to second chassis 1904. Cable 1940 can include a first cable portion 1942 extending from first chassis 1902 to hinge cap 1960, and a second cable portion 1944 extending from second chassis 1904 to hinge cap 1960. A middle portion of cable 1940 can be routed through a distal end of hinge cap 1960. Cable 1940 routes electrical signals from components in first chassis 1902 to components in second chassis 1904, and vice versa. Components can include any computer architecture components that generate, send, and/or receive electrical signals. Such components can include, but are not necessarily limited to any heat sources (e.g., heat sources 108, 1208), touch screen display, non-touch display, processors (e.g., CPU, GPU, etc.), memory elements, etc.

Guide assembly 1920 can include a first roller 1922*a* coupled to first chassis 1902 and a second roller 1922*b* coupled to second chassis 1904 for guiding a heat carrying member and optionally, a flexible printed circuit between the two chassis according to the usage of the electronic device. First and second rollers 1922*a* and 1922*b* can have the same or similar configuration as first and second rollers previously described herein (e.g., 1222*a*, 1222*b*, 1722*a*, 1722*b*). For example, first and second rollers 1922*a* and 1922*b* can include a first guide shaft, a second guide shaft, and end caps 1930*a* and 1930*b*. End caps 1930*a* and 1930*b* can have the same configuration as end caps previously described herein (e.g., 1230*a*, 1230*b*). For example, each end cap 1930*a* and 1930*b* can include an inner plug, a spacer, and an outer fastener. First end cap 1930*a* can be configured to support the first guide shaft and the second guide shaft of first roller 1922*a* in a parallel, spaced apart arrangement such that a middle portion of a heat carrying member and/or a middle FPC portion of an FPC may be fixedly secured therebetween. Similarly, second end cap 1930*b* can be configured to support the first guide shaft and the second guide shaft of second roller 1922*b* in a parallel, spaced apart arrangement such that the middle portion of the heat carrying member and/or the middle FPC portion of the FPC may be fixedly secured therebetween. Thus, the middle portion of the heat carrying member and optionally, the middle FPC portion of the FPC can be fixedly secured to both rollers 1922a and 1922b of guide assembly 1920. A heat carrying member and/or an FPC may be fixedly secured to first and second rollers 1922a and 1922b in the same or similar manner as described with reference to heat carrying member 1210 and FPC 1240, for example.

First roller 1922a can be rotatably coupled to first chassis 1902 by any suitable means to enable the first roller to have one degree of rotation (DOF) (i.e., rotational movement). Second roller 1922b can be rotatably coupled to second chassis 1904 by any suitable means to enable the second roller to have one degree of rotation (DOF) (i.e., rotational movement). The rotational movement can be allowed by the rollers 1922a and 1922b to adjust for slack in the heat carrying member and/or the FPC. For example, circular holes or projections may be configured to enable rotation. In at least one embodiment, end caps 1930a can be received in guide cavities defined by first chassis guide holders 1906a and 1906b that protrude from an inner edge of first chassis 1902 to couple first roller 1922a to first chassis 1902. Similarly, end caps 1930b can be received in guide cavities defined by second chassis guide holders 1906b that protrude from an inner edge of second chassis 1904 to couple second roller 1922a to second chassis 1904.

FIG. 19B is a partially exploded view of hinge 1970 according to one or more embodiments. As shown in FIG. 19A, first hinge bracket 1972 can be coupled to a first shaft 1982 such that rotation of first hinge bracket 1972 about a longitudinal axis of the first shaft (e.g., by rotating first chassis 1902) can direct rotation of first shaft 1982 about its longitudinal axis. Second hinge bracket 1974 can be coupled to a second shaft 1984 such that rotation of second hinge bracket 1974 about a longitudinal axis of the second shaft (e.g., by rotating second chassis 1904) can direct rotation of second shaft 1984 about its longitudinal axis. In at least one embodiment, first and second rollers 1922a and 1922b can be axially aligned with first and second shafts 1982 and 1984, respectively. In one example, first roller 1922a can share a longitudinal axis with first shaft 1982, and second roller 1922b can share a longitudinal axis with second shaft 1984. First and second shafts 1982 and 1984 can be coupled by a first top bracket 1976, a second top bracket 1978, and torque rings 1979. Securing elements 1986 and 1988 may be provided at ends of first and second shafts 1982 and 1984. Second bracket 1978 may be attached to hinge cap 1960. In one example, another securing element 1989 may be provided to connect hinge cap 1960 to second frame 1978. In one example, the other securing element 1978 may include any suitable fastening mechanism as previously described here.

Torque elements 1987 can be cooperatively configured on first and second shafts 1982 and 1984 to enable the shafts to rotate about their longitudinal axes while also providing resistance to the motion. The resistance allows first and second chassis 1902 and 1904 attached to first and second hinge brackets 1972 and 1974, respectively, to be easily positioned in a desired angle relative to each other. Torque elements 1987 also allow one shaft to be rotated about the other shaft when the other shaft remains still. For example, if second chassis 1904 remains on a surface (e.g., a table) while first chassis 1902 is rotated to a closed position, first shaft 1982 can rotate about its own longitudinal axis and can also rotate about second shaft 1984 until first chassis 1902 is in the closed position. In one nonlimiting example, torque elements 1987 may be configured as helical gears mounted on parallel shafts 1982 and 1984 to enable equal and opposite rotation of the parallel shafts 1982 and 1984. However, it should be apparent that any other suitable gears (e.g., spur gears, etc.) or other mechanisms may be used based on particular needs and implementations.

Hinge cap 1960 may be configured with two parallel chambers separated by a longitudinal member 1962. The chambers may be configured for receiving first and second shafts 1982 and 1984. A stopper 1968 may be provided in hinge cap 1960 to separate a proximate section of hinge cap 1960, which includes the two chambers, from a distal end 1966, which may extend past first and second shafts 1982 and 1984 and securing elements 1986 and 1988. Distal end 1966 of hinge cap 1960 may be configured to receive cable 1940, which is routed from between first and second chassis 1902 and 1904 to enable communication from components in first chassis 1902 to components in second chassis 1904, and vice versa.

FIG. 19C is a top plan view of hinge 1970 and one side of guide assembly 1920 according to one or more embodiments. In FIG. 19C, hinge cap 1960 is removed to reveal hinge elements and a middle cable portion 1946 of cable 1940 that may be covered and protected by hinge cap 1960. Hinge cap 1960 may normally cover first and second shafts 1982 and 1984, torque elements 1987, first bracket 1976, second bracket 1978, torque rings 1979, securing elements 1986 and 1988, and a middle cable portion 1946 of cable 1940. FIG. 19C also shows first bezel cover 1992 for first chassis 1902 and second bezel cover 1994 for second chassis 1904. Bezel covers 1992 and 1994 can cover inner edges of first and second chassis 1902 and 1904 adjacent to hinge 1970, including at least a portion of first and second hinge brackets 1972 and 1974. In addition, first bezel cover 1992 can cover first cable portion 1942 of cable 1940, which extends between the hinge cap and first chassis 1902. Second bezel cover 1994 can cover a second cable portion 1946 of cable 1940, which extends between the hinge cap and second chassis 1904. First bezel cover 1992 may cover at least part of end cap 1930a (e.g., an outer fastener) of first roller 1922a. Second bezel cover 1994 may cover at least part of end cap 1930b (e.g., an outer fastener) of second roller 1922b.

Hinge 1970 and a complementary hinge may be implemented in an electronic device with guide assembly 1920 in at least some embodiments. A flexible printed circuit (e.g., 1240) may be implemented with a heat carrying member (e.g., 110, 1210, 1710) depending on the particular implementation and needs. In some embodiments, cables, such as cable 1940 may be used instead of, or in addition to, an FPC.

Figure 20:
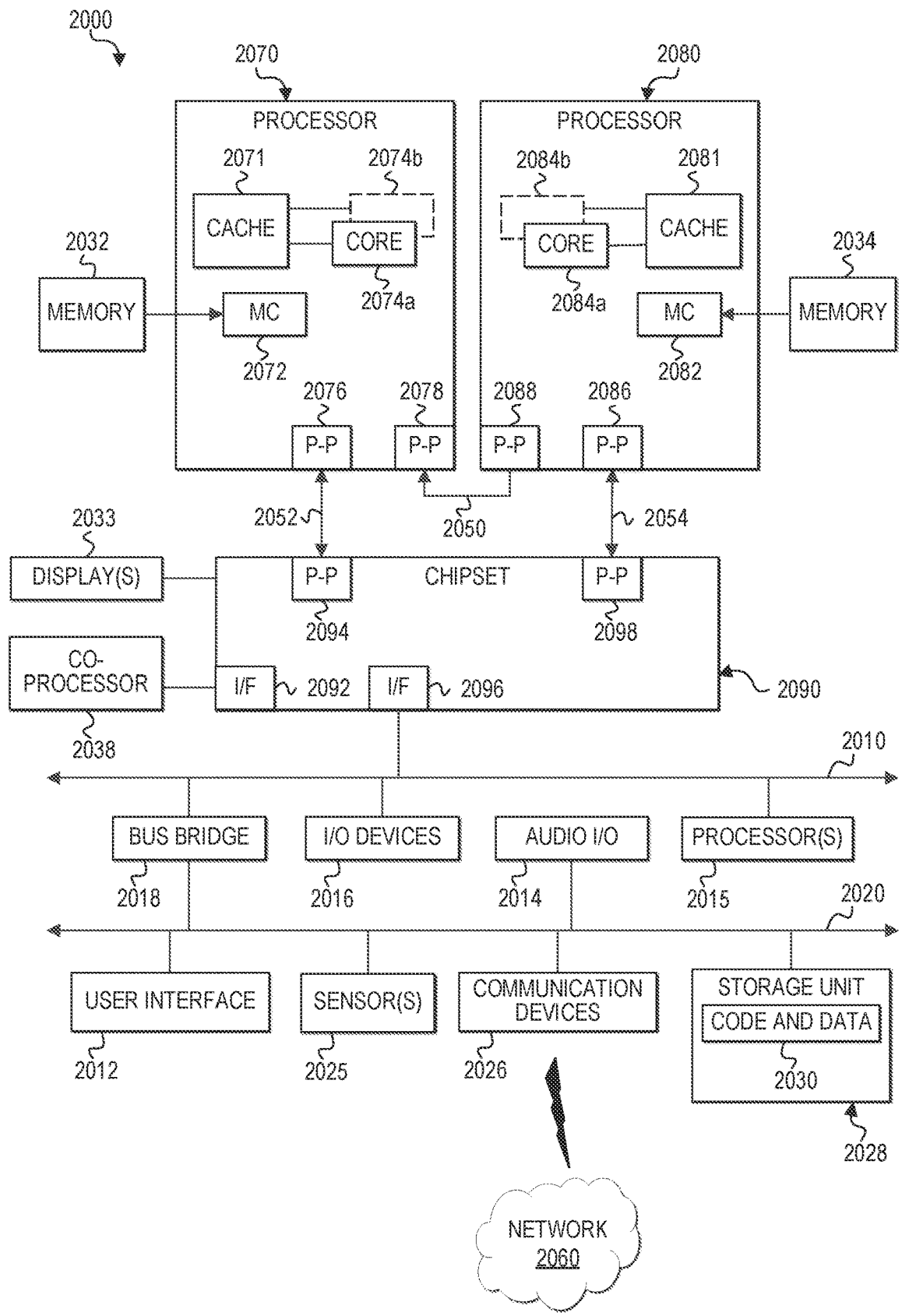
FIG. 20 is a block diagram of an example computer architecture that may be used in accordance with one or more embodiments.

FIG. 20 is a block diagram of possible computer architecture of an example system 2000 that may be coupled to, embedded with, or otherwise interoperate with hinge assembly and guide unit embodiments in accordance with embodiments disclosed herein. Other computer architecture designs and configurations known in the arts for laptops, desktops, handheld PCs, personal digital assistants, graphics devices, video game devices, smart phones, mobile devices, wearable electronic devices, portable media players, hand held devices, and various other electronic devices configured with a hinge mechanism that couples at least two chassis, are also suitable. Generally, suitable computer architectures for embodiments disclosed herein can include, but are not limited to, configurations illustrated in FIG. 20.

Referring now to FIG. 20, shown is a block diagram of an example system 2000 in accordance with one or more embodiments of the present disclosure. Computing system 2000 is arranged in a point-to-point (PtP) configuration where processors, memory, and input/output devices are interconnected by a number of point-to-point interfaces. Generally, the computer architecture of one or more of the electronic devices (e.g., 110, 1210) described herein may be configured in the same or similar manner as computing system 2000. Accordingly, one or more embodiments of hinges and hinge assemblies (e.g., 106, 1250) and/or guide units and guide assemblies (e.g., 120, 1220) described herein could be implemented in a computing system, such as computing system 2000.

Processors 2070 and 2080 may be implemented as single core processors 2074a and 2084a or multi-core processors 2074a-2074b and 2084a-2084b. Processors 2070 and 2080 may each include a cache 2071 and 2081 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that processors 2070 and 2080 are examples of the types of hardware that can be used in connection with the implementations shown and described herein, and may act as a heat source (e.g., 108, 1208) in one or more embodiments.

Processors 2070 and 2080 may also each include integrated memory controller logic (IMC) 2072 and 2082 to communicate with memory elements 2032 and 2034. In alternative embodiments, memory controller logic 2072 and 2082 may be discrete logic separate from processors 2070 and 2080. Memory elements 2032 and/or 2034 may store various data to be used by processors 2070 and 2080.

Processors 2070 and 2080 may be any type of processor, based on particular implementations and needs. Processors 2070 and 2080 may exchange data via a point-to-point (PtP) interface 2050 using point-to-point interface circuits 2078 and 2088, respectively. Processors 2070 and 2080 may each exchange data with a chipset 2090 via individual point-to-point interfaces 2052 and 2054 using point-to-point interface circuits 2076, 2086, 2094, and 2098. Chipset 2090 may optionally exchange information with the coprocessor 2038 via a high-performance interface 2092. In one embodiment, the coprocessor 2038 is a special-purpose processor, such as, for example, a high-throughput MIC processor, a network or communication processor, compression engine, graphics processor, GPGPU, embedded processor, or the like. Chipset 2090 may also communicate with a display 2033 for displaying data that is viewable by a human user. In some implementations, chipset 2090 may communicate with multiple displays that are configured to provide a dual or multi-display system.

As shown herein, chipset 2090 is separated from processing elements 1070 and 1080. However, in an embodiment, chipset 2090 is integrated on the same chip as processing elements 2070 and 2080. Also, chipset 2090 may be partitioned differently with fewer or more integrated circuits. Also, in alternative embodiments, any or all of the PtP links illustrated in FIG. 20 could be implemented as a multi-drop bus rather than a PtP link.

Chipset 2090 may be in communication with a bus 2010 via an interface circuit 2096. Bus 2010 may have one or more devices that communicate over it, such as a bus bridge 2018, I/O devices 2016, and potentially other processors 2015. Via a bus 2020, bus bridge 2018 may be in communication with other devices such as a user interface 2012 (e.g., a keyboard, mouse, touchscreen, or other input devices), one or more sensors 2025, I/O devices 2026 (such as modems, network interface devices, or other types of communication devices that may communicate through a computer network 2060), audio I/O devices 2014, and/or a storage unit 2028. Sensors may include, but are not necessarily limited to, video and/or still image sensors, audio sensors, touch sensors, fingerprint sensors, eye sensors, facial features sensors, other biometric sensors, environmental sensors, etc. Storage unit 2028 may store data and/or code 2030, which may be executed by processors 2070 and/or 2080. In alternative embodiments, any portions of the bus architectures could be implemented with one or more PtP links.

The computer system depicted in FIG. 20 is a schematic illustration of an embodiment of a computing system that may be utilized with various embodiments discussed herein. For example, processors 2070 and/or 2080 could be used in connection with a processor of electronic devices 100 or 1200. It will be appreciated that various components of the system depicted in FIG. 20 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any subject matter or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

OTHER NOTES AND EXAMPLES

The following examples pertain to embodiments in accordance with this specification. The system, apparatus, method, and machine readable medium embodiments can include one or a combination of the following examples:

Example A1 provides an electronic device comprising a first chassis, a second chassis, and a hinge assembly configured to rotatably couple the first chassis and the second chassis together. The hinge assembly includes a guide unit including a first guide member and a second guide member disposed on opposite sides of a hinge plane and spaced to define a passage area therebetween, and a biasing member configured to move the guide unit such that the passage area of the guide unit traverses the hinge plane in a first direction as the first chassis rotates from a closed position to a fully rotated position. The electronic device also includes a heat carrying member having one end disposed in the first chassis, a second end disposed in the second chassis, and a middle portion extending through the passage area.

In Example A2, the subject matter of Example A1 can optionally include where a size of the passage area defined between the first guide member and the second guide member remains fixed as the first chassis is rotated between the closed position and the fully rotated position.

In Example A3, the subject matter of any one of Examples A1-A2 can optionally include where the hinge plane is adjacent to the first guide member when the first chassis is in the closed position, and where the hinge plane is adjacent to the second guide member when the first chassis is in the fully rotated position.

In Example A4, the subject matter of any one of Examples A1-A3 can optionally include where the hinge assembly includes a first shaft, the first chassis rotatable about a first axis of the first shaft and a second shaft, the second chassis rotatable about a second axis of the second shaft.

In Example A5, the subject matter of Example A4, can optionally include a cam including an inner portion rotatably coupled to the second shaft and an outer portion engaging a longitudinal extension of the guide unit.

In Example A6, the subject matter of Example A5 can optionally include where the cam is configured to overcome bias of the biasing member to move the guide unit such that the passage area of the guide unit traverses the hinge plane in a second direction as the first chassis is rotated from the fully rotated position to the closed position.

In Example A7, the subject matter of any one of Examples A1-A6 can optionally include where the outer portion of the cam is configured to eccentrically rotate about the second axis of the second shaft when the inner portion of the cam is rotated, and where the longitudinal extension is configured to follow the outer portion.

In Example A8, the subject matter of any one of Examples A4-A7 can optionally include where the hinge plane is defined by the first axis of the first shaft and the second axis of the second shaft.

In Example A9, the subject matter of any one of Examples A1-A8 can optionally include where a substantially constant curve length of the middle portion of the heat carrying member is maintained as the first chassis is rotated between the closed position and the fully rotated position.

In Example A10, the subject matter of any one of Examples A1-A9 can optionally include where the middle portion of the heat carrying member adapts to a first profile of a curved surface of the first guide member when the first chassis is in the closed position, and where the middle portion of the heat carrying member adapts to a second profile of a curved surface of the second guide member when the first chassis is in the fully rotated position.

In Example A11, the subject matter of any one of Examples A1-A10 can optionally include where at least the middle portion of the heat carrying member is enclosed in a protective material layer.

In Example A12, the subject matter of any one of Examples A1-A11 can optionally include where the hinge assembly further includes an outer frame, the guide unit movably coupled to the outer frame.

In Example A13, the subject matter of Example A12 can optionally include where the second chassis includes a substantially planar lower side, where when the first chassis is rotated to an angle of rotation between 110 degrees and 135 degrees relative to the second chassis, a side section of the outer frame is spaced from the lower side of the second chassis such that a planar surface engaging the side section of the outer frame and a front portion of the lower side of the second chassis forms an angle with the lower side of the second chassis.

Example B1 provides a hinge assembly comprising a rotation mechanism to rotatably couple a first chassis to a second chassis of an electronic device, and a guide unit including a first guide member and a second guide member spaced to define a passage area therebetween. The passage area is sized to receive a middle portion of a heat carrying member, and the heat carrying member includes one end disposed in the first chassis and a second end disposed in the second chassis. The hinge assembly further comprises an outer frame, where the guide unit is movably coupled to the outer frame, and a biasing member configured to move the guide unit away from the outer frame as the first chassis is rotated to a fully rotated position.

In Example B2, the subject matter of Example B1 can optionally include where a size of the passage area defined between the first guide member and the second guide member remains fixed when the first chassis is rotated between a closed position and the fully rotated position.

In Example B3, the subject matter of any one of Examples B1-B2 can optionally include means for moving the guide unit relative to the outer frame in response to the first chassis being rotated relative to the second chassis from the fully rotated position toward a closed position.

In Example B4, the subject matter of Example B3 can optionally include where the means for moving the guide unit comprises a first shaft and a second shaft, where the first chassis is rotatable about a first axis of the first shaft and the second chassis is rotatable about a second axis of the second shaft.

In Example B5, the subject matter of Example B4 can optionally include where the means for moving the guide unit further comprises a cam including an inner portion rotatably coupled to the second shaft and an outer portion engaging a longitudinal extension of the guide unit.

In Example B6, the subject matter of Example B5 can optionally include where the cam is configured to overcome bias of the biasing member to move the guide unit toward the outer frame as the first chassis is rotated from the fully rotated position to the closed position In Example B7, the subject matter of any one of Examples B5-B6 can optionally include where the outer portion of the cam is configured to eccentrically rotate about the second axis of the second shaft when the inner portion of the cam is rotated, and where the longitudinal extension is configured to follow the outer portion when the outer portion is eccentrically rotating.

In Example B8, the subject matter of any one of Examples B1-B3 can optionally include where at least the middle portion of the heat carrying member is enclosed in a protective material layer.

In Example B9, the subject matter of any one of Examples B1-B8 can optionally include where a curve length of the middle portion of the heat carrying member remains a substantially constant dimension as the first chassis is rotated from a closed position to the fully rotated position.

Example C1 provides a method comprising rotating a first chassis in a first rotational direction relative to a second chassis about a hinge assembly, where the hinge assembly includes a guide unit including a first guide member and a second guide member disposed on opposite sides of a hinge plane and spaced to define a passage area therebetween. The passage area is sized to receive a middle portion of a heat carrying member having one end disposed in the first chassis and a second end disposed in the second chassis. The method further comprises moving the guide unit during the rotating of the first chassis in the first rotational direction such that the passage area defined by the first guide member and the second guide member traverses the hinge plane in a first direction relative to the hinge plane.

In Example C2, the subject matter of Example C1 can optionally include rotating the first chassis relative to the second chassis in a second rotational direction opposite to the first rotational direction, and moving the guide unit during the rotating of the first chassis in the first rotational direction such that the passage area defined by the first guide member and the second guide member traverses the hinge plane in a second direction relative to the hinge plane, where the second direction is opposite to the first direction.

In Example C3, the subject matter of any one of Examples C1-C2 can optionally include where a size of the passage area defined between the first guide member and the second guide member remains fixed during the rotating of the first chassis relative to the second chassis in the first rotational direction.

In Example C4, the subject matter of any one of Examples C1-C3 can optionally include where the hinge plane is adjacent to the first guide member when the first chassis is in a closed position, and where the hinge plane is adjacent to the second guide member when the first chassis is in a fully rotated position.

In Example C5, the subject matter of any one of Examples C1-C4 can optionally include where the rotating the first chassis in the first rotational direction includes turning a first shaft of the hinge assembly about a first axis, the first shaft coupled to the first chassis.

In Example C6, the subject matter of Example C5 can optionally include where the rotating the first chassis in the first rotational direction includes rotating the first shaft about a second shaft of the hinge assembly, the second shaft coupled to the second chassis, where the moving of the guide unit during the rotating of the first chassis in the first rotational direction is responsive to a biasing member biasing an extension of the guide unit to follow a cam attached to the second shaft as the first shaft rotates about the second shaft.

In Example C7, the subject matter of Example C5 can optionally include rotating the second chassis about the hinge assembly in a second rotational direction relative to the first chassis; and moving the guide unit during the rotating the second chassis in the second rotational direction such that the passage area defined by the first guide member and the second guide member traverses the hinge plane in the first direction relative to the hinge plane.

In Example C8, the subject matter of Example C7 can optionally include where the rotating the second chassis in the second rotational direction includes turning a second shaft of the hinge assembly about a second axis; and eccentrically rotating an outer portion of a cam operably coupled to the second shaft about the second axis of the second shaft, where the moving of the guide unit during the rotating of the second chassis in the second rotational direction is responsive to a biasing member biasing an extension of the guide unit to follow the outer portion of the cam as the outer portion eccentrically rotates about the second axis of the second shaft.

In Example C9, the subject matter of Example C8 can optionally include where an inclined surface of the extension engages the outer portion of the cam.

In Example C10, the subject matter of any one of Examples C8-C9 can optionally include where the hinge plane is defined by the first axis of the first shaft and the second axis of the second shaft.

In Example C11, the subject matter of any one of Examples C1-C10 can optionally include where a curve length of the middle portion of the heat carrying member remains a substantially constant dimension as the first chassis is rotated between a closed position and a fully rotated position.

In Example C12, the subject matter of any one of Examples C1-C11 can optionally include where at least the middle portion of the heat carrying member is enclosed in a protective material layer.

Example D1 provides an apparatus comprising first chassis, a second chassis, a heat carrying member having one end disposed in the first chassis and a second end disposed in the second chassis, a hinge rotatably coupling the first chassis and the second chassis relative to each other, and a guide unit including a first guide member and a second guide member spaced to define a passage area therebetween. A middle portion of the heat carrying member extends through the passage area of the guide unit between a first inner edge defining a first opening in the first chassis and a second inner edge defining a second opening in the second chassis. The electronic device comprises. The apparatus further comprises means for maintaining a curve length of the middle portion of the heat carrying member at a substantially constant dimension when the first chassis is rotated relative to the second chassis.

In Example D2, the subject matter of Example D1 can optionally include where a size of the passage area between the first guide member and the second guide member remains fixed as the first chassis is rotated between a closed position and a fully rotated position.

In Example D3, the subject matter of any one of Examples D1-D2 can optionally include where the curve length of the middle portion of the heat carrying member is measured from the first inner edge of the first chassis to the second inner edge of the second chassis.

In Example D4, the subject matter of any one of Examples D1-D3 can optionally include an outer frame, where the guide unit is movably coupled to the outer frame, and where the means for maintaining the curve length include a cam configured to engage a portion of the guide unit and a biasing member to bias the guide unit away from the outer frame responsive to rotation of the cam.

In Example D5, the subject matter of any one of Examples D1-D3, can optionally include where a second guide unit including a third guide member and a fourth guide member spaced to define a second passage area therebetween, where the middle portion of the heat carrying member extends through the second passage area between the first inner edge defining the first opening in the first chassis and the second inner edge defining the second opening in the second chassis.

Example E1 provides an electronic device comprising a first chassis, a second chassis, a hinge rotatably coupling the first chassis and the second chassis together, a first roller coupled to the first chassis and including a first guide shaft and a second guide shaft spaced to define a first passage area therebetween, a second roller coupled to the second chassis and including a third guide shaft and a fourth guide shaft spaced to define a second passage area therebetween, and a heat carrying member extending from the first chassis, through the first passage area of the first roller, through the second passage area of the second roller, and to the second chassis.

In Example E2, the subject matter of Example E1 can optionally include where the first roller and the second roller are configured such that, when the first chassis is rotated between a closed position and a fully rotated position, a length of a portion of the heat carrying member extending from the first passage area of the first roller to the second passage area of the second roller stays substantially the same.

In Example E3, the subject matter of any one of Examples E1-E2 can optionally include where the heat carrying member is fixedly attached to the first roller.

In Example E4, the subject matter of Example E3 can optionally include where the heat carrying member is fixedly attached to the first roller by a plurality of pins protruding from the second roller and received in the first roller.

In Example E5, the subject matter of any one of Examples E1-E4, can optionally include where the heat carrying member is fixedly attached to the second roller.

In Example E6, the subject matter of any one of Examples E1-E5 can optionally include where a portion of the heat carrying member extending from at least the first passage area of the first roller to at least the second passage area of the second roller includes a graphite sheet covered by at least one protective layer.

In Example E7, the subject matter of any one of Examples E1-E6 can optionally include where the heat carrying member is fixedly attached within the first chassis and fixedly attached within the second chassis.

In Example E8, the subject matter of any one of Examples E1-E7 can optionally include where the first roller is rotatably coupled to the first chassis.

In Example E9, the subject matter of Example E8 can optionally include where the heat carrying member is configured to, in response to the first chassis being rotated relative to the second chassis, direct rotation of the first roller such that the first passage area is aligned with a first end opening in the first chassis.

In Example E10, the subject matter of any one of Examples E1-E9 can optionally include a flexible printed circuit extending from the first chassis, through the first roller, through the second roller, and into the second chassis.

In Example E11, the subject matter of Example E10 can optionally include where the heat carrying member is axially spaced from the flexible printed circuit in the first passage area and in the second passage area.

In Example E12, the subject matter of any one of Examples E10-E11 can optionally include where the flexible printed circuit is fixedly attached to the first roller and to the second roller.

In Example E13, the subject matter of any one of Examples E1-E12 can optionally include where depths of the first chassis and the second chassis are substantially the same and diameters of the first roller and the second roller are substantially the same, or a first depth of the first chassis is less than a second depth of the second chassis and a first diameter of the first roller is less than a second diameter of the second roller.

In Example E14, the subject matter of any one of Examples E1-E13 can optionally include a first hinge including a first shaft where the first chassis is rotatable about a first axis of the first shaft, and a second shaft where the second chassis is rotatable about a second axis of the second shaft. The first shaft is axially aligned with the first roller, and the second shaft is axially aligned with the second roller.

In Example E15, the subject matter of any one of Examples E1-E13 can optionally include where a first hinge coupled to the first chassis, the first hinge including a first gear coupled to a first side surface of the first chassis and a second gear coupled to a second side surface of the second chassis, where the first gear is configured to rotatably engage the second gear to allow the first chassis to be rotated relative to the second chassis.

Example F1 provides a guide assembly for an electronic device, the guide assembly comprising: a first roller coupled to a first chassis of the electronic device, the first roller including a first guide shaft and a second guide shaft spaced to define a first passage area therebetween; and a second roller coupled to a second chassis of the electronic device, the second roller including a third guide shaft and a fourth guide shaft spaced to define a second passage area therebetween, and the first chassis rotatably coupled to the second chassis. The first passage area of the first roller and the second passage area of the second roller are sized to accommodate a heat carrying member extending from the first chassis, through the first passage area of the first roller, through the second passage area of the second roller, and to the second chassis.

In Example F2, the subject matter of Example F1 can optionally include where the guide assembly is configured such that, when the first chassis is rotated between a closed position and a fully rotated position, a length of a portion of the heat carrying member extending from the first passage area of the first roller to the second passage area of the second roller stays substantially the same.

In Example F3, the subject matter of any one of Examples F1-F2 can optionally include where the heat carrying member is fixedly attached to the first roller and to the second roller.

In Example F4, the subject matter of any one of Examples F1-F3 can optionally include where a first portion of heat carrying member is fixedly attached within the first chassis, and where a second portion of heat carrying member is fixedly attached within the second chassis.

In Example F5, the subject matter of any one of Examples F1-F4 can optionally include where the first roller is rotatably coupled to the first chassis, and where the second roller is rotatably coupled to the second chassis.

In Example F6, the subject matter of Example F5 can optionally include where the heat carrying member is configured to, in response to the first chassis being rotated relative to the second chassis: direct a first rotation of the first roller such that the first passage area is aligned with a first end opening in the first chassis, and direct a second rotation of the second roller such that the second passage area is aligned with a second end opening in the second chassis.

Example G1 provides a method comprising rotating a first chassis relative to a second chassis about a hinge from a first position to a fully rotated position, where a guide assembly includes a first roller coupled to the first chassis and a second roller coupled to the second chassis, where the first roller includes a first guide shaft and a second guide shaft spaced to define a first passage area and the second roller includes a third guide shaft and a fourth guide shaft spaced to define a second passage area, the first passage area and the second passage area sized to accommodate a heat carrying member extending therethrough, where the heat carrying member extends from the first chassis, through the first roller, through the second roller, and to the second chassis.

In Example G2, the subject matter of Example G1 can optionally include where during the rotating of the first chassis relative to the second chassis, a length of a portion of the heat carrying member extending from the first passage area of the first roller to the second passage area of the second roller stays substantially the same.

In Example G3, the subject matter of Example G3 can optionally include where the heat carrying member is fixedly attached to the first roller and to the second roller, and where the first roller is rotatably coupled to the first chassis and the second roller is rotatably coupled to the second chassis.

In Example G4, the subject matter of any one of Examples G1-G3 can optionally include where directing, by the heat carrying member, a first rotation of the first roller such that the first passage area is aligned with a first end opening in the first chassis; and directing, by the heat carrying member, a second rotation of the second roller such that the second passage area is aligned with a second end opening in the second chassis.

An Example Y1 provides an apparatus, the apparatus comprising means for performing the method of any one of the preceding Examples C1-C12 or G1-G4.

What is claimed is:

1. An electronic device comprising:
   a first chassis;
   a second chassis;
   a hinge assembly configured to rotatably couple the first chassis and the second chassis together, wherein the hinge assembly includes:
      a guide unit including a first guide member and a second guide member disposed on opposite sides of a hinge plane and further including guide end portions configured to secure the first and second guide members in a fixed, spaced-apart orientation to define a passage area therebetween; and
      a biasing member configured to move the guide unit such that the passage area of the guide unit traverses the hinge plane in a first direction as the first chassis rotates from a closed position to a fully rotated position, wherein a size of the passage area remains fixed as the first chassis is rotated between the closed position and the fully rotated position; and
   a heat carrying member having one end disposed in the first chassis, a second end disposed in the second chassis, and a middle portion extending through the passage area.

2. The electronic device of claim 1, wherein the hinge plane is adjacent to the first guide member when the first chassis is in the closed position, and wherein the hinge plane is adjacent to the second guide member when the first chassis is in the fully rotated position.

3. The electronic device of claim 1, wherein the hinge assembly includes:
   a first shaft, the first chassis rotatable about a first axis of the first shaft; and
   a second shaft, the second chassis rotatable about a second axis of the second shaft.

4. The electronic device of claim 3, further comprising:
   a cam including an inner portion rotatably coupled to the second shaft and an outer portion engaging a longitudinal extension of the guide unit.

5. The electronic device of claim 4, wherein the cam is configured to overcome bias of the biasing member to move the guide unit such that the passage area of the guide unit traverses the hinge plane in a second direction as the first chassis is rotated from the fully rotated position to the closed position.

6. The electronic device of claim 4, wherein the outer portion of the cam is configured to eccentrically rotate about the second axis of the second shaft when the inner portion of the cam is rotated, and wherein the longitudinal extension is configured to follow the outer portion.

7. The electronic device of claim 4, wherein the hinge plane is defined by the first axis of the first shaft and the second axis of the second shaft.

8. The electronic device of claim 1, wherein a substantially constant curve length of the middle portion of the heat carrying member is maintained as the first chassis is rotated between the closed position and the fully rotated position.

9. The electronic device of claim 1, wherein the middle portion of the heat carrying member adapts to a first profile of a curved surface of the first guide member when the first chassis is in the closed position, and wherein the middle portion of the heat carrying member adapts to a second profile of a curved surface of the second guide member when the first chassis is in the fully rotated position.

10. The electronic device of claim 1, wherein at least the middle portion of the heat carrying member is enclosed in a protective material layer.

11. The electronic device of claim 1, wherein the hinge assembly further includes:
    an outer frame, the guide unit movably coupled to the outer frame.

12. The electronic device of claim 11, the second chassis includes:
    a substantially planar lower side, wherein when the first chassis is rotated to an angle of rotation between 110 degrees and 135 degrees relative to the second chassis, a side section of the outer frame is spaced from the lower side of the second chassis such that a planar surface engaging the side section of the outer frame and a front portion of the lower side of the second chassis forms an angle with the lower side of the second chassis.

13. A hinge assembly comprising:
a rotation mechanism to rotatably couple a first chassis to a second chassis of an electronic device;
a guide unit including a first guide member, a second guide member, and guide end portions, wherein the guide end portions are configured to secure the first guide member and the second guide member in a fixed, spaced-apart orientation to define a passage area therebetween, the passage area sized to receive a middle portion of a heat carrying member, wherein the heat carrying member includes one end sized to be disposed in the first chassis and a second end sized to be disposed in the second chassis;
an outer frame, the guide unit movably coupled to the outer frame; and
a biasing member configured to move the guide unit away from the outer frame as the first chassis is rotated to a fully rotated position.

14. The hinge assembly of claim 13, wherein a size of the passage area defined between the first guide member and the second guide member remains fixed when the first chassis is rotated between a closed position and the fully rotated position.

15. The hinge assembly of claim 13, further comprising:
means for moving the guide unit the toward the outer frame in response to the first chassis being rotated relative to the second chassis from the fully rotated position toward a closed position.

16. The hinge assembly of claim 13, wherein at least the middle portion of the heat carrying member is enclosed in a protective material layer.

17. The hinge assembly of claim 13, wherein the hinge assembly further includes:
a first shaft, the first chassis rotatable about a first axis of the first shaft; and
a second shaft, the second chassis rotatable about a second axis of the second shaft.

18. A method comprising:
rotating a first chassis about a first axis of a first shaft of a hinge assembly in a first rotational direction relative to a second chassis rotatable about a second axis of a second shaft of the hinge assembly, wherein the hinge assembly includes a guide unit including a first guide member and a second guide member disposed on opposite sides of a hinge plane, wherein the guide unit further includes guide end portions configured to secure the first and second guide members in a fixed, spaced-apart orientation to define a passage area therebetween, the passage area sized to receive a middle portion of a heat carrying member having one end disposed in the first chassis and a second end disposed in the second chassis; and
moving the guide unit during the rotating the first chassis in the first rotational direction such that the passage area defined by the first guide member and the second guide member traverses the hinge plane in a first direction relative to the hinge plane.

19. The method of claim 18, further comprising:
rotating the first chassis relative to the second chassis in a second rotational direction opposite to the first rotational direction; and
moving the guide unit during the rotating the first chassis in the second rotational direction such that the passage area defined by the first guide member and the second guide member traverses the hinge plane in a second direction relative to the hinge plane, wherein the second direction is opposite to the first direction.

20. The method of claim 18, wherein the hinge plane is adjacent to the first guide member when the first chassis is in a closed position, and wherein the hinge plane is adjacent to the second guide member when the first chassis is in a fully rotated position.

21. The method of claim 18, wherein at least the middle portion of the heat carrying member is enclosed in a protective material layer.

22. An electronic device comprising:
a first chassis;
a second chassis;
a heat carrying member having one end disposed in the first chassis and a second end disposed in the second chassis; and
a hinge assembly rotatably coupling the first chassis and the second chassis relative to each other, the hinge assembly including:
an outer frame;
a guide unit movably coupled to the outer frame and including a first guide member and a second guide member spaced to define a passage area therebetween, wherein a middle portion of the heat carrying member extends through the passage area of the guide unit between a first inner edge defining a first opening in the first chassis and a second inner edge defining a second opening in the second chassis; and
means for maintaining a curve length of the middle portion of the heat carrying member at a substantially constant dimension when the first chassis is rotated relative to the second chassis, wherein the means for maintaining the curve length include:
a cam configured to engage a portion of the guide unit; and
a biasing member to bias the guide unit away from the outer frame when the first chassis is rotated relative to the second chassis in a first rotational direction.

23. The electronic device of claim 22, wherein a size of the passage area between the first guide member and the second guide member remains fixed as the first chassis is rotated between a closed position and a fully rotated position.

24. The electronic device of claim 22, wherein the curve length of the middle portion of the heat carrying member is measured from the first inner edge of the first chassis to the second inner edge of the second chassis.

25. The electronic device of claim 22, wherein at least the middle portion of the heat carrying member is enclosed in a protective material layer.

* * * * *